Dec. 11, 1962            F. ERDELYI            3,067,583
HYDRAULIC SYSTEM FOR CONTROLLING THE MOVEMENTS
OF AUTOMATICALLY WORKING MACHINES
Filed March 22, 1960            64 Sheets-Sheet 1

Inventor:
Ferenc Erdelyi
By Beaman & Beaman

Inventor:
Ferenc Erdelyi
By Beaman & Beaman

Dec. 11, 1962 F. ERDELYI 3,067,583
HYDRAULIC SYSTEM FOR CONTROLLING THE MOVEMENTS
OF AUTOMATICALLY WORKING MACHINES
Filed March 22, 1960 64 Sheets-Sheet 3

Inventor:
Ferenc Erdelyi
By Beaman & Beaman

Inventor:
Ferenc Erdelyi
By Beaman & Beaman

Dec. 11, 1962  F. ERDELYI  3,067,583
HYDRAULIC SYSTEM FOR CONTROLLING THE MOVEMENTS
OF AUTOMATICALLY WORKING MACHINES
Filed March 22, 1960  64 Sheets-Sheet 8

Inventor:
Ferenc Erdelyi
By Beaman & Beaman

Dec. 11, 1962 F. ERDELYI 3,067,583
HYDRAULIC SYSTEM FOR CONTROLLING THE MOVEMENTS
OF AUTOMATICALLY WORKING MACHINES
Filed March 22, 1960 64 Sheets-Sheet 13

Inventor:
Ferenc Erdelyi
By Beaman & Beaman

Dec. 11, 1962 F. ERDELYI 3,067,583
HYDRAULIC SYSTEM FOR CONTROLLING THE MOVEMENTS
OF AUTOMATICALLY WORKING MACHINES
Filed March 22, 1960 64 Sheets-Sheet 19

Inventor:
Ferenc Erdelyi
By Beaman & Beaman

Dec. 11, 1962     F. ERDELYI     3,067,583
HYDRAULIC SYSTEM FOR CONTROLLING THE MOVEMENTS
OF AUTOMATICALLY WORKING MACHINES
Filed March 22, 1960     64 Sheets-Sheet 25

Inventor:
Ferenc Erdélyi
By Beaman & Beaman

Figure 37B:
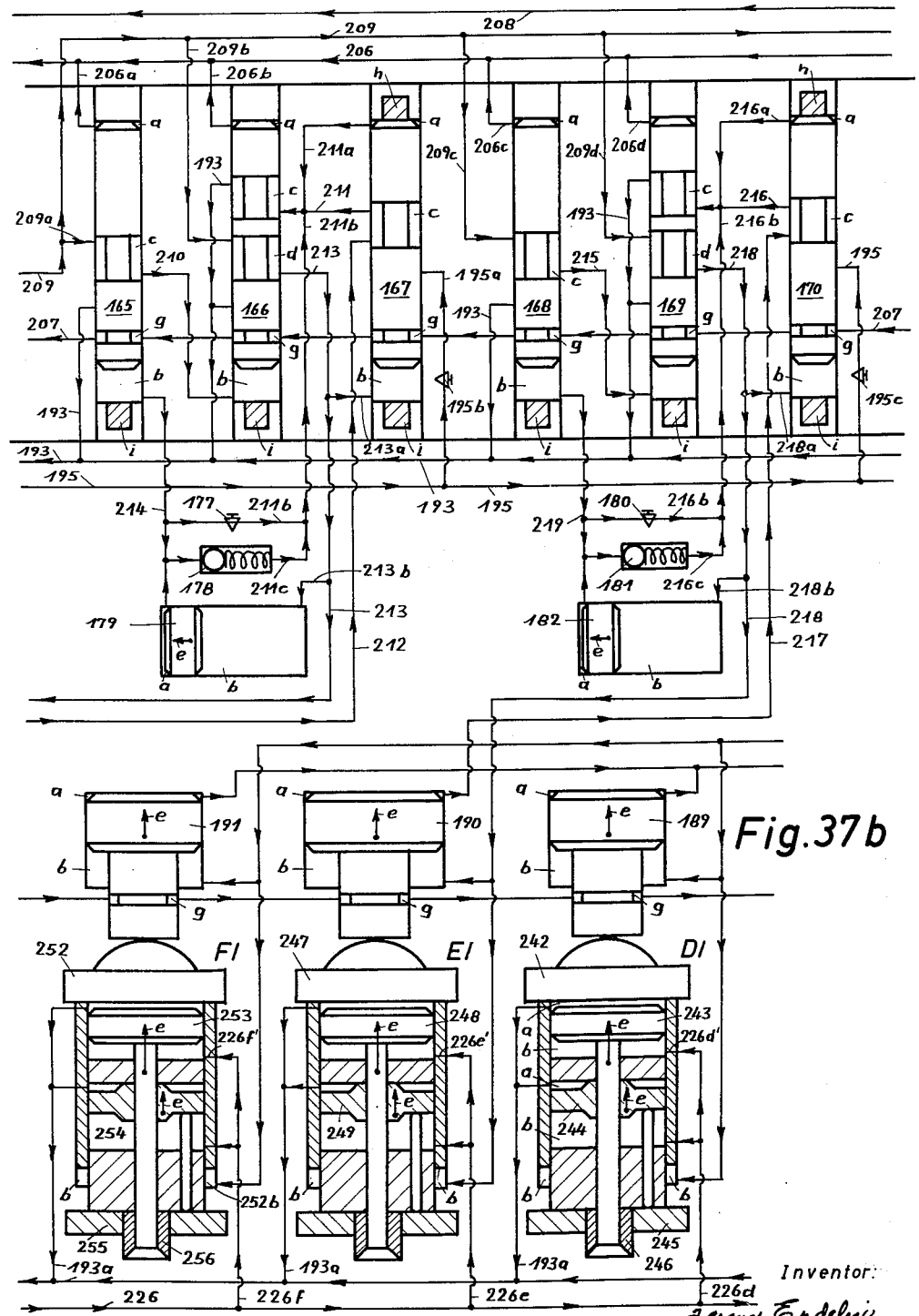

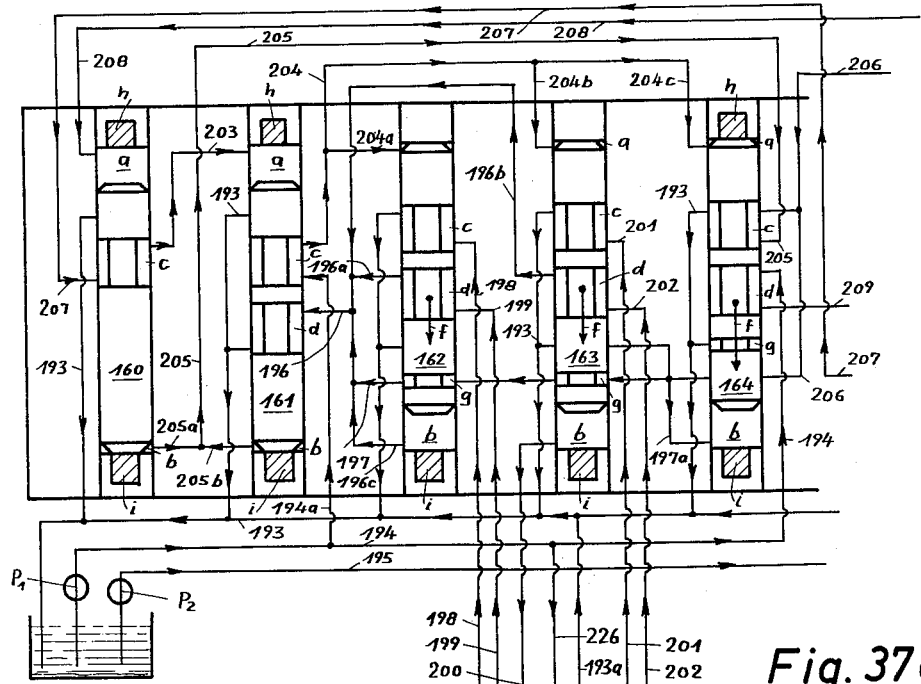
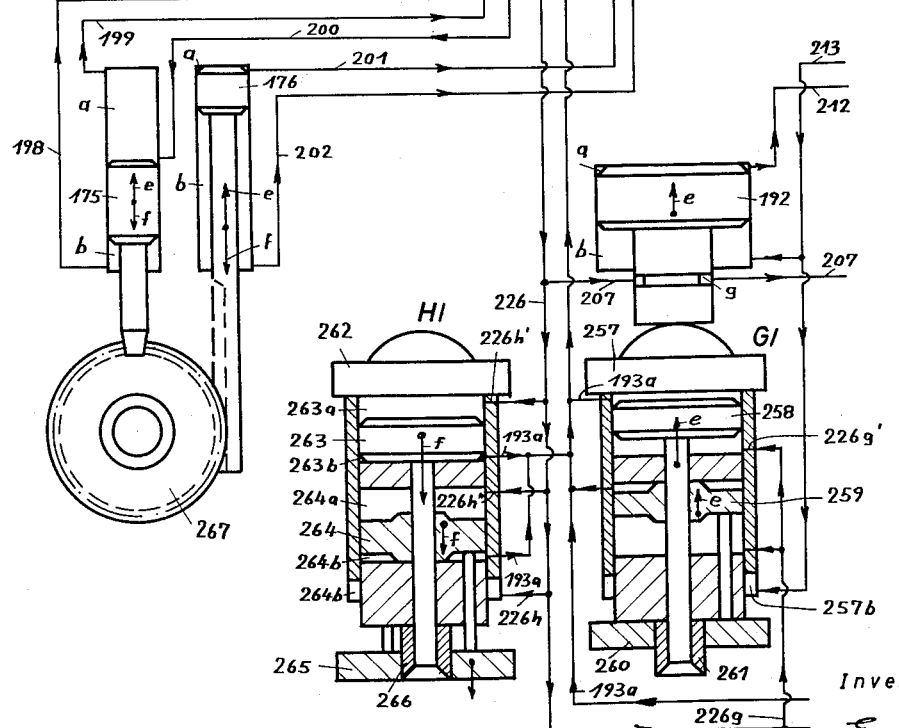
Fig. 37a

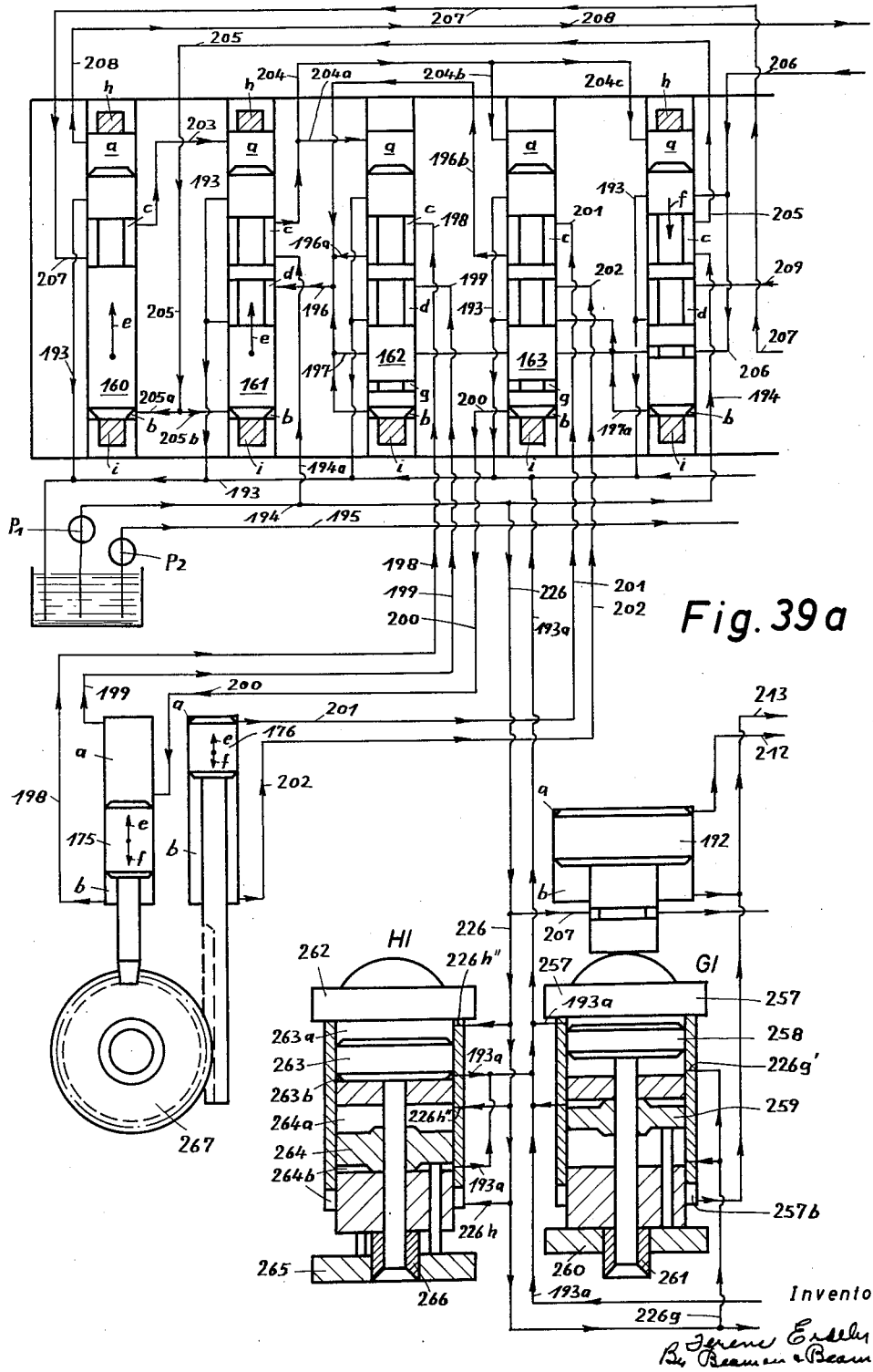

Figure 40B:
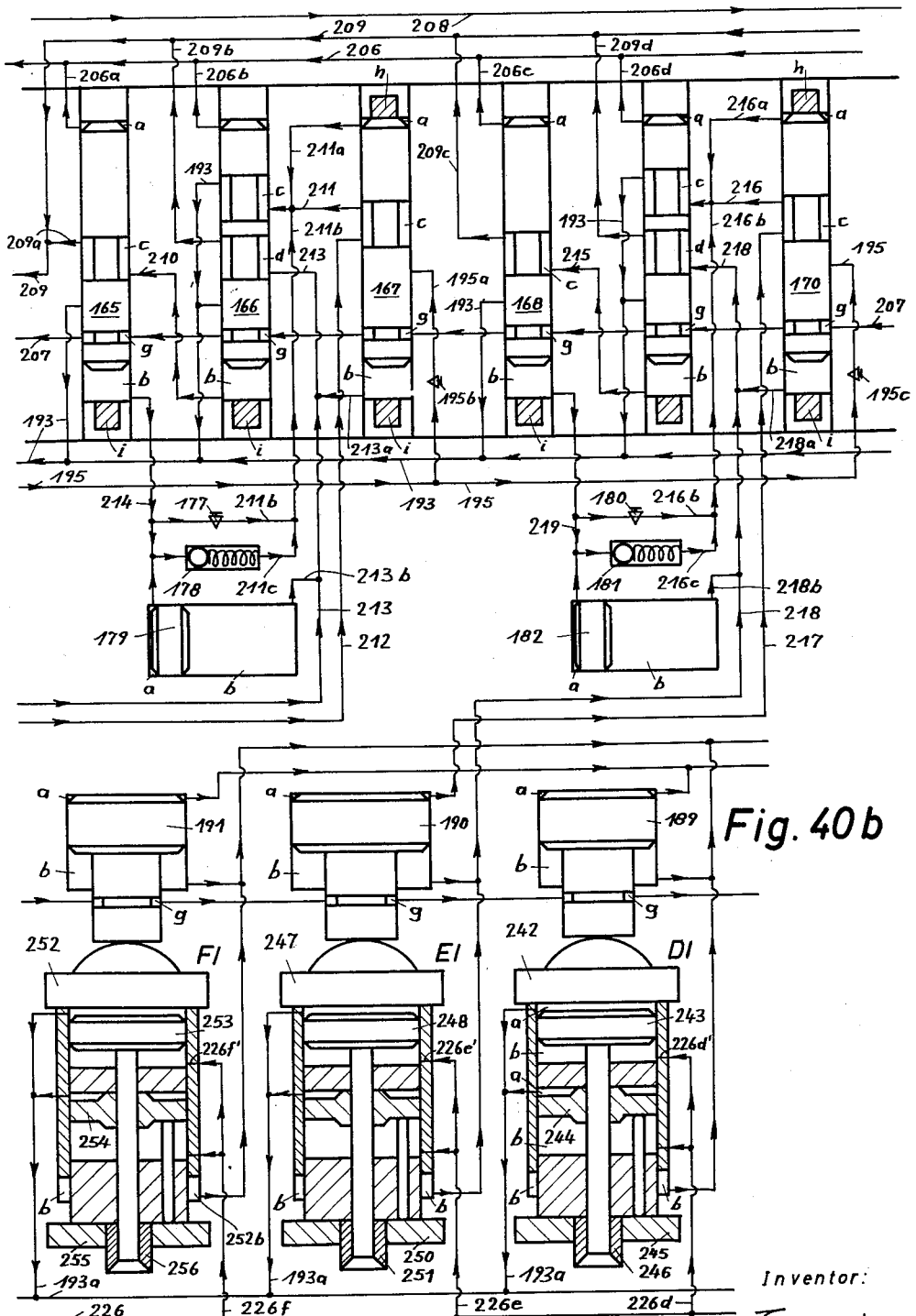

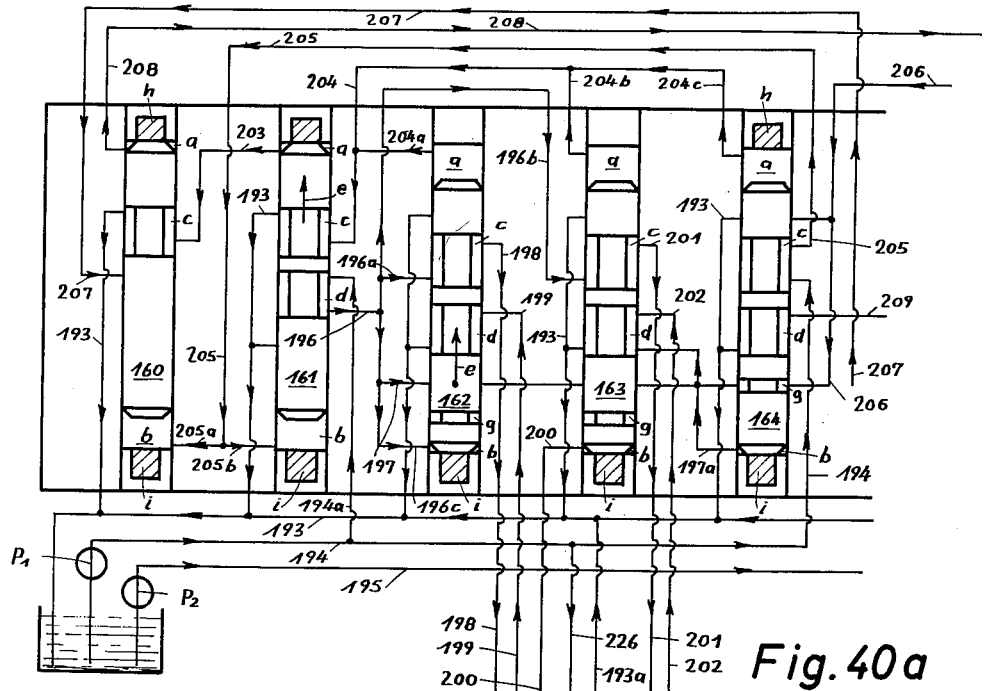
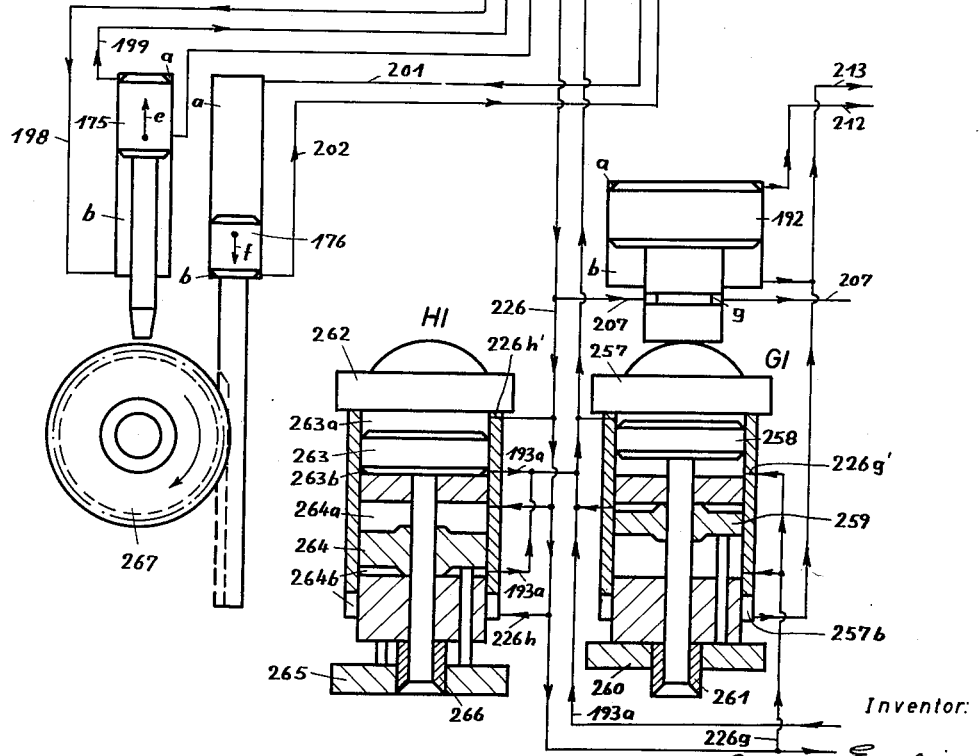
Fig. 40a

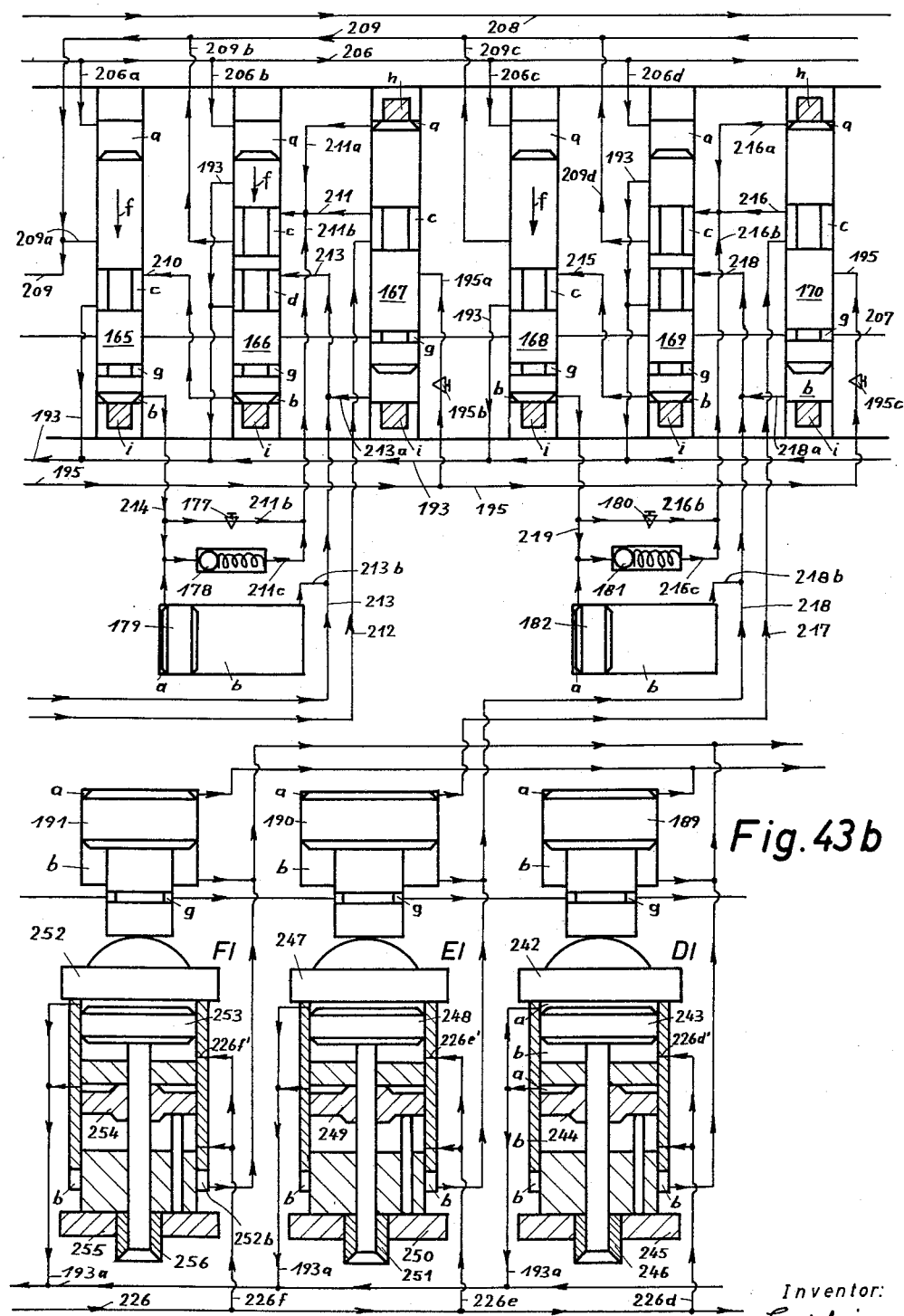

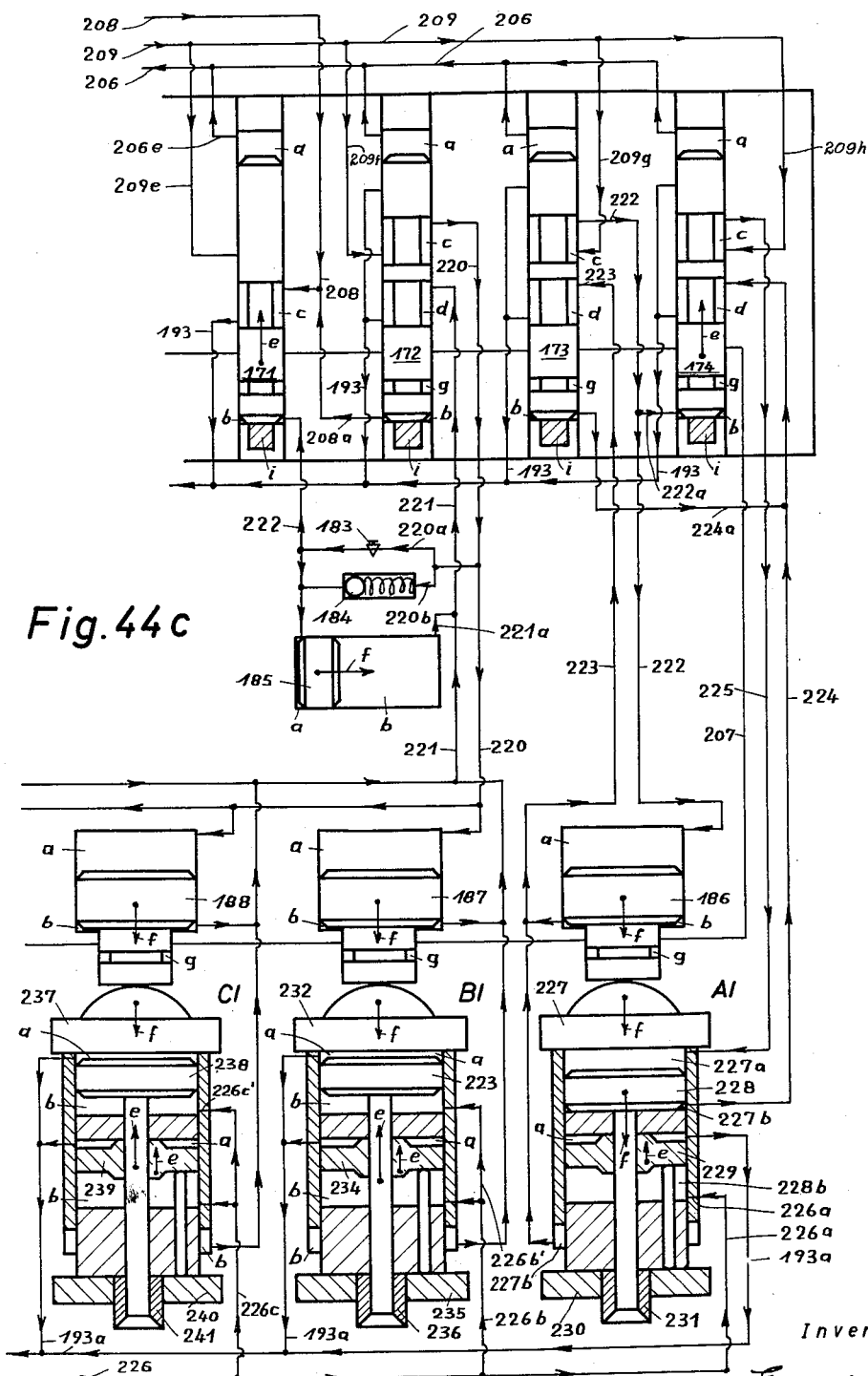

Dec. 11, 1962 F. ERDELYI 3,067,583
HYDRAULIC SYSTEM FOR CONTROLLING THE MOVEMENTS
OF AUTOMATICALLY WORKING MACHINES
Filed March 22, 1960 64 Sheets-Sheet 60
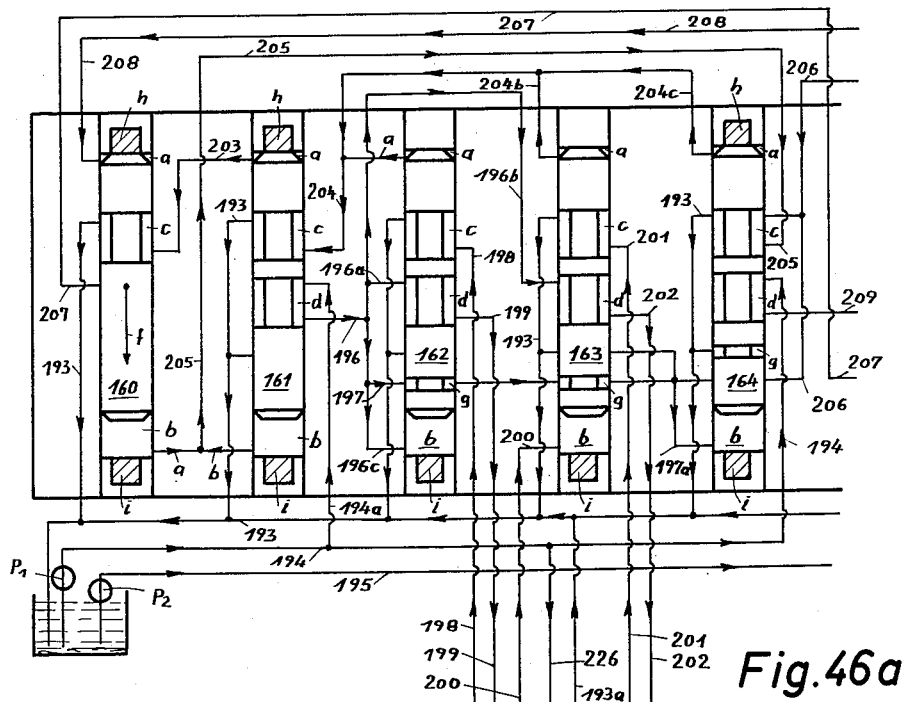
Fig.46a
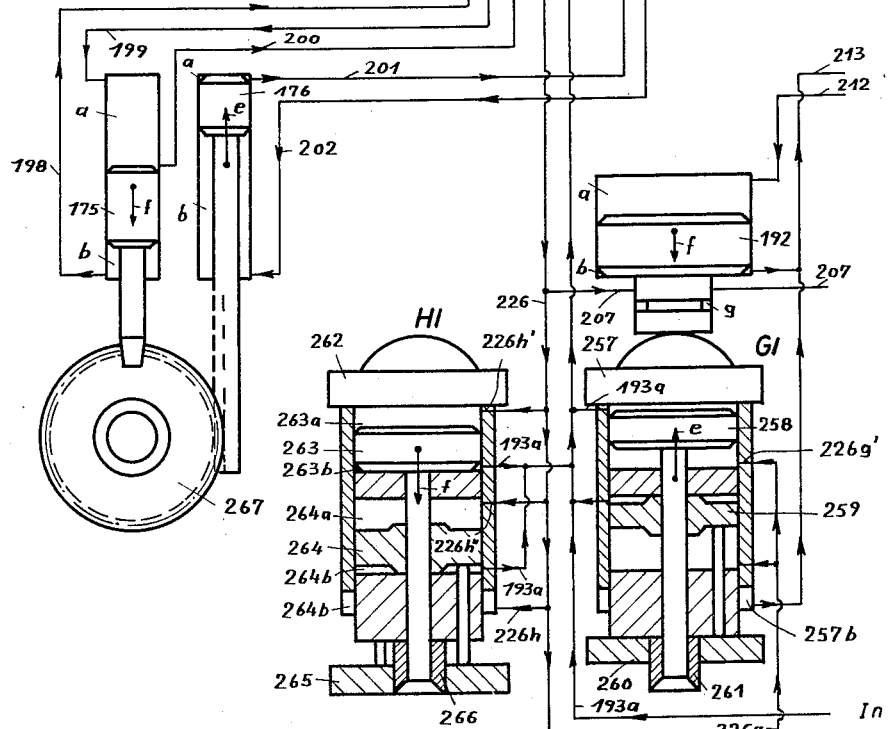
Inventor:
Ferenc Erdelyi
By Beaman & Beaman

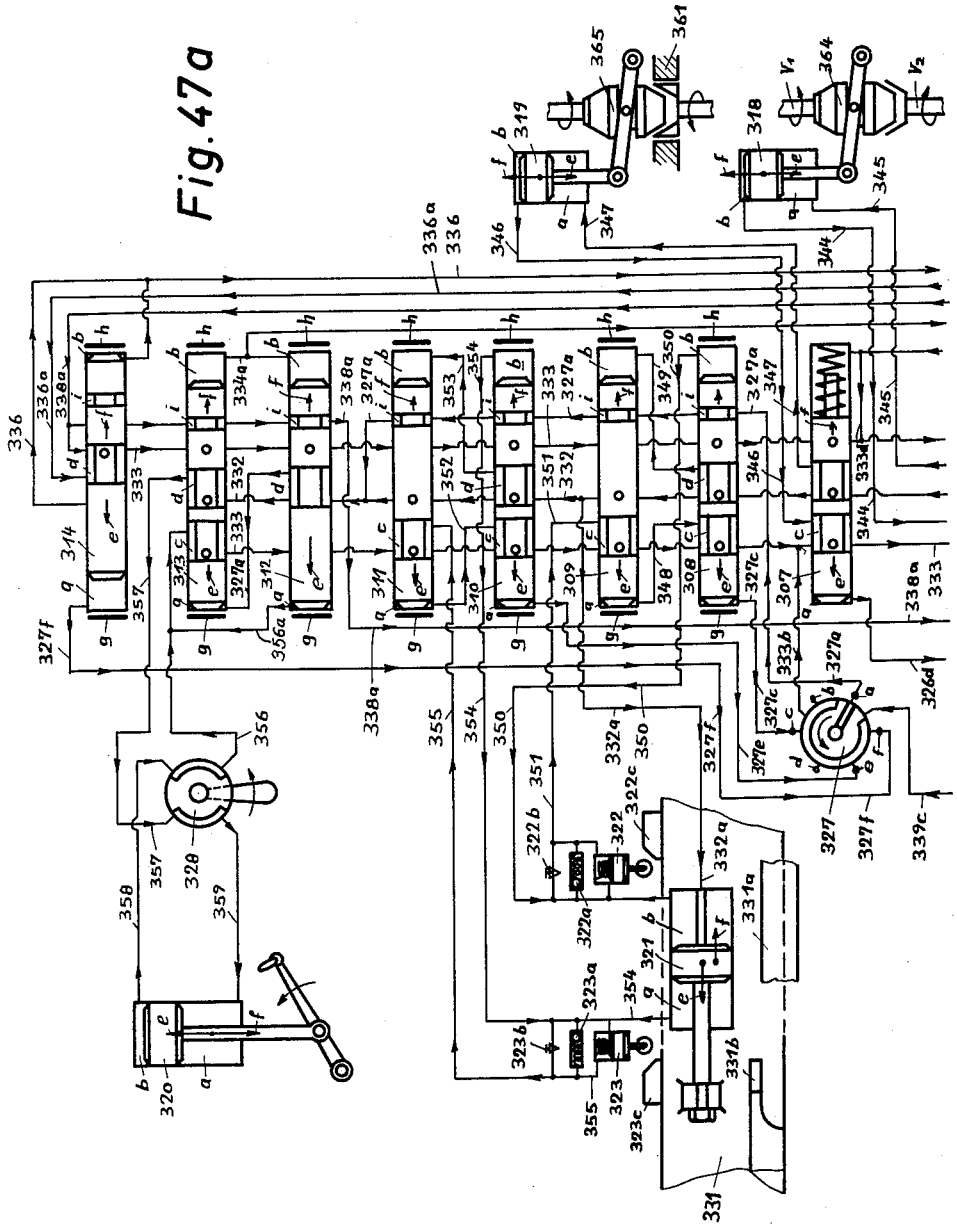

United States Patent Office 3,067,583
Patented Dec. 11, 1962

3,067,583
HYDRAULIC SYSTEM FOR CONTROLLING THE MOVEMENTS OF AUTOMATICALLY WORKING MACHINES
Ferenc Erdelyi, 3675 Normandy Road, Shaker Heights, Cleveland, Ohio
Filed Mar. 22, 1960, Ser. No. 16,755
Claims priority, application Germany Mar. 23, 1959
29 Claims. (Cl. 60—52)

This invention relates to a hydraulic control arrangement for automatic machines, such as automatic lathes, automatic rollers, packing machines, presses including their feeding and discharge devices, or the like, using piston slide valves.

It is well known that usually one or more spindle automatic lathes require for the control of each movable part, such as the supports, collets stuck pusher, boring spindle etc., at least one and often more control cams which must be made in accordance with precalculated rates of advance and paths of movement for the different tools.

It is also a known fact that in the latest types of automatic lathes the number of interchangeable cams has been reduced in that some main movements are obtained by constant cams built into the machine. A total avoidance of control cams has up to now not been possible.

Commonly the different control cams are mounted on a control shaft or a control drum and are arranged in such a way that the operations or movements, respectively, following each other in succession are achieved during one rotation of the control drum, so that the next rotation of the control drum will correspond to the subsequent manufacture of a work piece.

Therefore it will be obvious that the working sequence of the different tools must take place in a manner such that the dead motions and the switching times are reduced to a minimum which on the other hand demand a precisely calculated set of control cams for each different work piece.

In cam controls, as the different cams correspond to defined sections of the control drum rotating at a definite rate, the circumferential velocity of the drum should additionally be calculated. This requires additional theoretical calculation as may be seen from the following list:

(1) A determination of the operating times of the different tools,
(2) Determination of the operating sequence of the different tools,
(3) Designing the shape of the different control cams,
(4) Manufacture of the different control cams,
(5) Mounting of the new cam drum,
(6) Adjustment and determination of the velocity of rotation of the new control drum, etc.

It has always been the desire of engineers designing automatic lathes to substitute electrical, electronic, hydraulic controls or their combination for this mechanically operated control. Many devices are known for compensating for a mechanically operated control element, such as cam discs, levers, etc., but, so far, a hydraulic control arrangement adapted to control the entire program of an automatic lathe or the like is unknown. Hydraulic control arrangements for automatic lathes are only known as accessories substituted for one or the other cam control. A so-called universal hydraulic control arrangement cannot be obtained with the known apparatus.

One object of the invention in its most simple form of embodiment is to provide a hydraulic control for moving a reciprocating hydraulically operated motor with an infinitely variable speed along a path between two points adjustable to any location between the maximum end positions of the piston of the motor, said control to be achieved with three valves of the piston slide valve type, one main control valve, an alternating valve for preparing the change of the moving direction of the motor, a time delay valve and throttle means arranged in each of two feed ducts, feeding fluid at a reduced pressure to the motor at a pressure which will increase when the motor engages its end abutment causing the time delay valve to shift and thereby reversing the movement of the motor.

Another object of the invention is to provide holding means for the different valves, allowing the valves to shift only after a predetermined pressure has been built up to act upon them.

Another object of the invention is to provide holding means for the different valves, the holding force of which is adjustable.

Another object of the invention is to provide branch ducts connecting the feed ducts of the motor with respect to the direction of flow behind the throttle means with one end of the main control valve and one end of the time delay valve wherein the increase of pressure causes the one or the other valve to snap-off from the holding means to reverse the direction of movement of the motor.

Another important object of the invention is to provide a hydraulic system for controlling the movements of working machines of the above mentioned type having a plurality of reciprocating motors replacing the hitherto used mechanical cam controls, said hydraulic control system being a combination of any required number of the above mentioned control valves, alternating valves, time delay valves, throttle means etc., with the aid of which the most complicated hydraulic control systems may be formed.

Another object of the invention is to provide a hydraulic control system, the control program either comprising one closed control circuit or any number of separate control circuits interconnected with each other in such a way that the last valve member will cause the first valve member within the circuit to initiate the next operating cycle after the preceding operating cycle has been ended.

Another object of the invention is to provide a hydraulic control system wherein the period of influence of each of said control valves, selectively extends to its own circuit only, or by providing self-locking means to the entire control system.

Another object of the invention is to provide a control system in which the control circuits are interconnected by impulse channels adapted to convey an impulse ahead of time from one circuit to another.

Another object of the invention is to provide a momentary stop means adapted to interrupt the operating cycle at any point and recontinue it upon release.

Another object of the invention is to provide throttle valves which are gaged in time units and may be by-passed by rapid motion valves.

Another object of the invention is to provide pressure alternating piston slide valves for changing the feed to the motors from high pressure to low pressure and vice versa.

Another object of the invention is to provide one or more adjustable timing units by means of which the programs of the operating steps are controllable independently from one another.

Another important object of the invention is to provide a hydraulic system for controlling the movements of a periodically operating machine particularly a turret lathe, in which a main or primary control circuit comprising a main control valve, an alternating valve and a time delay valve may be linked in any combination to one or more secondary control circuits of which any desired number may be provided, this linkage being achieved by impulse transmitting means actuated by a moving element of the machine.

Still further objects and advantages of the invention will become apparent from the following detailed description of several embodiments of the invention in connection with the drawings. It is to be understood, however, that these embodiments are given by way of example only and that the invention is not restricted to these embodiments as numerous changes are possible to any one skilled in the art without departing from the scope of the invention.

According to the invention it is possible to adjust, for example, the operating time of the different tools of an automatic lathe infinitely from a fraction of a second up to several hours in such a way that they remain absolutely independent from each other within their operating program. The advance of the different tools, or the moving elements, may be limited by any suitable stop means such as adjustable abutments. After an operating cycle is completed the control system is in a position to immediately repeat a new cycle.

Another possibility of the new hydraulic control according to the invention is to machine automatically very bulky work pieces, such as bearing covers for electromotors, etc. wherein only the changing of the workpiece must be performed manually. In this case the control circuit is preferably interrupted after the machining is finished and is started again after a new work piece is clamped. This is possible as the control program may be interrupted at any desired point by closing the appropriate fluid duct and may be restarted again by opening it. In the same way it is possible to block any controls which are not needed by closing the appropriate ducts and by-passing them. By this means a program in which, for example, ten tools with an operating time of six minutes are controlled may be changed readily to a simple program using only one tool and 15 seconds operating time by merely adjusting the corresponding throttle valve which is gaged in time units to 15 seconds and setting the rest of the throttle valves to zero thus excluding them from the control circuit.

Furthermore it is possible to operate the control system in such a way that the groups of tools to be actuated may be controlled in a closed circuit or independently of their own groups or even within a program in dependence on other units so that a tool requiring a longer operating time may be controlled from the beginning to the end of the control program in which the other tool groups are successively actuated.

It is obvious that the control, or the operating times, of the different tools may be varied within their working cycle in any suitable way, as the valve selecting the operating circuit becomes effective only after all tools have finished their work and are switched to "return."

Another advantage of the hydraulic control system according to the invention is to be seen in the fact that it may either be built into a single block or that it may be assembled by grouping together a plurality of prefabricated single blocks which latter system provides the possibility of building up the most complicated control systems.

Another important feature of the invention resides in the fact that automatic lathes provided with a hydraulic control system according to the invention will become a "universal machine tool" which may be used for any conceivable processing with the same control elements which merely have to be readjusted. The fact that all cams, levers etc., which are necessary for the production of a certain work piece and which have to be manufactured and adjusted for each work piece are eliminated, greatly facilitates the mounting of the hydraulic control units. Due to the fact that the hydraulic control may quickly and exactly be adjusted to any operating program, an automatic lathe equipped with the new control will operate more economically than any other machine tools even though the number of pieces in a run may be small.

It will be appreciated that of all the machine tools which may possibly be equipped with the hydraulic control according to the invention, lathes, automatic lathes and turret lathes are best suited. It will be noted that the normal lathes are commonly used for single piece manufacture while turret lathes and semiautomatic lathes are used for small runs of work pieces, and automatic lathes may be used economically for quantity production only on account of their extremely expensive sets of control cams. The gap existing between the automatic lathes and the turret lathes is constantly widening because often the production on turret lathes has become uneconomical on account of a large number of pieces to be manufactured, yet often the number is too small to pay for the equipment of an automatic lathe.

Another difficulty in operating turret lathes must be seen in the fact that they may only be operated by persons skilled in the art while automatic lathes may be supervised in groups by unskilled persons.

In order to increase the economy of turret lathes and semiautomatic lathes it would be necessary, on one hand, to operate them with unskilled persons and, on the other hand, to make them adaptable for operational runs which automatic lathes are still uneconomical.

This turret lathe deficiency will also be overcome by using a hydraulic control system in accordance with the invention as will become evident from the following description.

Figure 4:
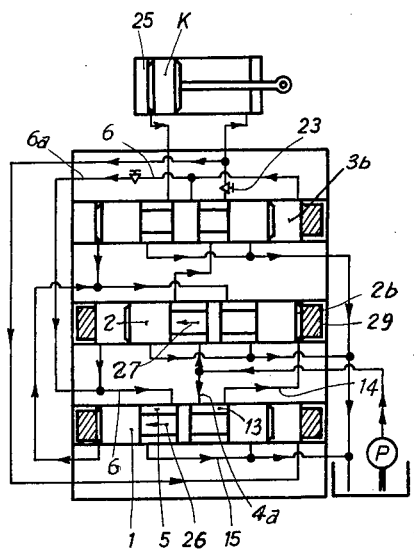
Figure 5:
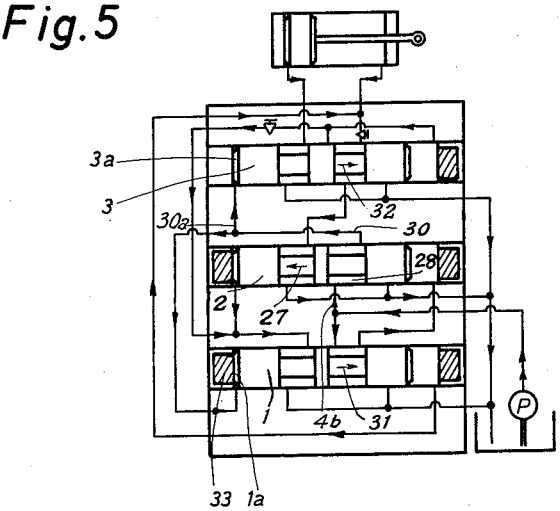
Figure 6:
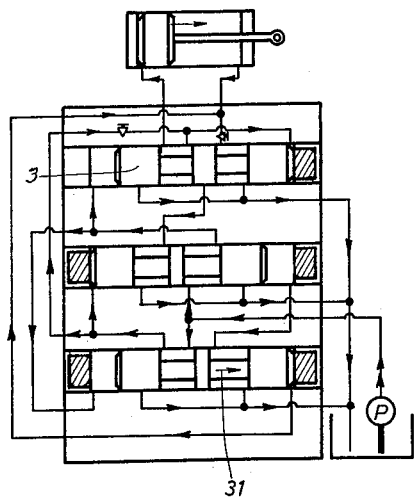
Figure 7:
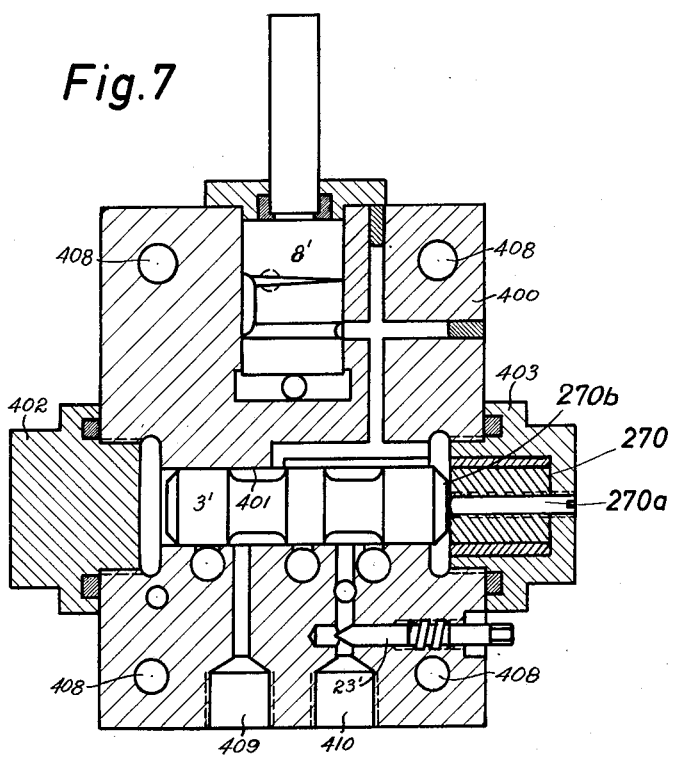
Figure 8:
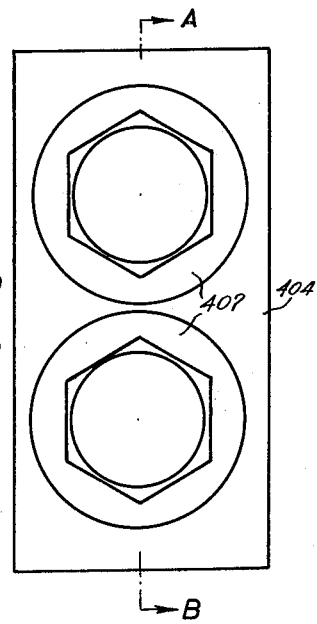
Figure 9:
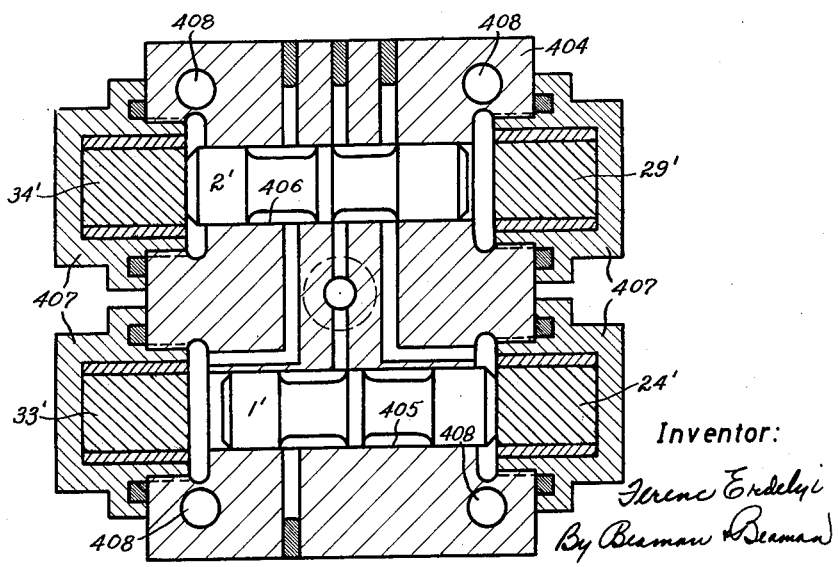
Figure 10:
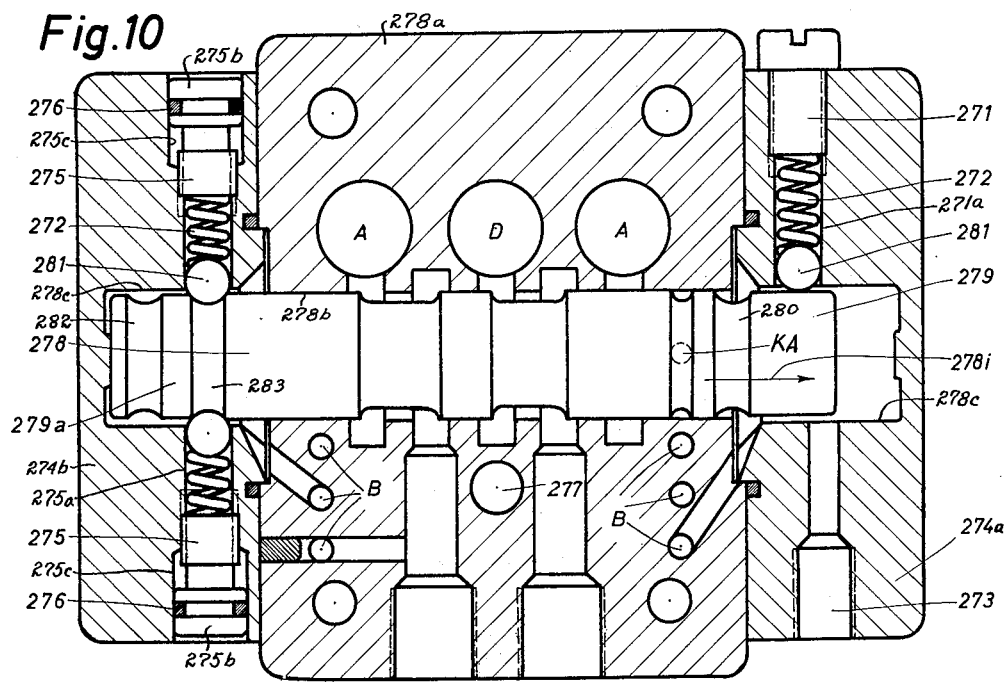
Figure 11:
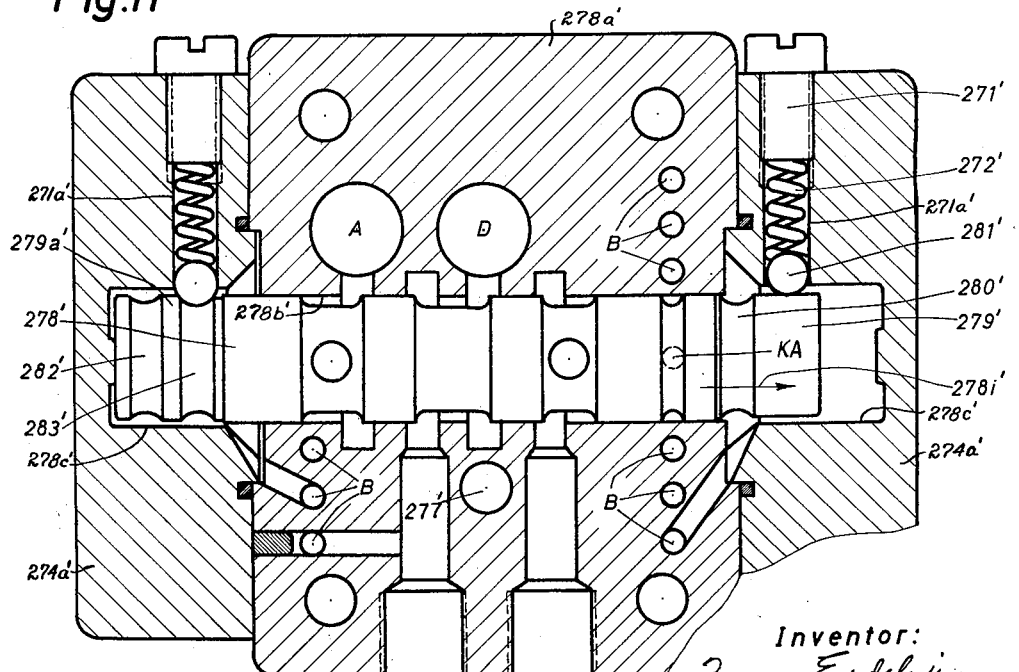

Several embodiments, by way of example, of the hydraulic control system, in accordance with the invention are shown in the accompanying drawings wherein:

FIGS. 7 through 6 are schematic views of a simple unit for controlling a reciprocating movement which will make the mode of operation of the hydraulic control according to the invention apparent, FIG. 7 is a section through a practical embodiment of a prefabricated assembly unit, according to FIGS. 1 through 6, showing the control piston valve with its time delaying adjustable element, FIG. 8 is a front view of another example of embodiment of a prefabricated unit to be used as an assembly unit in accordance with that shown in FIGS. 1 through 6, FIG. 9 is a section along line A—B of FIG. 8, FIGS. 10 and 11 are sections of other embodiments of prefabricated assembly units in which a different time delaying element for switching is provided, FIGS. 12 through 23 are hydraulic control arrangements in which several circuits which may be extended are interconnected with each other, FIGS. 24 through 35 are hydraulic control programs for an automatic lathe having two intimately interconnected control circuits each controlling three operating places movable transversely to each other, FIGS. 36a through 46c are hydraulic control programs for an automatic rolling machine for hot rolling bevel gears, and FIGS. 47a and b are hydraulic control systems particularly adapted to control a turret lathe.

In order to greatly facilitate the understanding of the conception of the new hydraulic control adapted for automatic machines, in accord with the invention a most simple unit for controlling any reciprocating movement shall be described in which permanent magnets are used as holding elements for delaying the time of switching.

In the following description of the hydraulic control systems according to the invention all control valves used are of the piston slide valve type if not otherwise stated.

Figure 1:
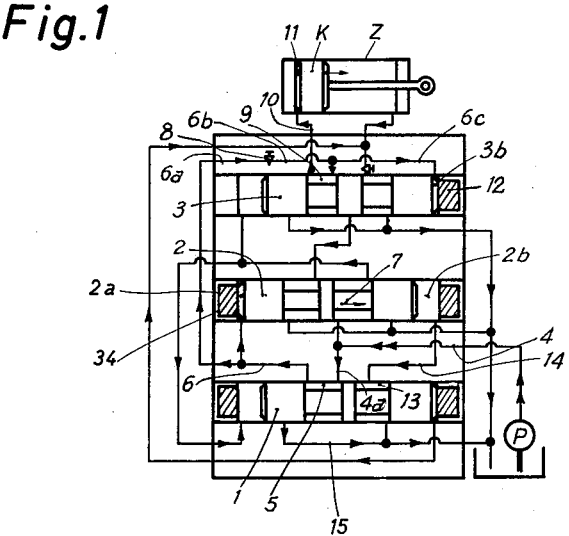

FIG. 1 shows the position of a simple control unit with its piston slide valves in a position in which the impulse given by the control valve 1 is just beginning to become effective. The pressure oil delivered by the pump P acts upon the working area 2a of an alternating valve 2 after it has passed through the pressure duct 4, 4a, the switching chamber 5 of the control valve 1 and, on the one hand, the duct 6. On the other hand, it passes through the duct 6a (extension of duct 6) via a throttle valve 8, the switching chamber 9 of a time delay valve 3, and acts through the feed duct 10 upon the piston area of the motor Z and through duct 6c upon the area 3b of the time delay valve 3.

The time delay valve 3 is for the time being held in its shown position by a permanent magnet 12 so that oil throttled by the throttle valve 8 is exclusively causing the piston K of the motor Z to advance to the right in FIG. 1.

Figure 2:
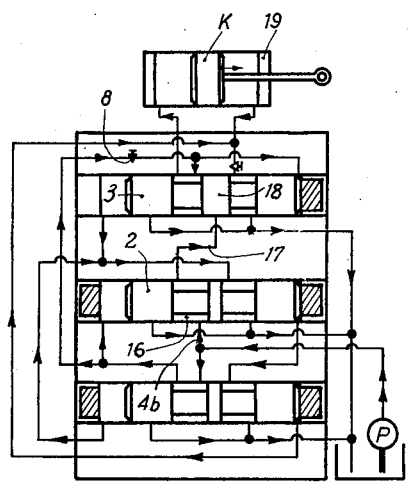

Simultaneously with the oil acting upon said above mentioned area 2a of the alternating valve etc. the area 2b of the alternating valve 2 is connected with the return duct 15 via the switching chamber 13 of the control valve piston 1 and duct 14 so that the alternating valve 2 is pulled away from the permanent magnet 34 holding it in place by means of the unthrottled oil pressure (full pressure) moving it unrestrictedly in the direction of arrow 7 toward the position shown in FIG. 2.

FIG. 2 shows the piston of the control elements at that moment at which the alternating valve 2 has attained its second position connecting the pressure duct 4b via the switching chamber 16 of the alternating valve 2 with the oil duct 17.

As the duct 17 is for the time being closed by the land 18 of the time delay valve 3, the opening of the duct 4b remains without effect. The piston K of the motor Z is constantly pushed towards its abutment 19.

Figure 3:
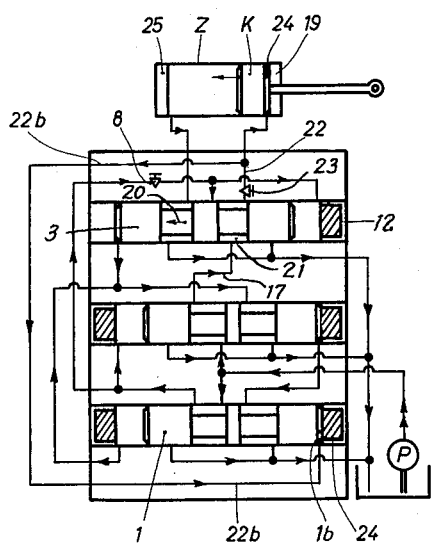

FIG. 3 shows the moment in which the piston K has reached its abutment 19 or its end position, respectively, and in which the oil passing through the throttle valve 8 attains the pressure existing before the throttle valve 8 so that now the time delay valve 3 will be pulled away from the permanent magnet 12 to which it was sticking and moved in a direction marked by the arrow 20.

After the time delay valve 3 has reached the position shown in FIG. 3 pressure oil will be fed on the one hand to the cylinder area 24 of the motor Z from the duct 17 via the switching chamber 21 of the time delay valve 3, duct 22 and throttle valve 23 and on the other hand to the area 1b of the control valve 1 by the duct 22b. For the time being the control valve 1 is held in place by its permanent magnet 24 as the oil pressure reduced by the throttle valve 23 is not able to pull the valve away from its permanent magnet. Merely the piston K is moved back towards its abutment 25.

FIG. 4 shows the moment at which the piston K of the motor Z has reached the abutment 25 or its original position and in which the oil that has passed the throttle valve 23 has pushed the control valve 1 in the direction marked by arrow 26.

The pressure duct 4a is connected with the area 2b of the alternating valve 2 via the switching chamber 13 of the control valve 1 and the duct 14. By means of this connection the alternating valve 2 is pulled away from its permanent magnet 29 and moved in the direction indicated by arrow 27. Simultaneously the duct 6 is connected with the return duct 15 via the switching chamber 5 of the control valve 1 so that on the one hand the alternating valve may be moved without resistance and on the other hand the area 3b of the time delay valve 3 is connected with the return duct via the ducts 6a and 6b.

FIG. 5 shows the position of the control elements at that moment at which the alternating valve 2 is urged in the direction indicated by the arrow 27. The duct 4b is connected with the duct 30 via the switching chamber 28, feeding pressure oil on the one hand to the area 1a of the control valve 1 and on the other hand to the area 3a of the time delay valve 3 via the extension duct 30a.

This immediately causes the time delay valve 3 to move in the direction indicated by arrow 32 and thereupon the control valve 1 to be pulled away from its permanent magnet 33 to be moved in the direction indicated by arrow 31.

FIG. 6 shows the position of the control elements at that moment at which the control valve 1 and the time delay valve 3 have reached their original positions and have received an impulse for starting a new cycle again.

The FIGS. 7 through 9 show partical examples of embodiments of the control diagrammatically shown and described with reference to the FIGS. 1 through 6. Therefore, like primed reference numerals are used for parts corresponding with those shown in FIGS. 1 through 6. These units may be prefabricated and assembled for composing control programs of various types.

FIG. 7 shows a block 400 provided with a bore 401 in which the time delay valve 3' is slidingly arranged. The ends of the bore 401 are closed by plugs 402 and 403. The plug 403 is adapted to received a permanent magnet 270 corresponding to the maget 12 shown in FIG. 1. However, means for adjusting the holding force of the magnet are shown. These means include a threaded bore axially extending through the magnet 270 and the plug 403. A set screw 270a is screwed into the threaded bore and engages the time delay valve 3'. By this means the gap 270b between the right end face of the valve 3' and the permanent magnet 270 may be adjusted and, thus, the holding force of the permanent magnet varied.

Furthermore, it will be noted that the equivalent of the throttle valves 8 and 23, shown in FIG. 1 diagrammatically, are arranged within the block 400. These valves are well known to those skilled in the art and, therefore, their constructions need not be described in detail. Any fine adjustment valve may be used for this purpose. The block 400 is provided with threaded openings 409 and 410 for ducts (not shown) leading to the controlled motor, such as motor Z of FIG. 1.

In FIGS. 8 and 9 a unit is illustrated formed by a block 404 accommodating within spaced parallel bores 405 and 406 the control valve 1' and the alternating valve 2'. The bores 405 and 406 are closed at both ends by plugs 407 having the permanent magnets 33', 24', 34' and 29' arranged therein corresponding to those shown in FIGS. 1 through 6.

Both blocks 400 and 404 are of equal over-all dimensions and are provided with holes 408 adjacent the four corners which coincide and through which connecting bolts may extend for drawing the blocks together when assemblying a control program.

It will be noted that the two blocks 400 and 404 will be required to make up a control system in its most simple form, as shown in FIGS. 1 through 6, and it will be readily understood that any desired number of such units may be combined to control programs of various types, as will be described in detail as the description proceeds.

The layout of the channels interconnecting the different valves 1', 2' and 3' are as shown in FIGS. 1 through 6.

FIGS. 10 and 11 shown different embodiments of time delay valve units differing from those shown in FIG. 7 and being adapted for higher demands.

The time delay valve unit shown in FIG. 10 comprises a block 278a with the time delay valve 278 arranged within a bore 278b extending through the block 278a. The ends of the bore 278b are closed by side plates 274a and 274b rigidly connected with the block 278a. The side plates 274a and 274b have blind bore 278c coaxially aligned with the bore 278b, being somewhat larger in diameter than the bore 278b and serving to accommodate the ends of the time delay valve 278. Passage 273 communicates with the right hand bore 278c for introducing fluid therein.

The means for delaying the switching time used in FIGS. 10 and 11 comprise steel ball detents urged into annular grooves of the valve piston. This mode of delaying the switching time shall now be described.

In FIG. 10 two embodiments of the means for time delaying the switching time are illustrated. The side plate 274a, on the right hand side of FIG. 10, shows one embodiment and has a radial bore 271a accommodating a steel ball 281 and a spring 272. The upper end of the bore 271a is threaded and receives a screw 271 acting upon the spring 272 and urging the ball 281 against the valve piston 278. The head 279 of the valve piston 278 is provided with an annular groove 280, the cross section of which has a radius corresponding to that of the steel ball 281, said annular groove being located so that the valve piston 278 may be moved in the direction of the arrow 278i without resistance, while the movement in the opposite direction is resisted by the ball 281 resting in the annular groove 280 so that the valve piston can be moved only after the load of the spring 272 has been overcome. It will be noted that in this embodiment the delayed switching will only be effected in one direction, namely, opposite to the direction indicated by the arrow 278i.

The left hand side of the FIG. 10 shows the second embodiment for delaying the time of switching. In this case the arresting means shown at the right hand side are omitted.

The side plate 274b preferably has two diametrically disposed radial stepped bores 275a, under certain circumstances one may be sufficient, each having a ball 281 and a spring 272 arranged therein. The upper ends of the bores 275a are threaded and each receives an adjustment screw 275 acting upon the springs 272. The heads 275b of the adjustment screw 275 are disposed within an enlarged portion 275c of the bores 275a, and are provided with annular grooves within which seal rings 276 are arranged.

The left end of the valve piston 278 is provided with two annular grooves 282 and 283 axially spaced and cooperating with the left hand steel balls in the manner described, but in this case holding the valve piston in both end positions. Due to this arrangement the valve piston 278 will work in both directions with the same delay of time in switching.

FIG. 11 employs many similar elements as shown in FIG. 10 indicated by primes and shows on its right hand side the same arrangement as FIG. 10 and, therefore, need not be described again. The lefthand side shows another embodiment differing from that shown in FIG. 10 only in that instead of two balls, springs, and adjustable screws, only one detent arrangement such as that shown on the right hand side is used, which is cooperating with two annular grooves 282' and 283' at the end 279a' of the piston 278'. In using this arrangement the right hand locking means are omitted and the valve piston is held in both end positions.

Due to the fact that the number of springs as well as their reacting force and their tension are freely selectable, it is possible to use the embodiments shown in FIGS. 10 and 11 as a control unit operable with low pressure as well as with high pressure. The provision of a high pressure connection 277, besides the low pressure connection D, makes it possible that this control unit may be operated by one or more pressure alternating valves connected with one or more high pressure pumps connected in series. Furthermore, with an arrangement as shown in the left hand side of FIG. 10, it is possible to adjust the release action to any desired value, thereby allowing adjustments of the succession of the switching operations during the operation of the machine.

The preloaded springs, shown in the embodiments of FIGS. 10 and 11, may also be replaced by other means such as hydraulically loaded pistons, etc., so that in special cases any imaginable combination of control elements is possible.

In both FIGS. 10 and 11 the switching channels KA form the impulse channels of the different connecting ducts of the control valves, the bore A the return duct, the bore D the pressure duct, and the channels B are the connecting ducts of the control valves.

In order to demonstrate the versatility of the invention, and for a better appreciation of the invention a linked control shall be described comprising any desired number of controlled circuits which in turn are controlling moving parts of the machine such as slides, tool holders etc.

The linkage of control circuits, each of them being closed in itself, is possible up to any desired number, as will become apparent from FIGS. 12 to 23 and the following description of this control system. Furthermore it will be seen that it is possible to include in the system not only the different control circuits but to also provide additional time delay valves and motors associated therewith, for example, between valves 47 and 48. It is also possible to provide piston 41 with a number of time delay valves and to extend time delay valve 43 with any suitable number of additional time delay valves.

Figure 12:
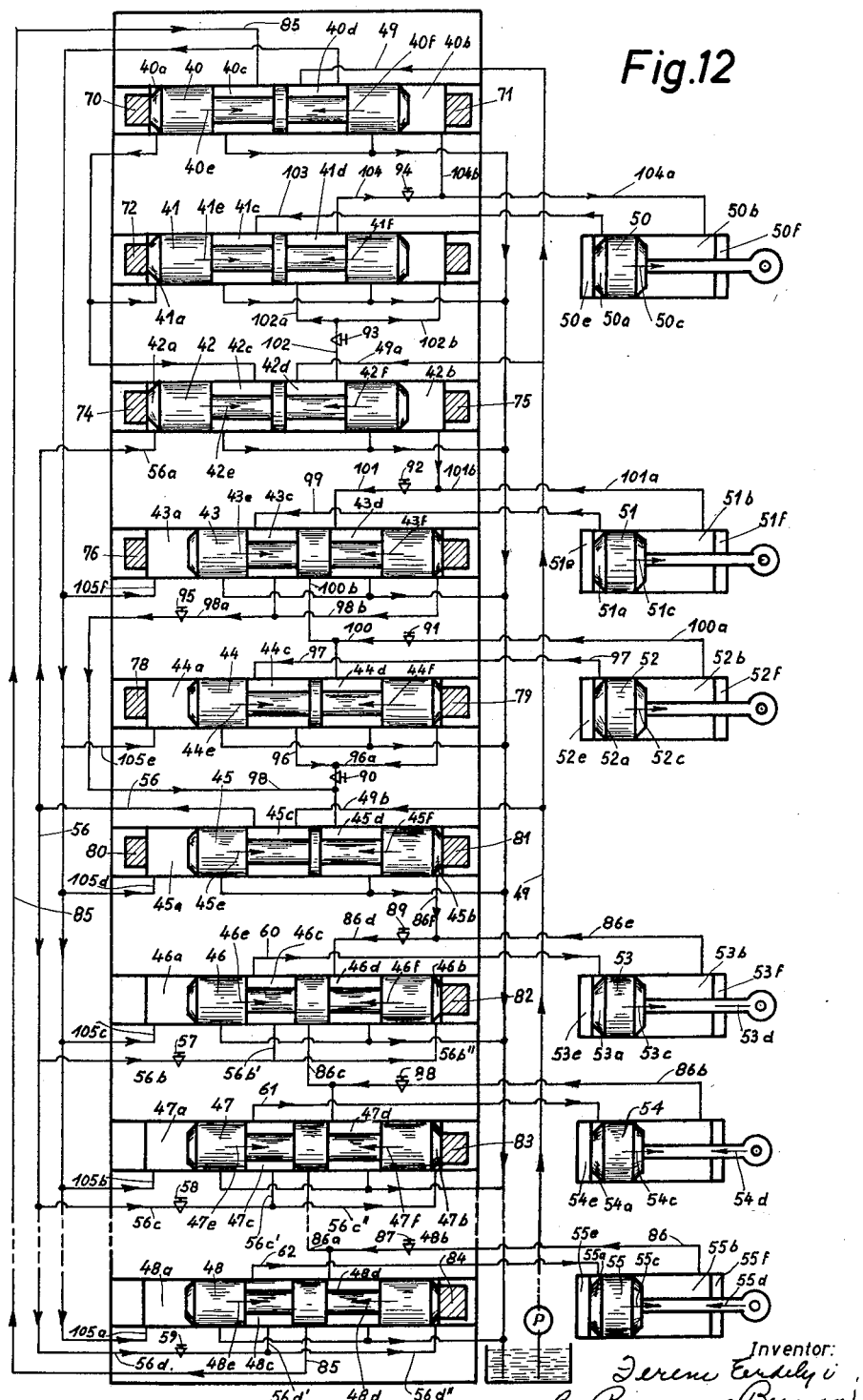

FIG. 12 shows the moment at which the control valve 45 is connecting the pressure oil duct 49b with the distributing duct 56 via the switching chamber 45c, thereby supplying the ducts 56a, 56b, 56c and 56d with pressure oil. On the one hand the pressure oil delivered by the pump acts upon the area 42a of the alternating valve 42 and pulls the valve piston away from the permanent magnet 74 holding it, simultaneously moving it in the direction indicated by arrow 42e and, on the other hand, the cylinder space 53a of the motor 53 is connected to the pump via the duct 56b, timing valve 57, duct 56b, switching chamber 46c of the time delay valve 46 and duct 60, thus moving the piston 53 in the direction indicated by arrow 53c. In the same manner pressure oil is simultaneously fed to the cylinder spaces 54a and 55a of the motor pistons 54 and 55 moving them in the direction indicated by arrows 54c and 55c, respectively.

At the same time oil is fed to the area 46b of the time delay valve 46 via duct 56b''. This time delay valve 46 cannot move on account of the reduced oil pressure produced by the throttle valve 57 and the permanent magnet 82 holding the valve. The same operation will correspondingly take place at the time delay valves 47 and 48, respectively.

Figure 13:
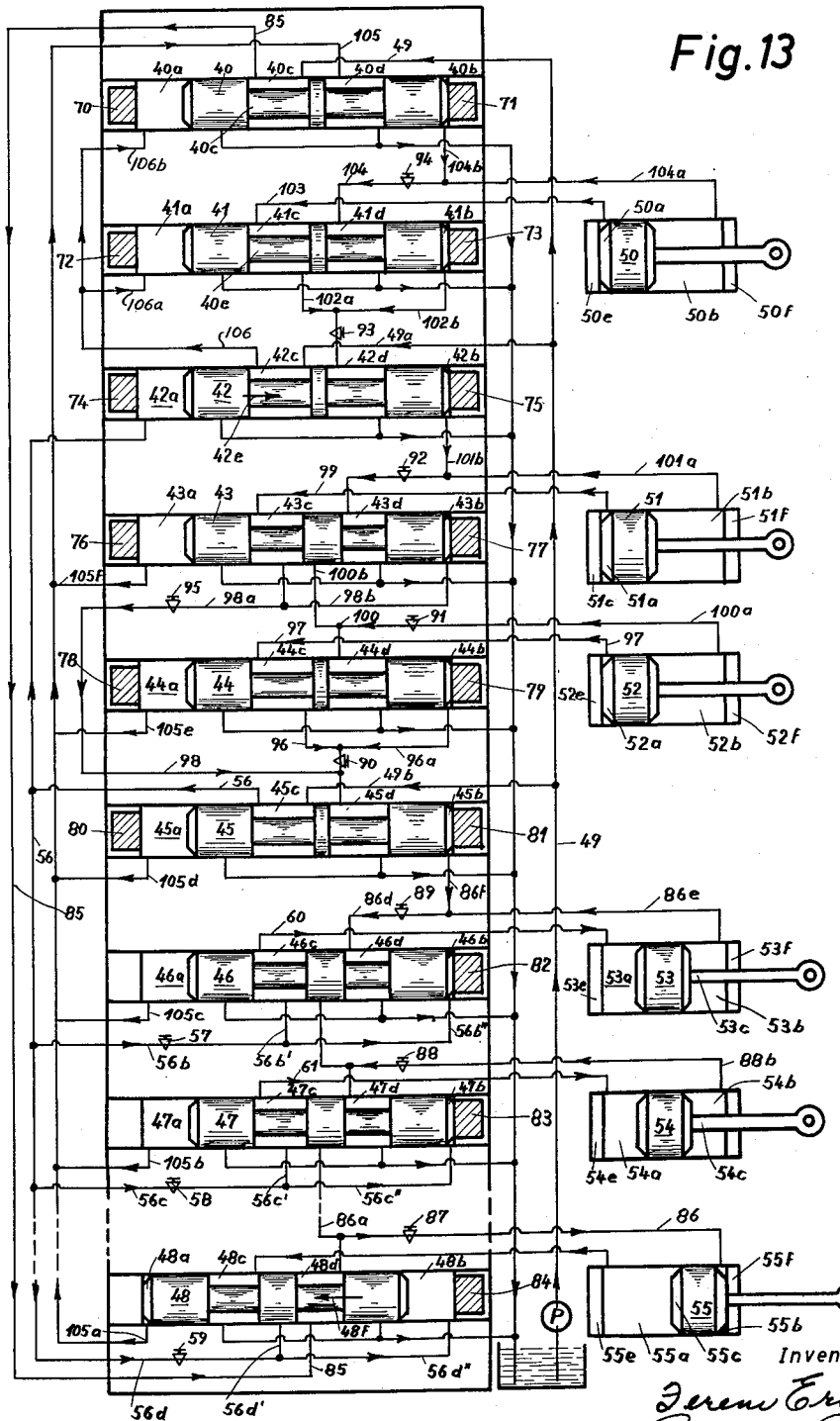

FIG. 13 shows the moment at which the motor piston 55 has been moved in the direction of arrow 55c and has reached the stationary limit stop 55f. The oil passing the timing or throttle valve 59 flows into the area 48b of the time delay valve 48 and attains the same pressure as that of the duct 56d. The valve piston of the time delay valve 48 will thereby be pulled away from the permanent magnet 84 holding it and moved in the direction of arrow 48f. In the meantime the motor pistons 53 and 54 are continuing their movements in the direction of arrows 53c and 54c, respectively, independent of the motor piston 55.

As has been already described with respect to the control operation according to FIG. 12, the area 42a of the control valve 42 and the oil distributing duct 56 are simultaneously fed with pressure oil. Thus the control valve 42 will be pulled away from the permanent magnet 74 holding it and moved in the direction of arrow 42e.

Thereupon the pressure oil duct 49a is connected with the ducts 106 and, respectively, 106a, 106b, via the switching chamber 42c and acts upon the area 40a and 41a of the control valve 40 and the alternating valve 41, respectively. The control valve 40 and the alternating valve 41 are thus pulled away from their permanent magnets 70 and 72, respectively, and moved in the direction of arrows 40e and 41e, respectively.

After the control valve 40 has been moved in the direction of arrow 40e the pressure oil line 49 is connected with the control duct 85 via the switching chamber 40c of the control valve 40 so that the oil will flow to the switching chamber 48d and, thus, acting via the duct 86 on the cylinder space 55b of the motor 55 moving it into its original position.

Figure 14:
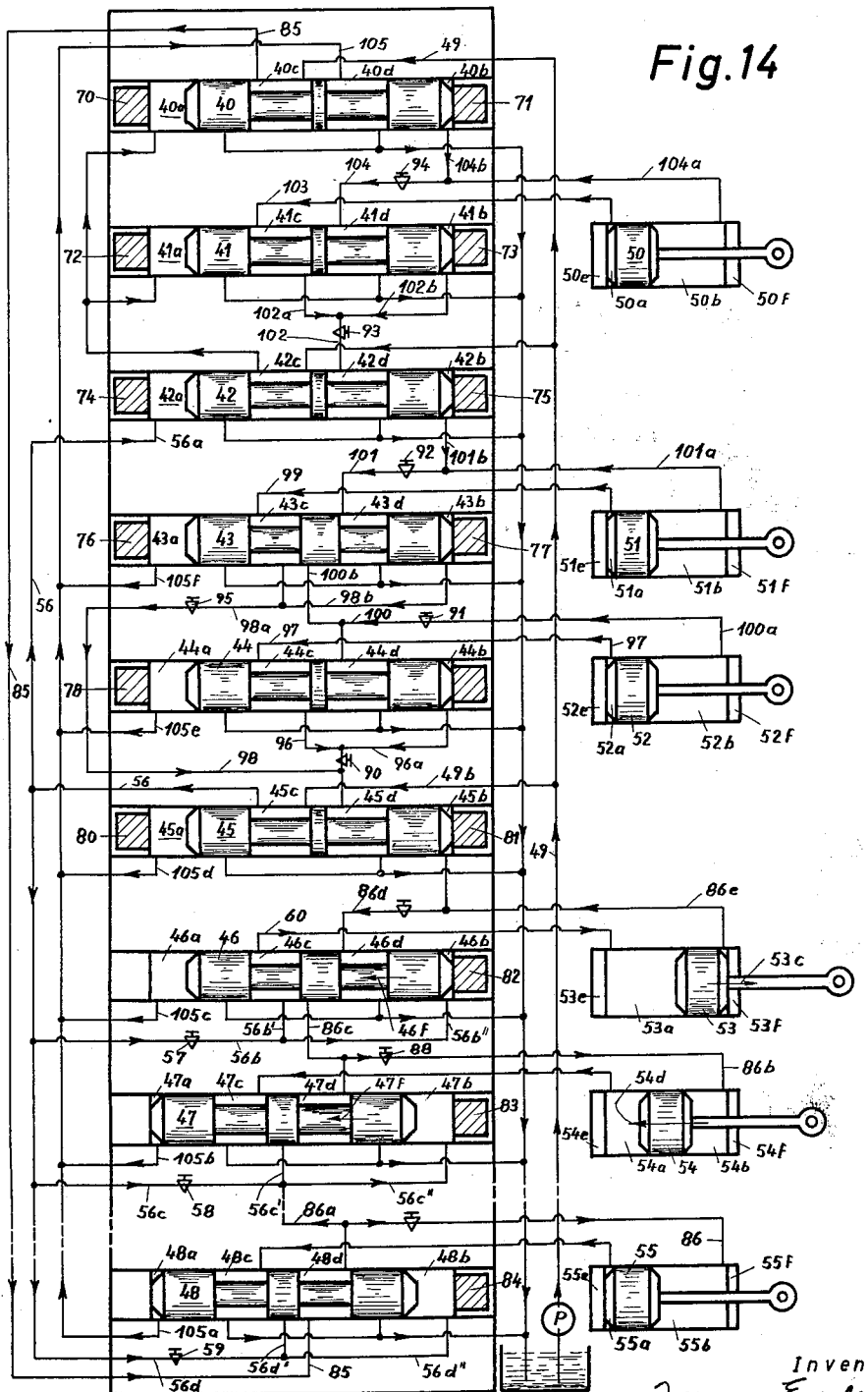

FIG. 14 shows the moment at which the motor piston 54 has reached its end position 54f already and the time delay valve 47 had been pulled away from the permanent magnet 83 holding it and moved in the direction of arrow 47f by the oil pressure prevailing in duct 56c" and in space 47b. After the time delay valve 47 has been moved, the cylinder space 54b of the motor 54 is connected to the pressure duct 86a via the switching chamber 47d and duct 86b. Thus the piston of the motor 54 is returned in the direction of arrow 54d. During this time the piston of the motor 53 continues to move in the direction of arrow 53c until it reaches its limit stop 53f. The now increasing oil pressure in duct 46b" and within the area 46b causes the time delay valve 46 to be pulled away from the permanent magnet 82 and moved in the direction of arrow 46f.

Figure 15:
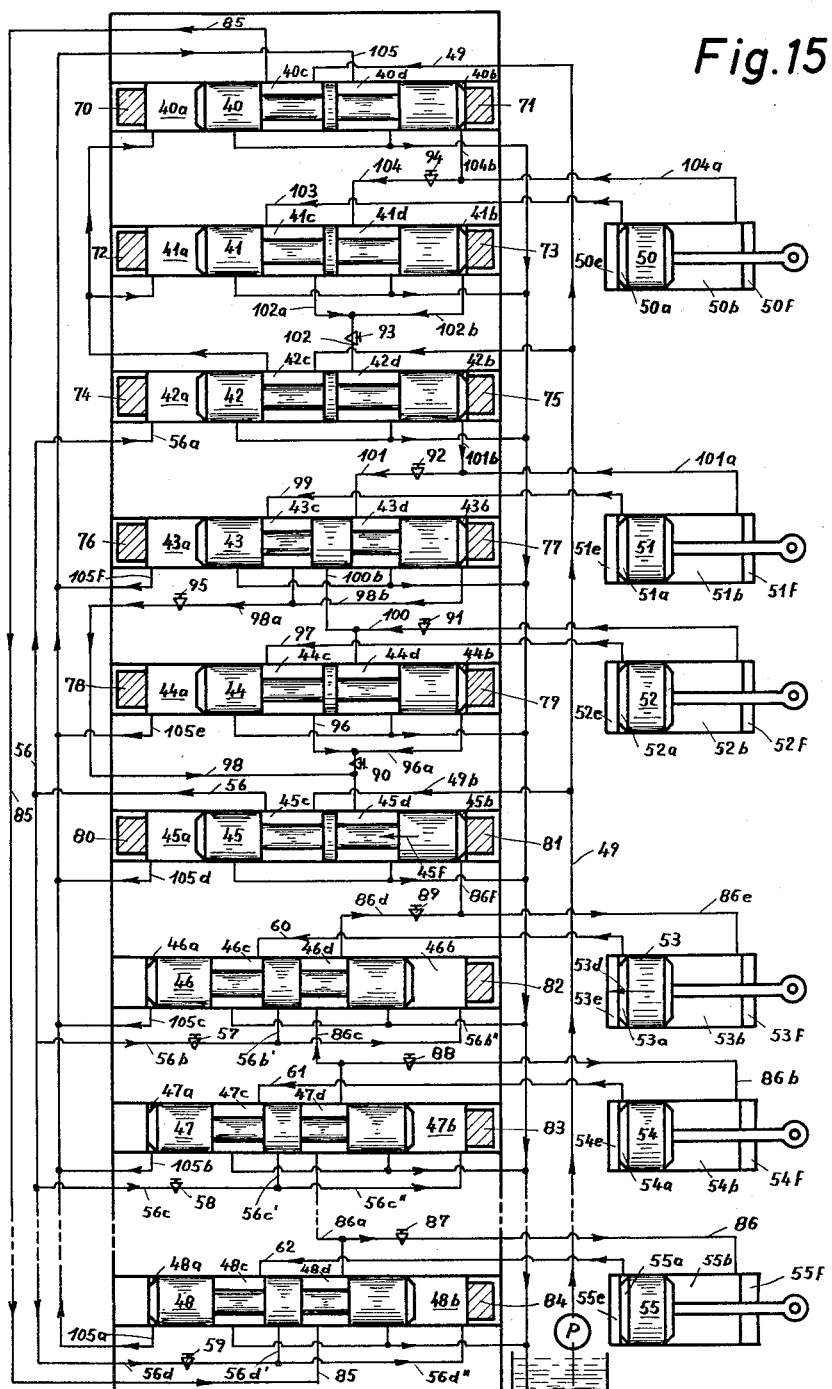

FIG. 15 shows the moment at which the piston of the motor 53 has been returned in the direction of arrow 53d to its original position. Due to the now increasing oil pressure in duct 86f the alternating valve 45 is pulled away from the permanent magnet 81 holding it and moved in the direction of arrow 45f.

Figure 16:
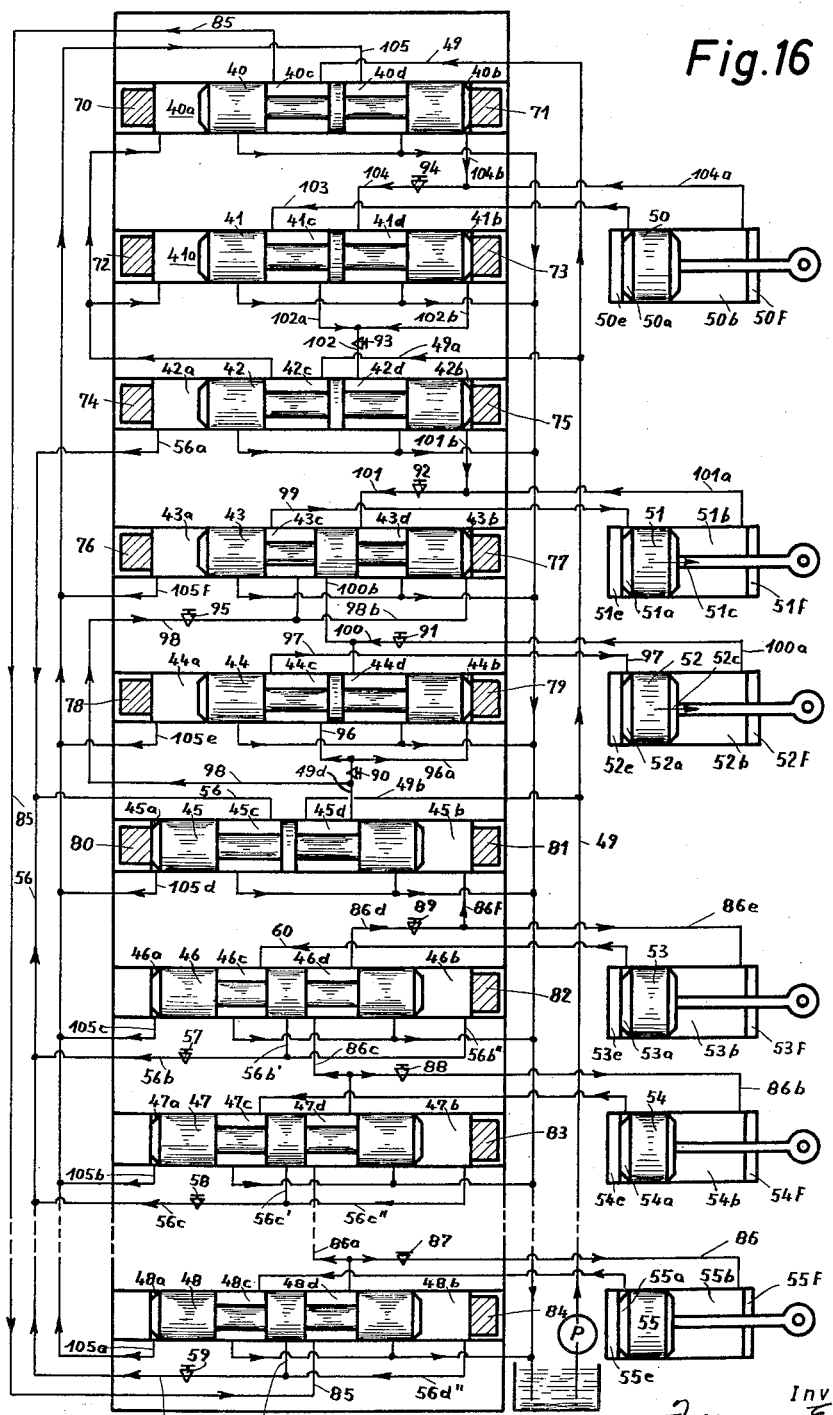

FIG. 16 shows the moment at which the alternating valve 45 has finished the operating program of the first cycle associated therewith. Pressure oil is now being fed to cylinder space 52a of the motor 52 via the switching chamber 45d, pressure duct 49d, timing or throttle valve 90, duct 96, switching chamber 44c of the control valve 44 and duct 97, moving the piston of the motor 52 in the direction of arrow 52c. On the other hand pressure oil is being fed to the cylinder space 51a of the motor 51 via duct 98, switching chamber 43c of the time delay valve 43 and duct 99. The piston of the motor 51 is thus moved in the direction of arrow 51c.

Figure 17:
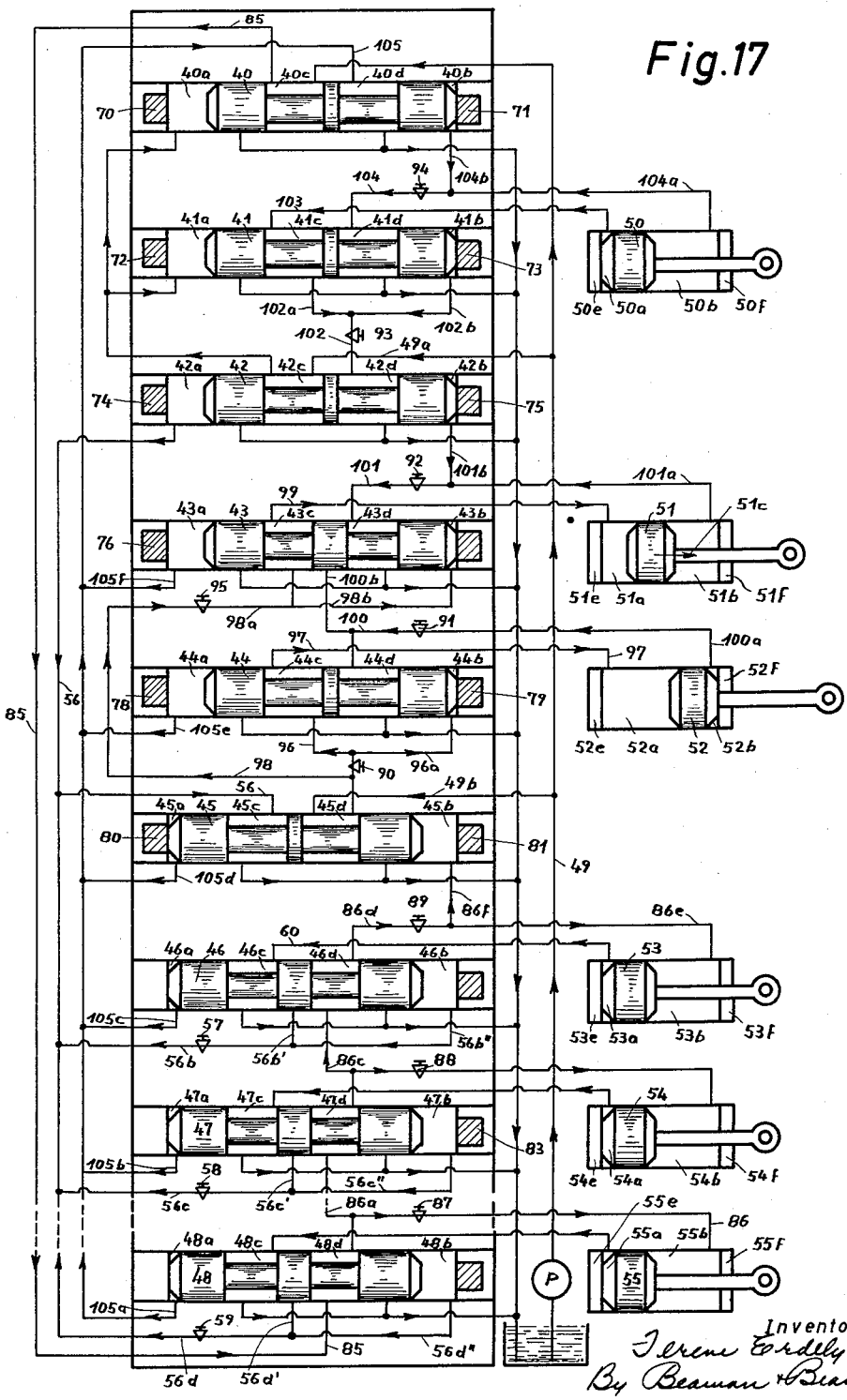

FIG. 17 shows the moment at which the piston of the motor 52 has reached the fixed limit stop 52f. Due to the now rising oil pressure in duct 96a the control valve 44 is pulled away from the permanent magnet 79 and moved to the other side. In the meantime the piston of the motor 51 continues to move in the direction of arrow 51c.

Figure 18:
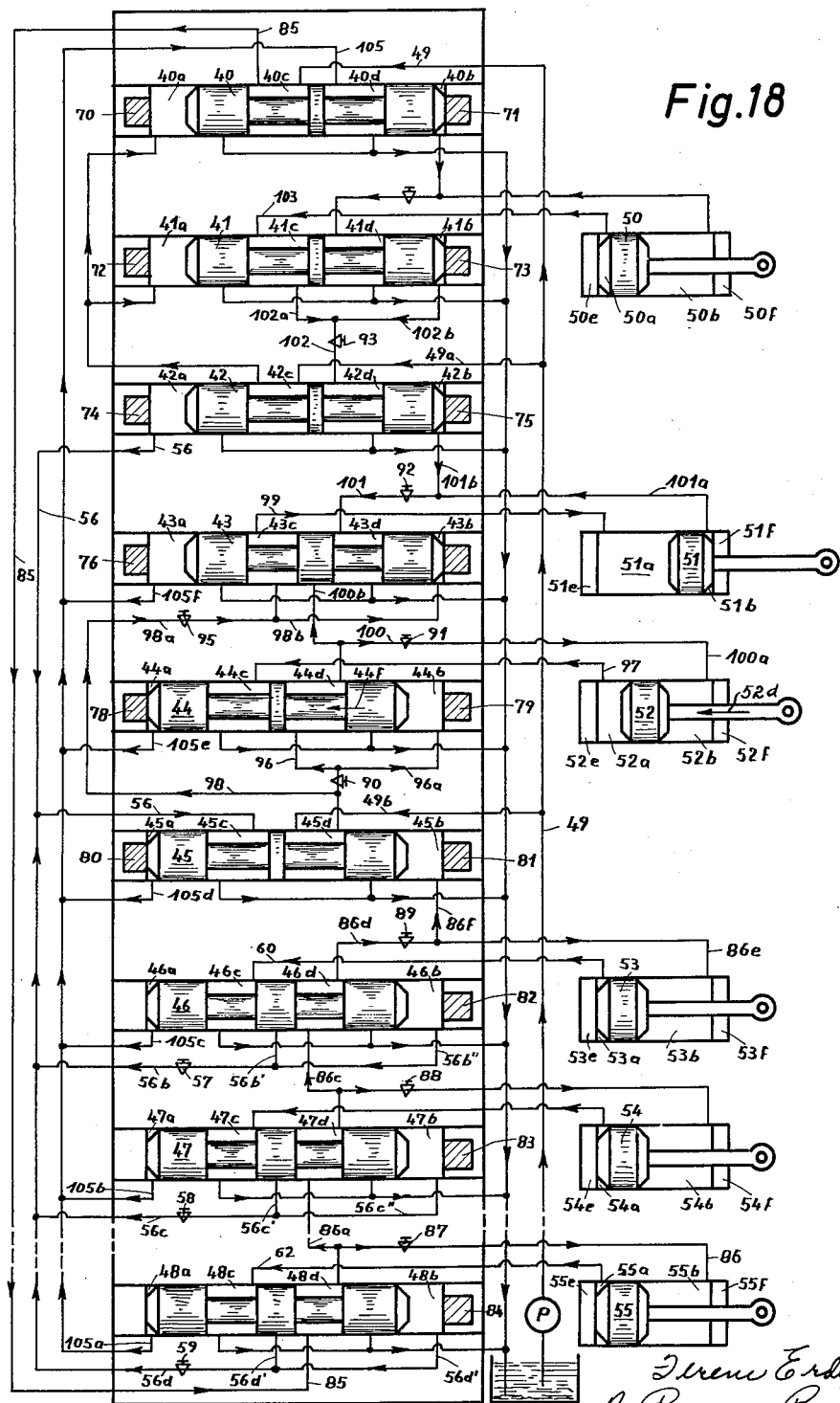

FIG. 18 shows the moment at which the control valve 44 has been pulled away from the permanent magnet 79 and moved in the direction of arrow 44f. In this position the duct 96 is connected with the duct 100, throttle valve 91, and duct 100a, via the switching chamber 44d of the control valve 44. Pressure oil is thus fed to the cylinder space 52b of the motor 52 causing the piston to move in the direction of arrow 52d and to return to its original position. In the meantime, the piston of the motor 51 continues to move in the direction towards its limit stop 51f.

Figure 19:
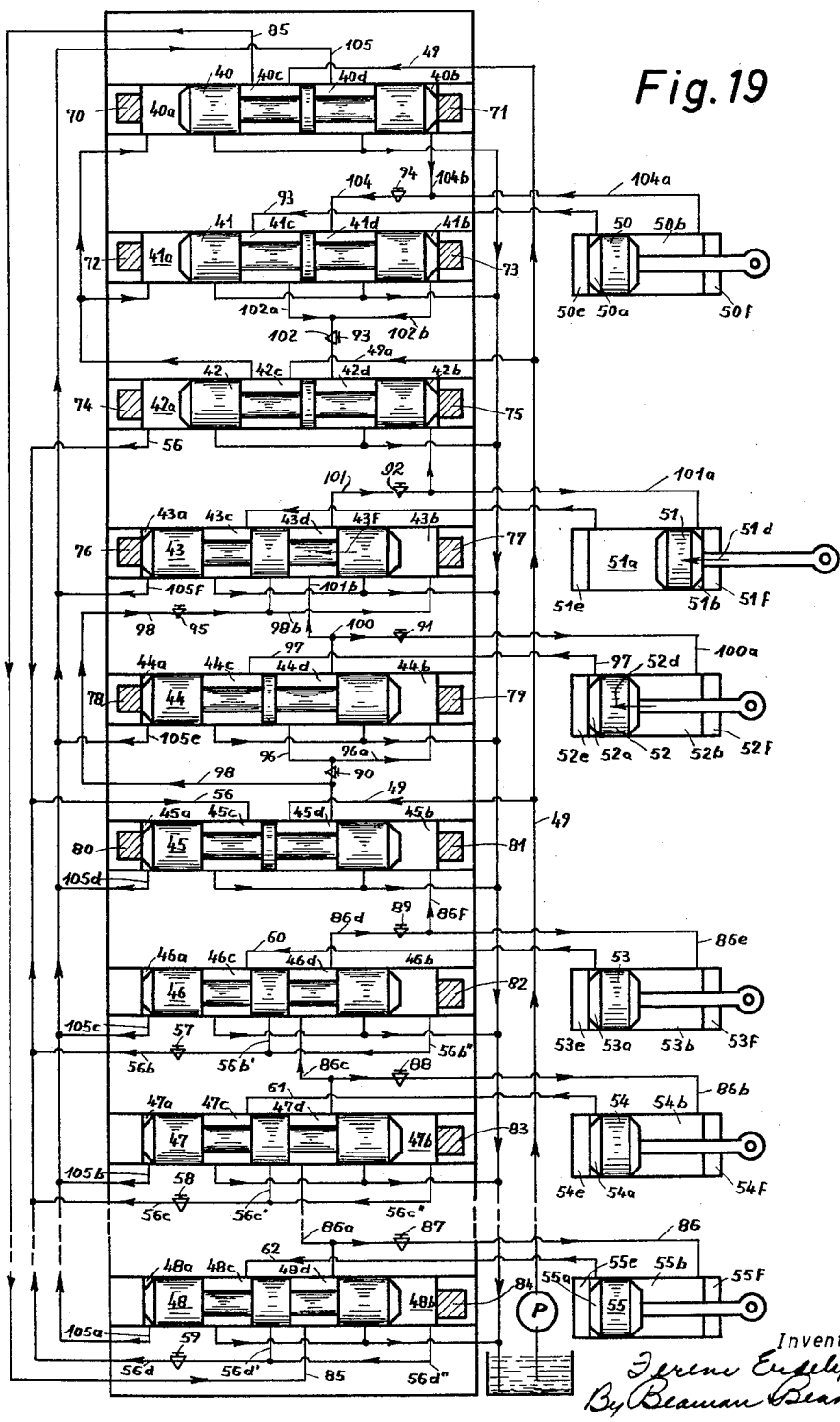

FIG. 19 shows the moment at which the tme delay valve 43 is pulled away from the permanent magnet 77 holding it and moved in the direction of arrow 43f. Thereupon, the ducts 100b, 101 and 101a are connected via the switching chamber 43d and throttle valve 92. Pressure oil is thus fed to the cylinder space 51b causing the piston of the motor 51 to move back to its original position against 51e. At the same time a connection is made to the area 42b of the alternating valve 42, but the oil pressure is not yet sufficient to pull the piston of the alternating valve 42 away from the permanent magnet 75 holding it.

Figure 20:
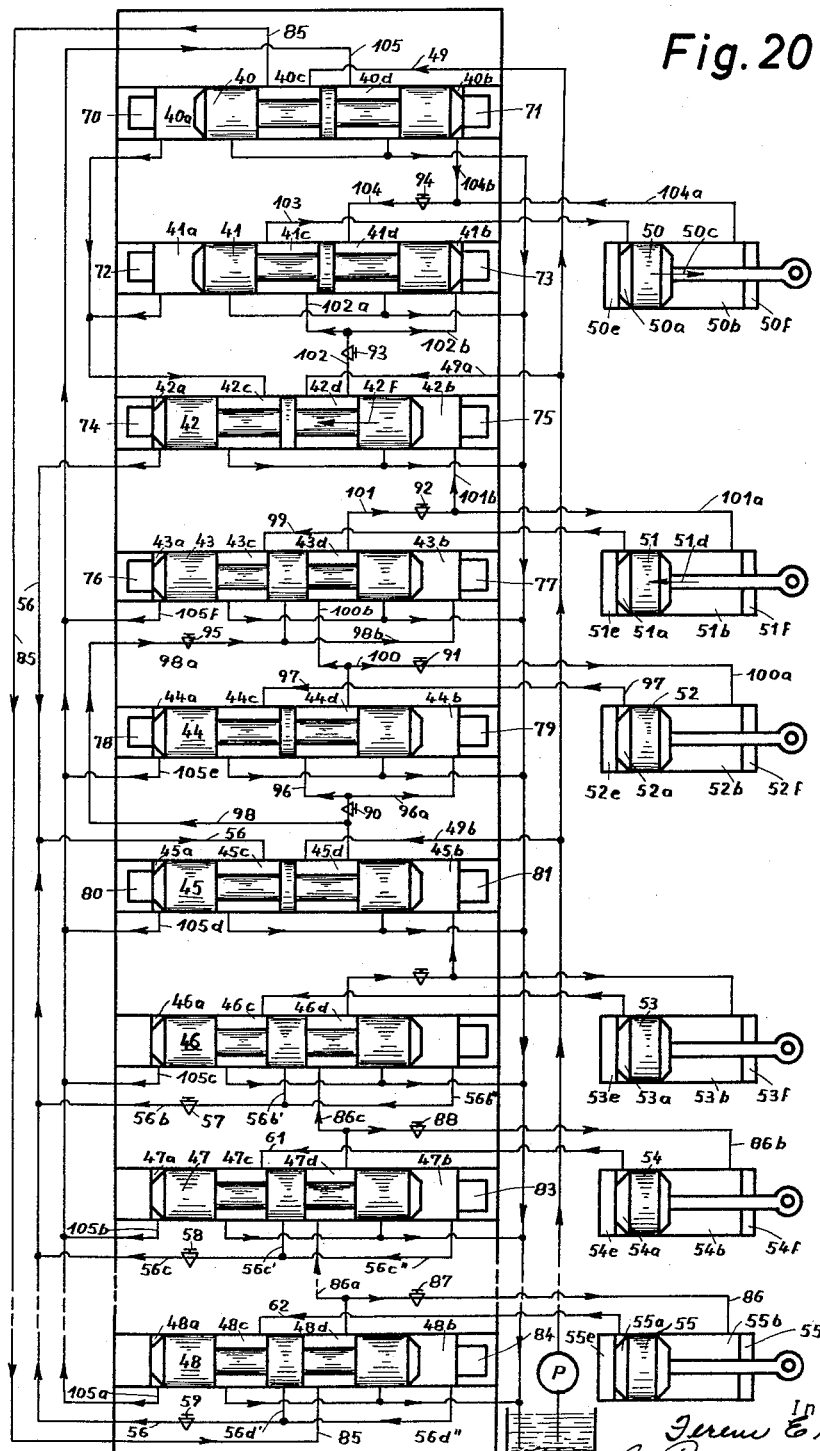

FIG. 20 shows the moment at which the piston of the motor 51 has reached its original position against 51e. Due to the now rising oil pressure the alternating valve 42 will be pulled away from its magnet 75 and moved in the direction of arrow 42f. In this position pressure oil is fed to the cylinder space 50a of the motor 50 via the switching chamber 42d, duct 49a, throttle valve 93, duct 102a, switching chamber 41c of the control valve 41, and duct 103, moving the piston of the motor 50 in the direction of arrow 50c. At the same time a connection is made to the space 41b of the control valve 41 which is held stationary by its permanent magnet 73.

Figure 21:
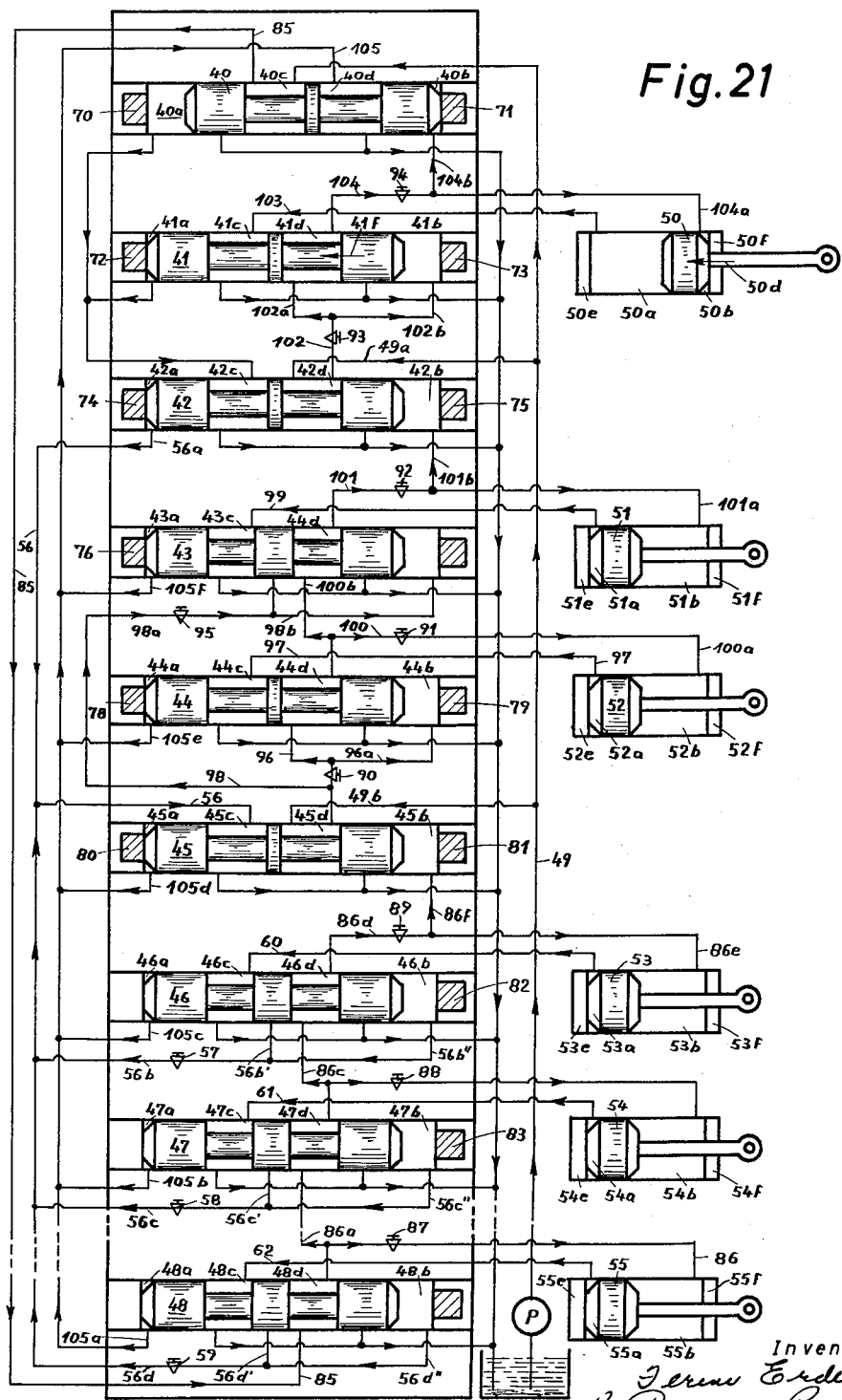

FIG. 21 shows the positions of control elements at the moment at which the piston of the motor 50 has reached its limit stop 50f and the rising oil pressure in duct 102b has pulled the control valve 41 away from its permanent magnet 73 to move it in the direction of arrow 41f. Thereupon, oil may flow via the pressure duct 49a, switching chamber 42d, duct 102, throttle valve 93, duct 102a, switching chamber 41d to duct 104, throttle valve 94 and duct 104a. Pressure oil is thus fed to the cylinder space 50b of the motor 50 moving its piston back to the original position.

Figure 22:
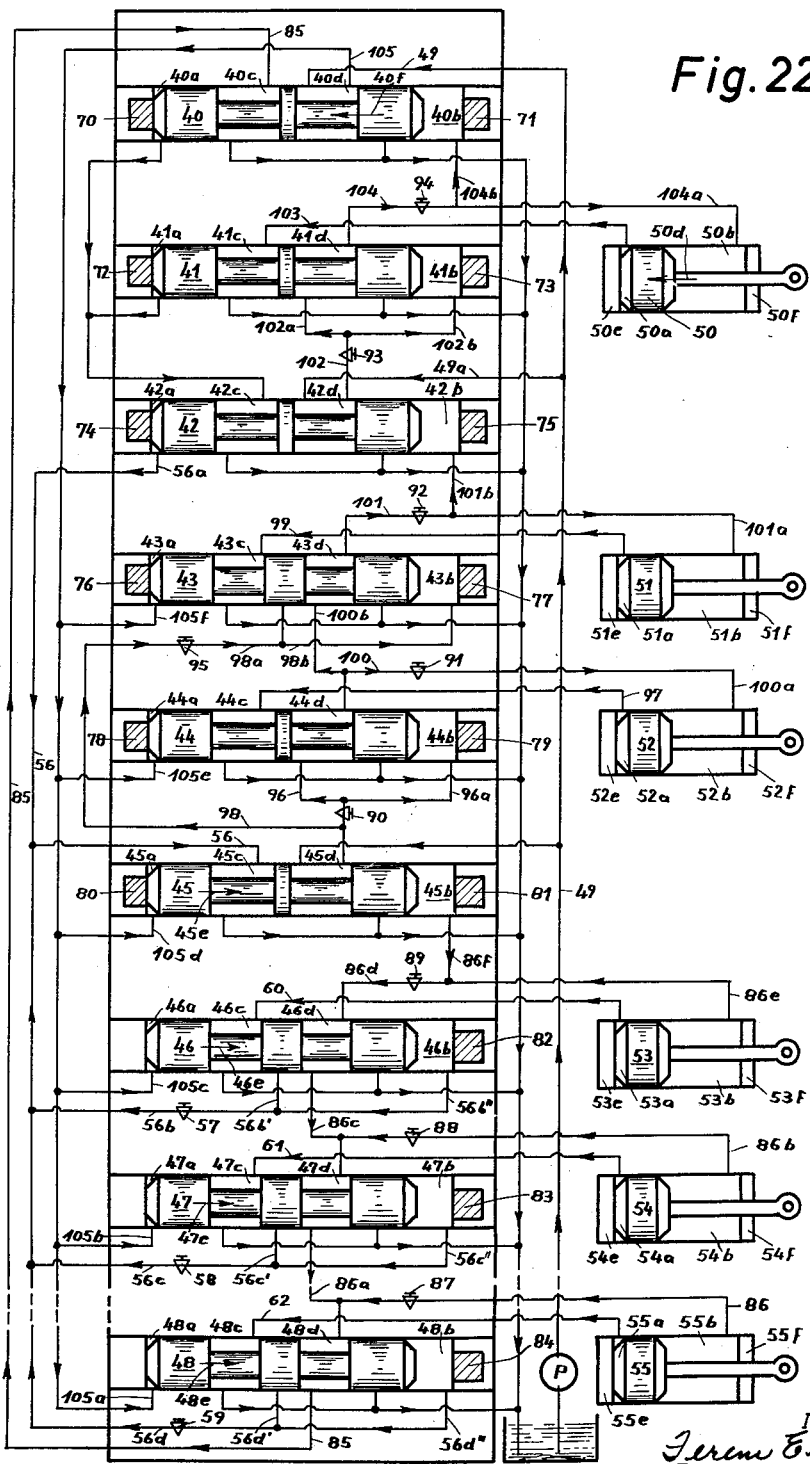

FIG. 22 shows the position of the control elements at the moment at which the piston of the motor 50 has reached its limit stop 50e and the rising oil pressure in duct 104b pulls the alternating valve 40 away from the permanent magnet 71 holding it to move it in the direction of arrow 40f. Thereby the distributing duct 105 is connected with the pressure duct 49 via the switching chamber 40d. The reduced oil pressure in duct 105 causes, via the ducts 105a, 105b and 105c, the time delay valves 48, 47 and 46, which are not held by magnets, to be moved in the directions indicated by arrows 48e, 47e and 46e. Thereupon the pressure in duct 105 increases and the alternating valve 45 is pulled away from the permanent magnet 80 holding it and moved in the direction of arrow 45e.

Figure 23:
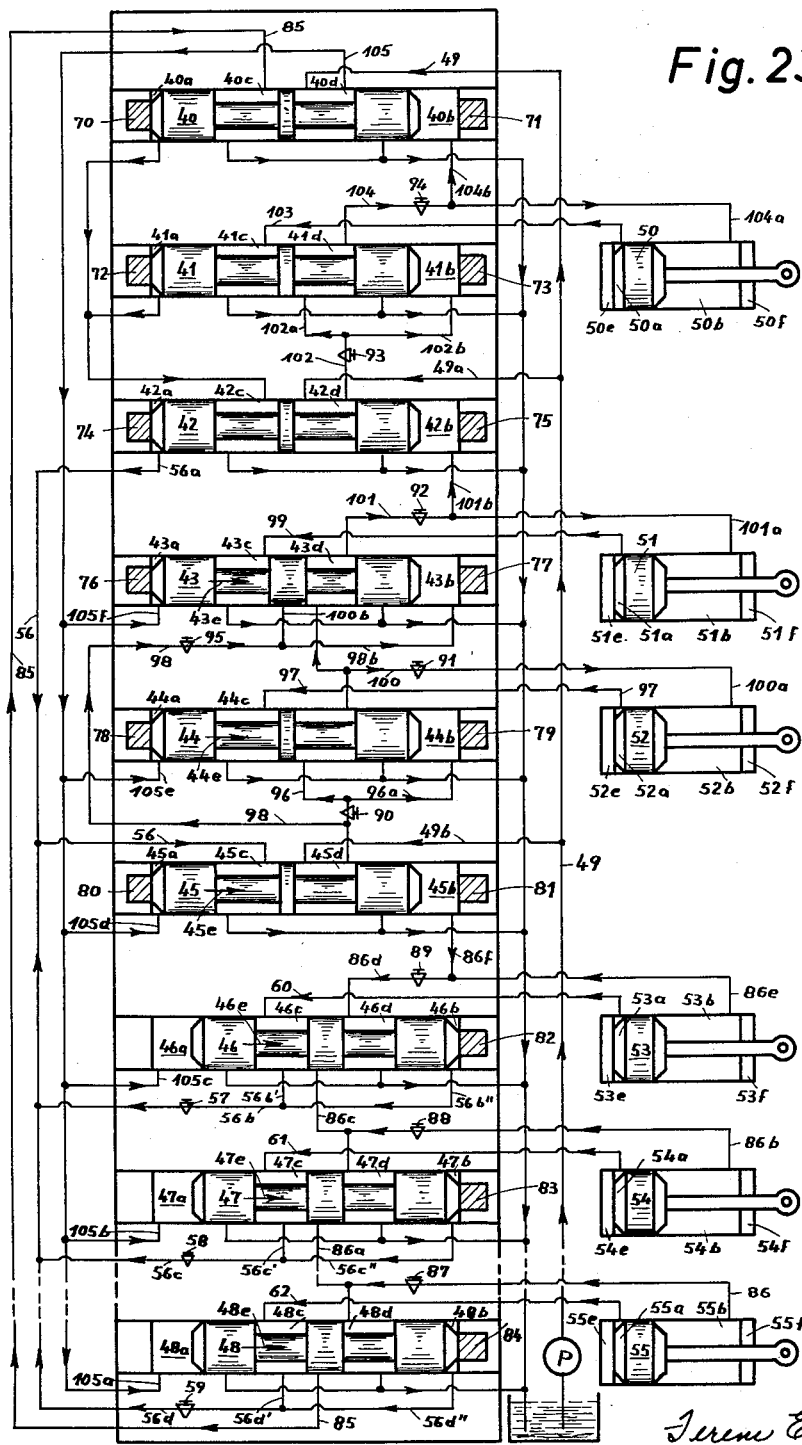

FIG. 23 shows the position of the control elements at the moment at which the time delay valves 46, 47 and 48 have been moved in the directions indicated by arrows 46e, 47e and 48e. The pressure of the oil will now increase in the distributing duct 105 and pull the control valve 45 away from its permanent magnet 80 and move it in the direction of arrow 45e. Thereupon, the time delay valve 43 and the alternating valve 44 are pulled away from their permanent magnets 76 and 78, respectively, and moved in the directions of arrows 43e and 44e. Thus, the operating program of the operating cycles linked together is finished and a new operating program may be started.

Entirely different presuppositions are required by the control program according to FIGS. 24 to 35. For a better understanding, this control program has only been provided with two intimately interconnected control circuits each of them comprising three operating stations transversely controlled by each other as employed in a turret-type machine tool.

Figure 24:
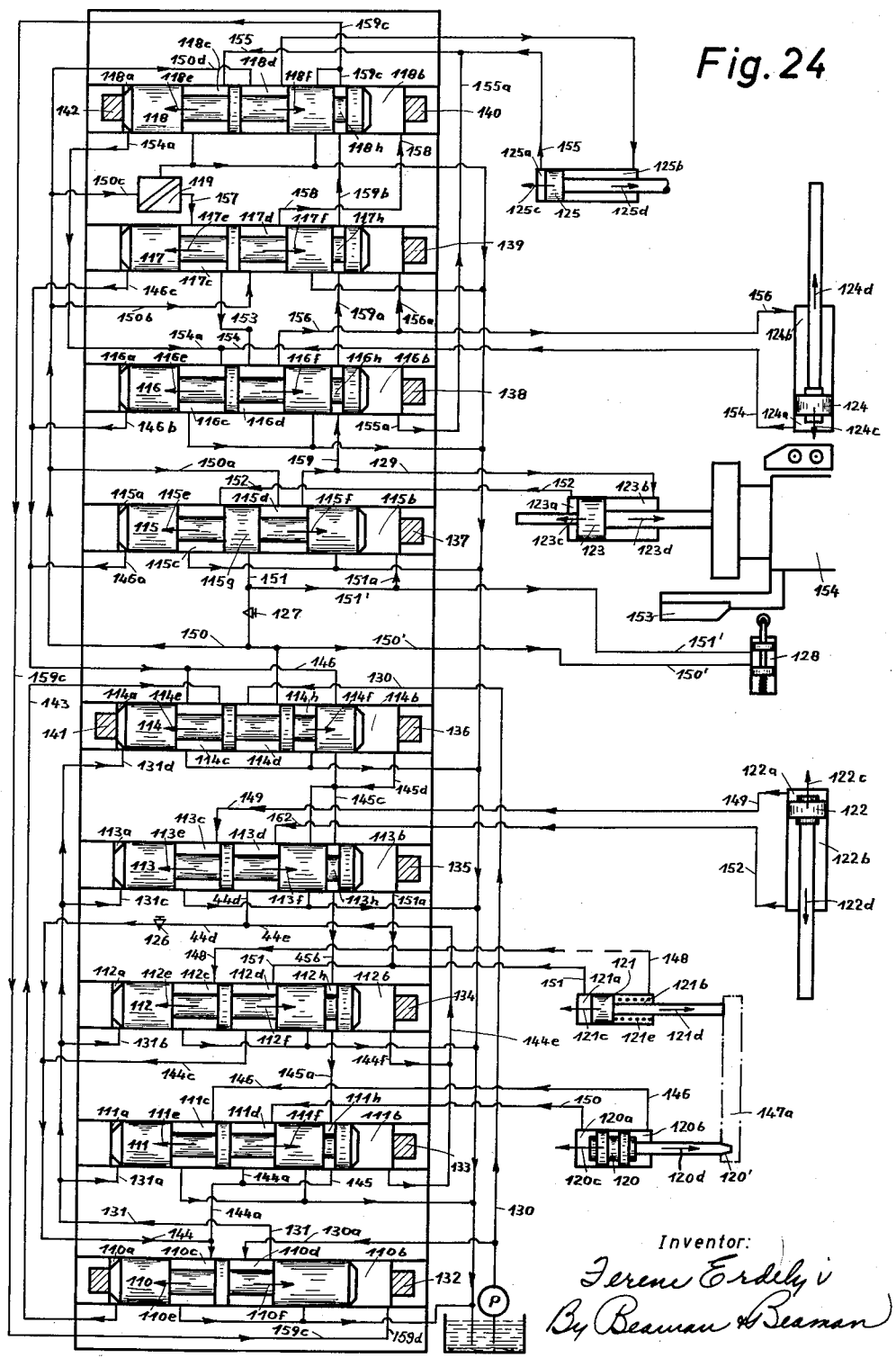

FIG. 24 shows the positions of the control elements at the moment at which the pump P supplies pressure oil which is fed via the duct 130, switching chamber 114d, ducts 150 and 150a, switching chamber 115d, duct 129, impulse channels 159a, 159b, 159c and 159d, to the area 110b of the control valve 110 causing it to move in the direction of arrow 110e. Thereby a connection is open between the switching chamber 110d and the pressure duct 130a. In this manner the starting impulse may be transmitted via the distributing ducts 131a, 131b, 131c and 131d. By pressurizing these distributing ducts, the time delay valves 111, 112 and 113 are initially moved in their respective directions indicated by arrows 111f, 112f and 113f. Thereupon the control valve which is held by the permanent magnet 114 is pulled away and moved in the direction of arrow 114f.

Figure 25:
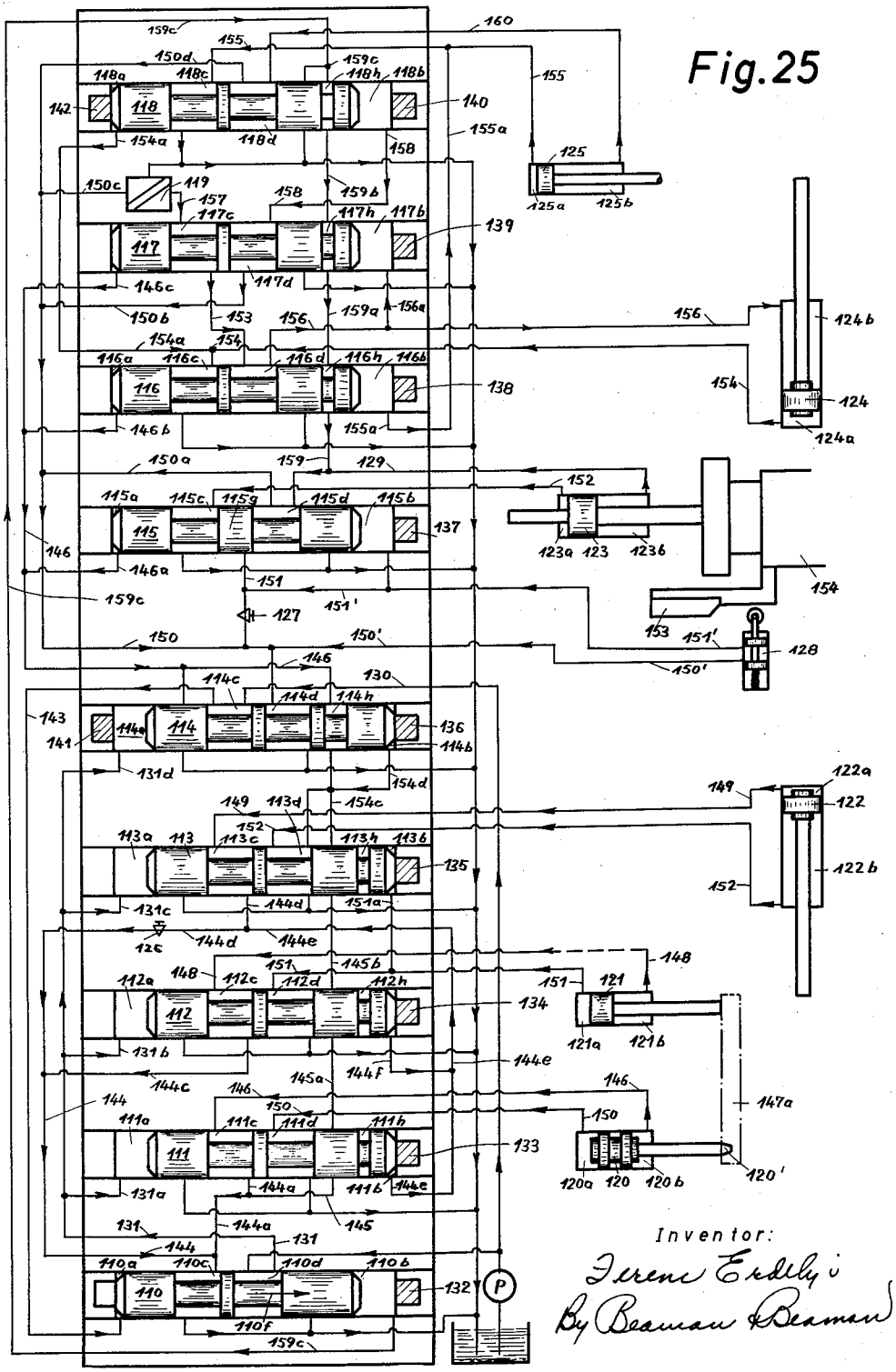

FIG. 25 shows the moment at which the control valve 114 is initiating the control of the second "circuit" and transmitting the starting impulse by connecting the pressure duct 130 wtih a switching duct 143 via the switching chamber 114c. Thereby the space 110a of the control valve 110 is pressurized moving the valve piston in the direction of arrow 110f. Therefore, it will be evident that the pistons of the motors 120, 121, 122 are only relieved of pressure during the switching time (approximately 1/10 of a second) and are directly pressurized again.

Figure 26:
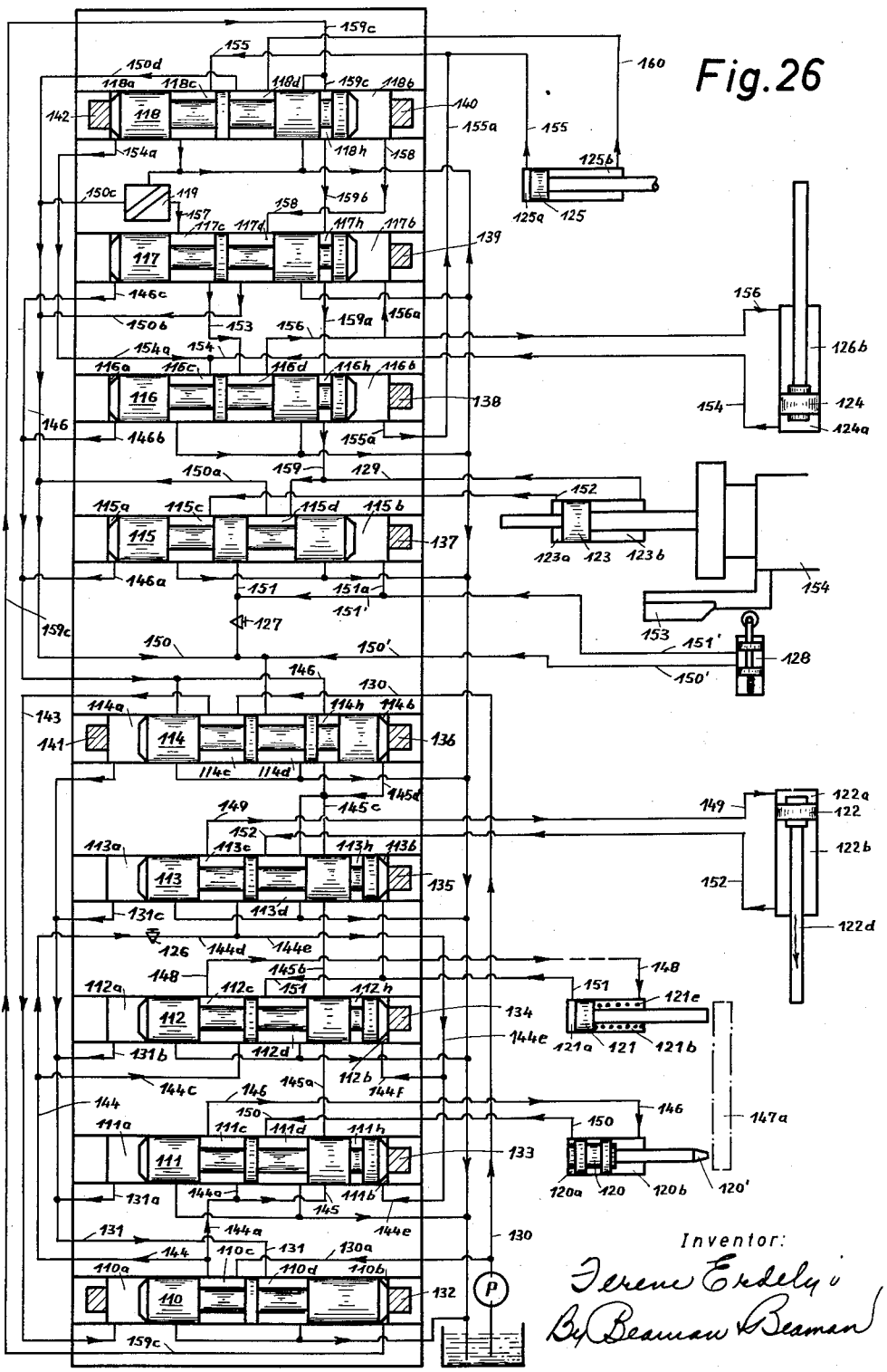

FIG. 26 shows the moment at which the switching chamber 110c of the control valve 110 has connected the pressure duct 130a with the distributing ducts 144, 144a, 144c, throttle valve 126, and ducts 144d, 144e and 144f. On the one hand the cylinder area 120b of the motor 120 for operating the indexing means 120′ is pressurized by the duct 144a via the switching chamber 111c and the duct 146. In this manner the index 120′ is moved in the direction 120c, whereby the indexing disc 147a of the revolving head is unlocked. On the other hand the cylinder area 121b of the clamping piston 121 is pressurized by the pressure duct 144c via the switching chamber 112c and duct 148 so that the braking action of the clamping piston is released. At the same time the cylinder space 122a of the motor 122 for returning the turret head is pressurized by the duct 144d via the switching chamber 113c and the duct 149 to move the piston of the motor 122 in the direction of arrow 122d. Thereby the revolving head of the turret is turned, for example, about 90°, 120° or 180° depending on the number of collets of the machine.

The time delay valves 111 and 112 are pressurized by the duct extensions 144e or 144f, respectively. However the oil pressure reduced by the throttle valve 126 is not sufficient to pull the time delay valve away from their holding magnets 133 and 134, respectively.

Figure 27:
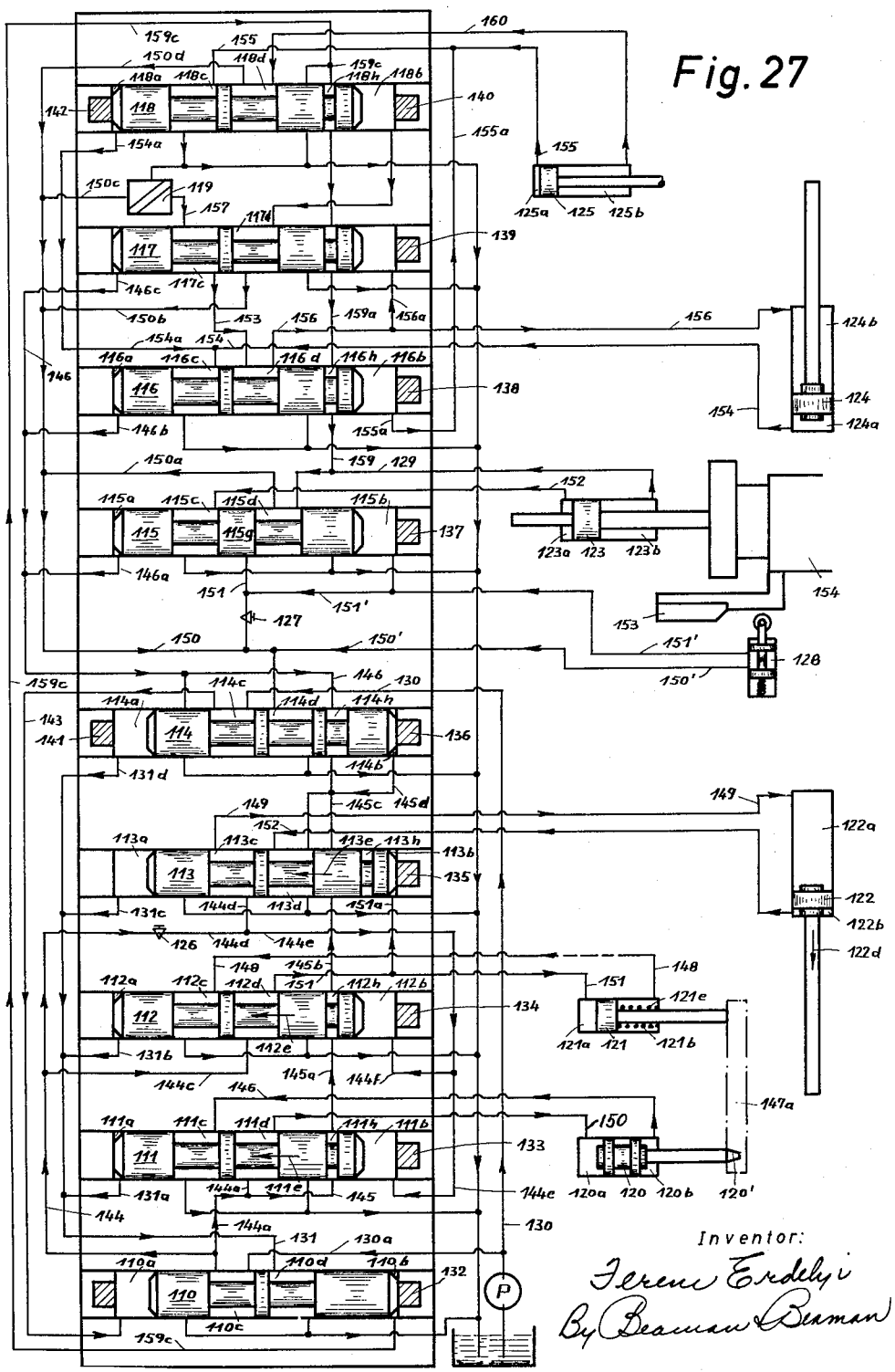

FIG. 27 shows the position of the control elements at that moment at which the operating piston 122 of the revolving head has been moved to any suitable limit stop in the direction of arrow 122d, whereby the pressure of the oil in the ducts 144e and 144f attains the same pressure as that in the duct 144. Now the time delay valves 111 and 112 are pulled away from their holding magnets 133 and 134 and moved in the directions of arrows 111e or 112e, respectively. Thereby, on the one hand, pressure oil is fed to the cylinder space 120a of the motor 120 via the duct 130a, switching chamber 110c, duct 144a, switching chamber 111d and duct 150. Thus the indexing disc 147a of the revolving turret head is locked by the index bolt 120′ in the desired position. Simultaneously, the cylinder space 121a of the motor 121 clamping the indexing disc 147a and the turret head together to prevent vibrations is pressurized via the duct 144c, switching chamber 112d and duct 151. Immediately after the piston of the motor 121 abuts the indexing disc 147a the oil pressure in the chamber 113b of the time delay valve 113 will increase causing the time delay valve 113 to be pulled away from its holding permanent magnet 135 and moved in the direction of arrow 113e.

Figure 28:
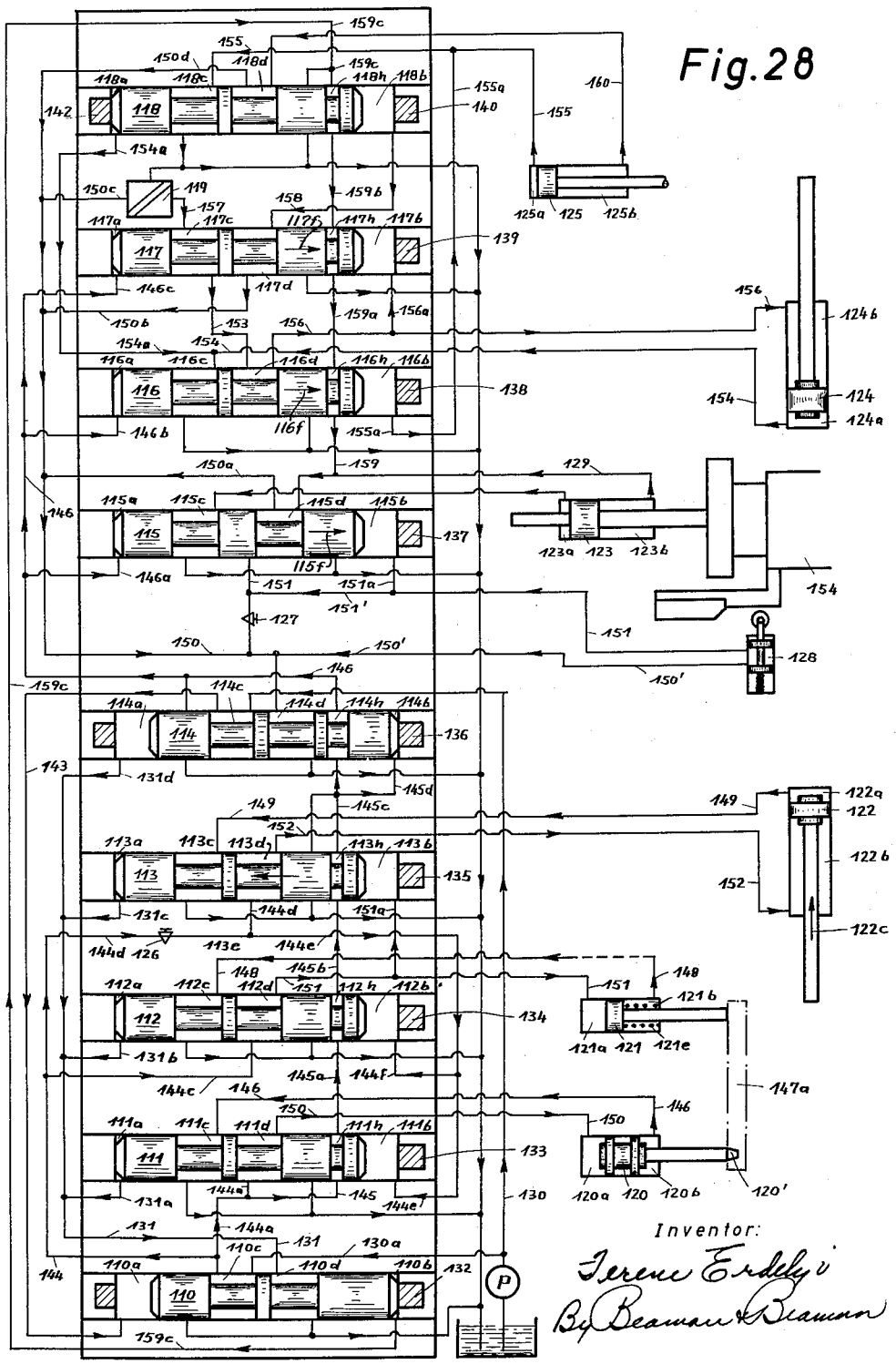

FIG. 28 shows the moment at which the time delay valve 113 has been moved in the direction 113e, thereby on the one hand pressurizing the cylinder space 122b of the motor 122, turning the turret head via the duct 144d, switching chamber 113d of the time delay valve 113 and duct 152, thus moving the piston of the motor 122 back to its original position in the direction of arrow 122c. On the other hand, the impulse channel 145 is connected with the distributing duct 146 via duct 144a, ducts 145a, 145b and 145c, switching chambers 111h, 112h, 113h and 114h. Thereby the areas 115a, 116a and 117a of the control valve 115 and the time delay valves 116 and 117 are pressurized moving them in the directions 115f, 116f and 117f, respectively.

Figure 29:
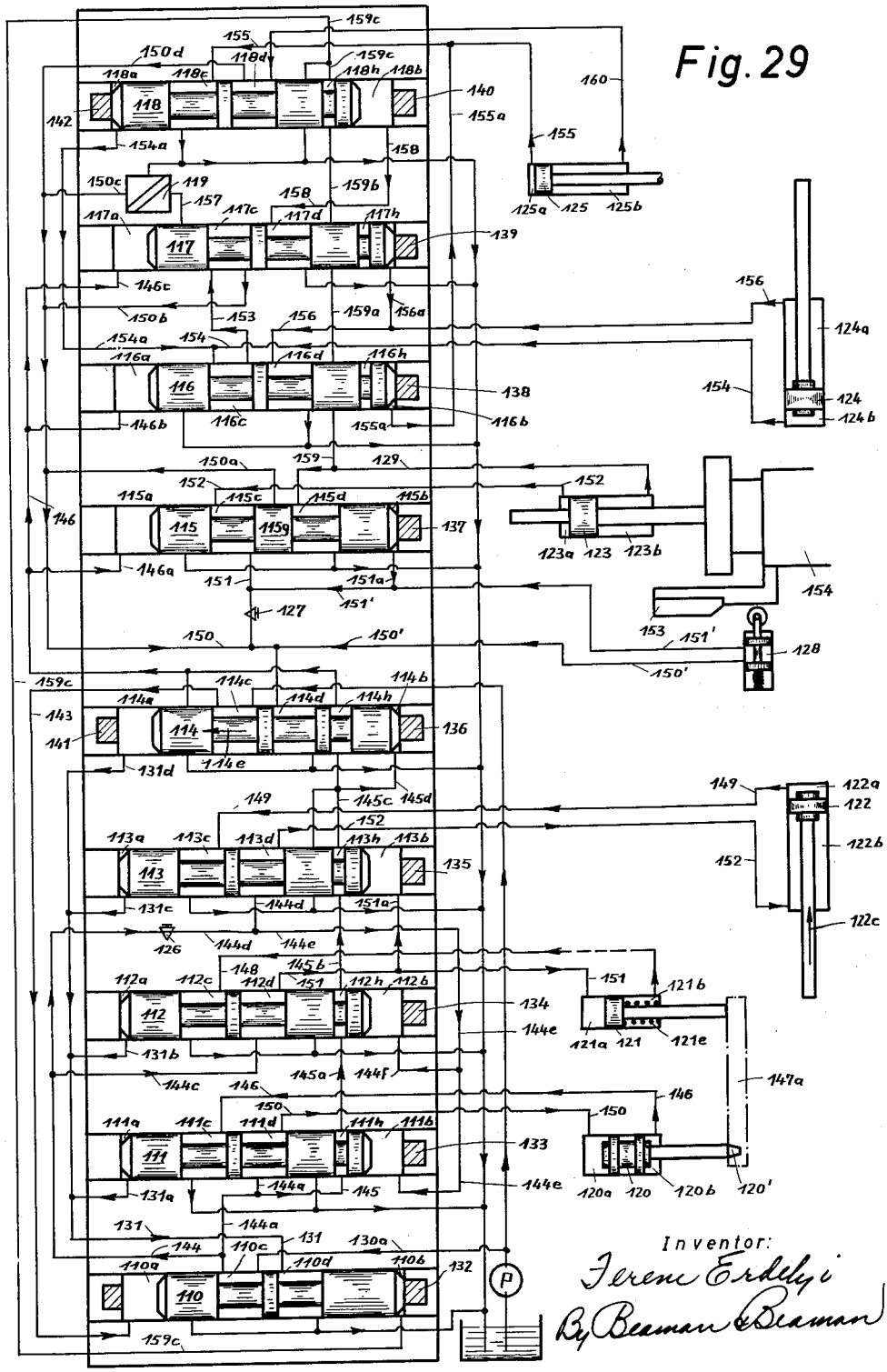

FIG. 29 shows the moment at which the control valve 115 and the time delay valves 116 and 117 have been moved to their new positions. Thereby, the motors 123 and 124 are, for a few hundredths of a second, relieved of pressure. Immediately after the motors 123 and 124 have been moved, the pressure in the duct 145d increases causing the alternating valve 114 to be pulled away from its holding permanent magnet 136 and moved in the direction of arrow 114e.

Figure 30:
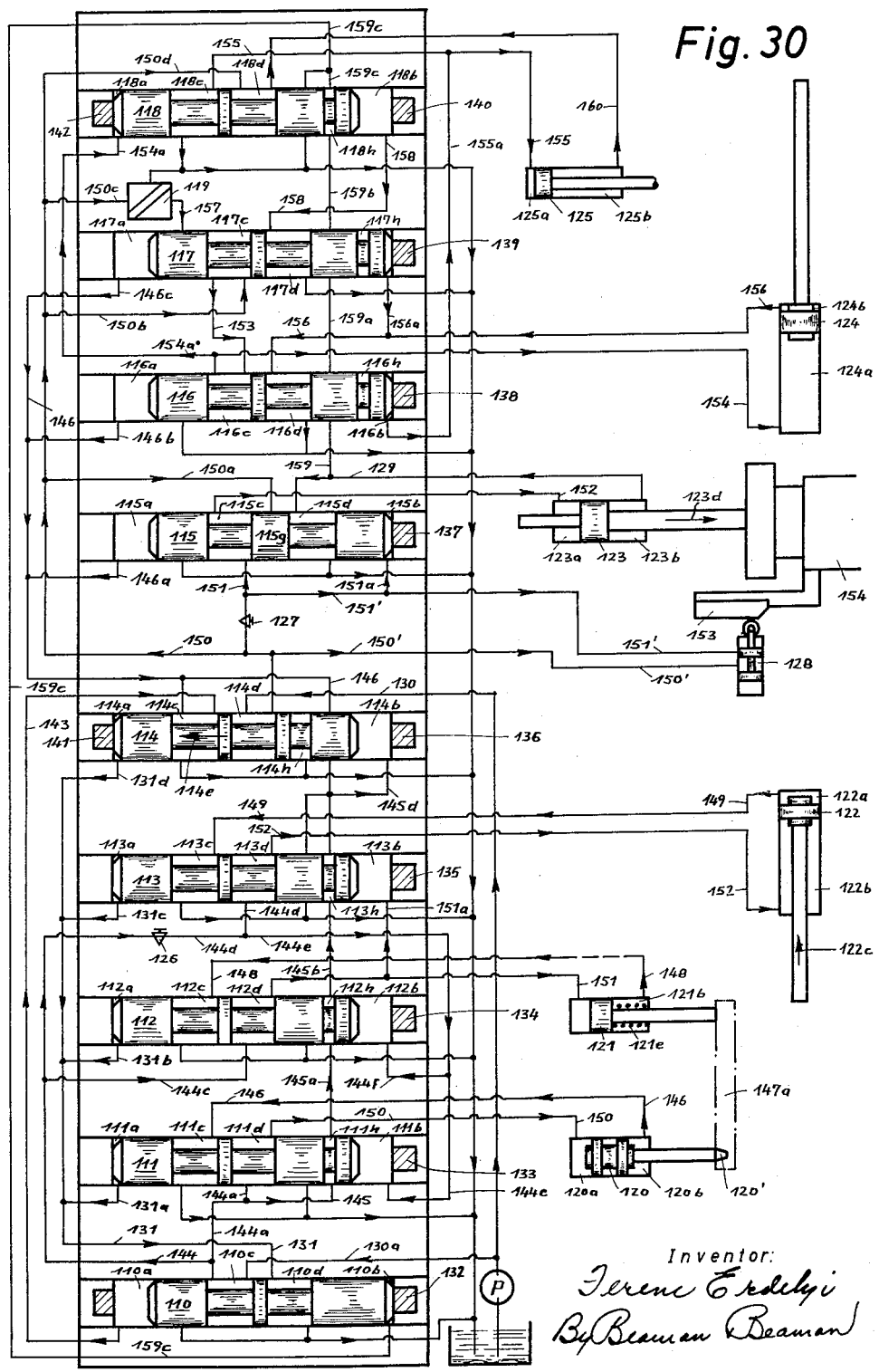

FIG. 30 shows the moment at which the alternating valve 114 has been moved in the direction of arrow 114e. Thereby, on the one hand, the pressure duct 130 is connected with the distributing ducts 150, 150′, 150a, 150b, 150c and 150d via the switching chamber 114d of the alternating valve 114. Thus, the cylinder space 123a of the advance motor 123 is pressurized, on the one hand, via the throttle valve 127 and, on the other hand, by the rapid motion valve 128, the duct 151, the switching chamber 115c and the duct 152. The piston of the advance motor 123 is moved in the direction of arrow 123d with "rapid motion." The duct 150a which is not throttled is at the time being blocked by the land 115g of the slide piston of the alternating valve 115. The moment the actuating cam 153, which is connected with or taken along by the piston of the advance motor 123, has moved the rapid motion valve 128 to its blocking position, the connection between duct 150′ and 151′ is closed so that the oil from duct 150 can only flow through the throttle valve 127 continuing to move the machine slide 154, according to the set rate of advance.

Figure 31:
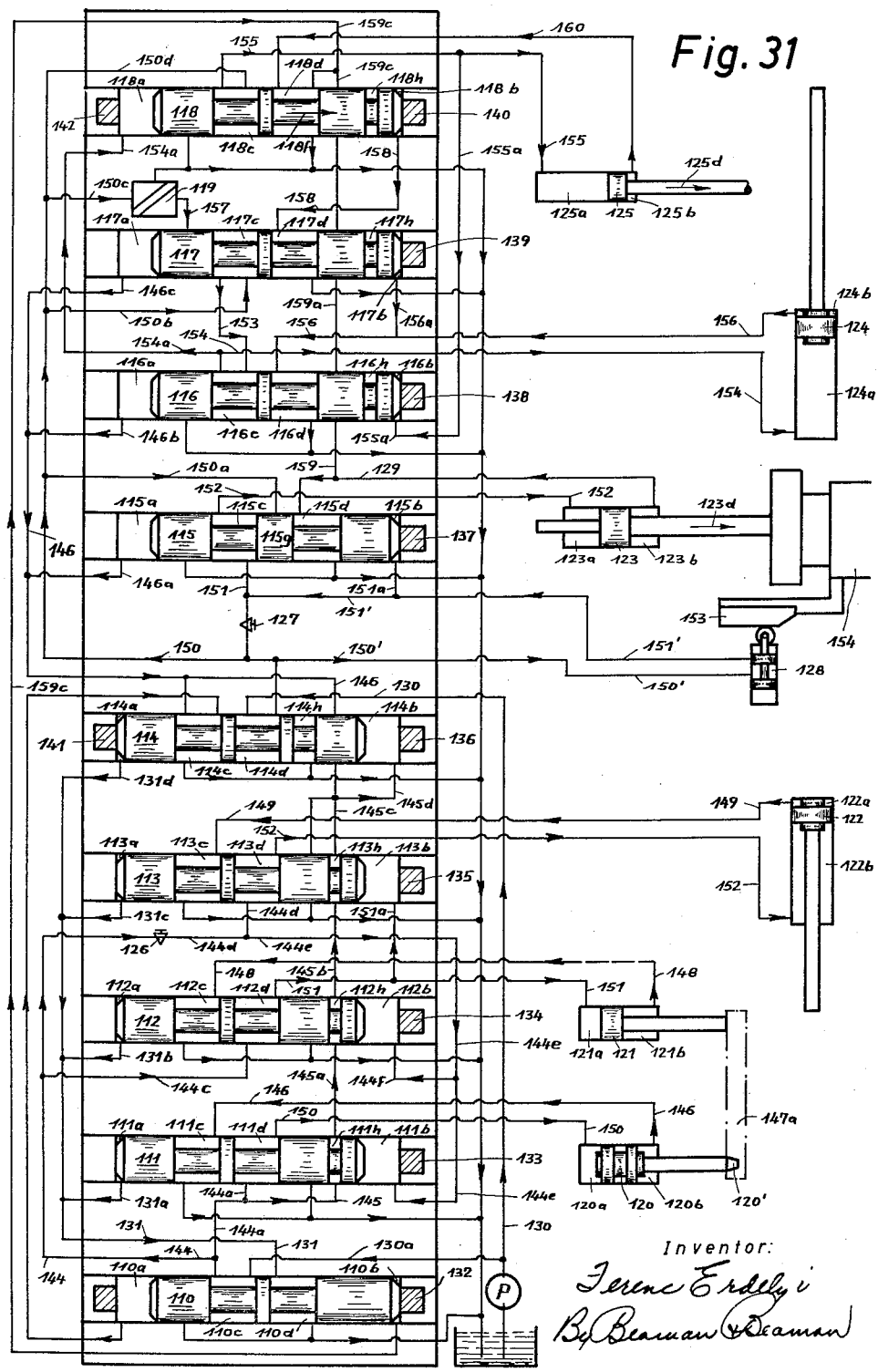

FIG. 31 shows the moment at which the second chucking station of the revolving head is unloading during the machining operation, whereupon it will be supplied with a new workpiece. For clamping the new workpiece, first the cylinder space 124a of the clamping piston 124 is pressurized via the duct 150b, switching chamber 117c of the time delay valve 117, duct 153, switching chamber 116c of the time delay valve 116 and duct 154, for releasing the collet, not shown. After the clamping piston is stopped by an abutment, the oil pressure in duct 154a and also in the communicating cylinder space 118a of the alternating valve piston 118, will increase breaking the latter away from its holding permanent magnet 142 and moving it in the direction of arrow 118f. Thereby, the cylinder space 125a of the feeder piston 125 is pressurized via the duct 150d, the switching chamber 118c, and duct 155, moving the feeder piston 125 in the direction 125d.

Figure 32:
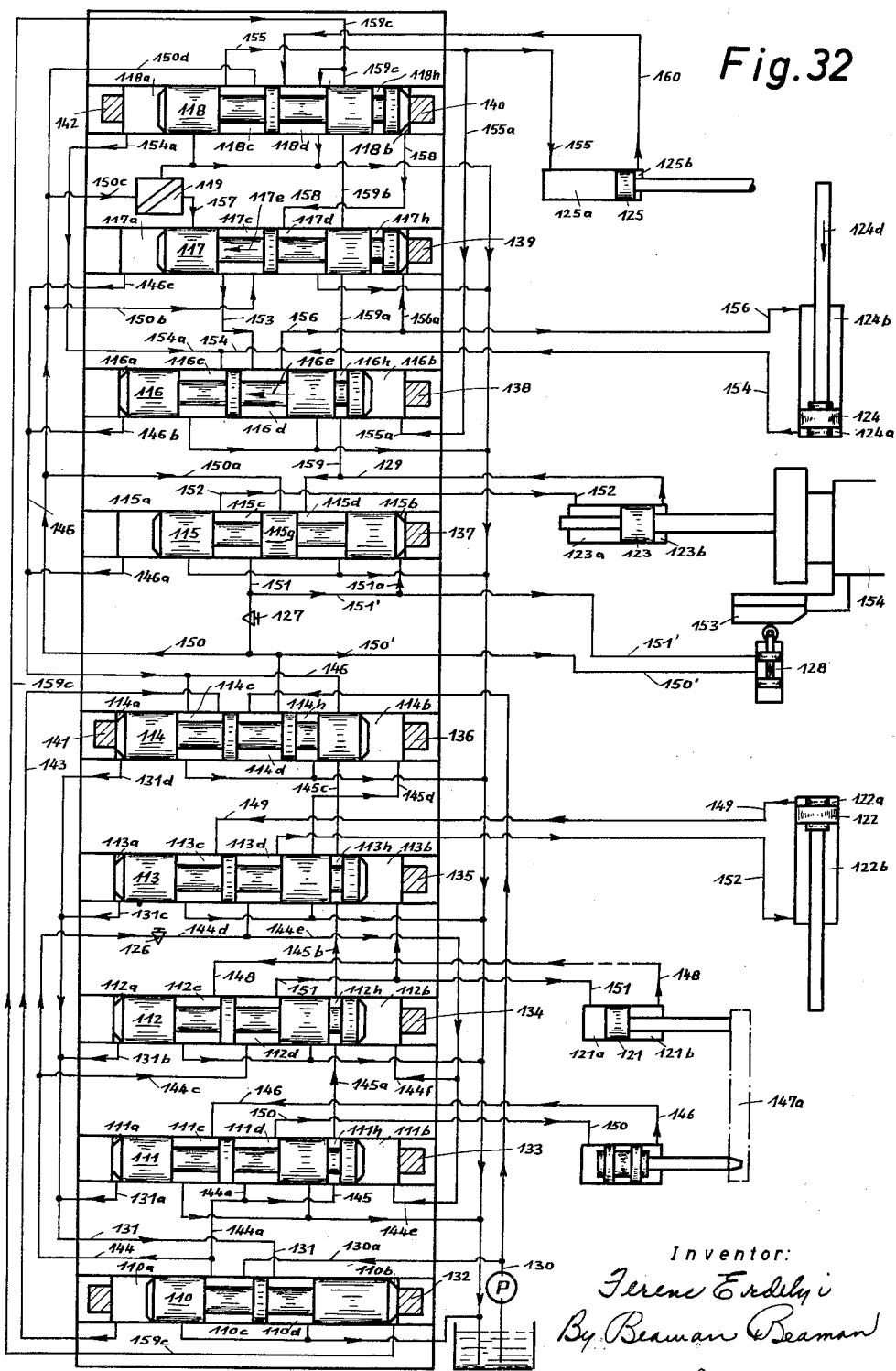

FIG. 32 shows the position of the control element at that moment in which the feeder has completed the change of the work piece and has reached its abutment thereby causing that the oil pressure in the duct 155a and in the chamber 116b to increase until the time delay valve 116 is pulled away from its permanent magnet 138 and moved in the direction of arrow 116e. Thereby, the cylinder space 124b of the clamping piston 124 is pressurized by the duct 150b via the switching chamber 117c, the duct 153, the switching chamber 116d of the time delay valve 116, and the duct 156, and the clamping piston 124 is moved in the direction 124d. The moment the clamping piston 124 has reached its abutment in the direction 124d the oil pressure in the duct 156a increases until the time delay valve 117 is pulled away from its holding permanent magnet 139 and moved in the direction of arrow 117e.

Figure 33:
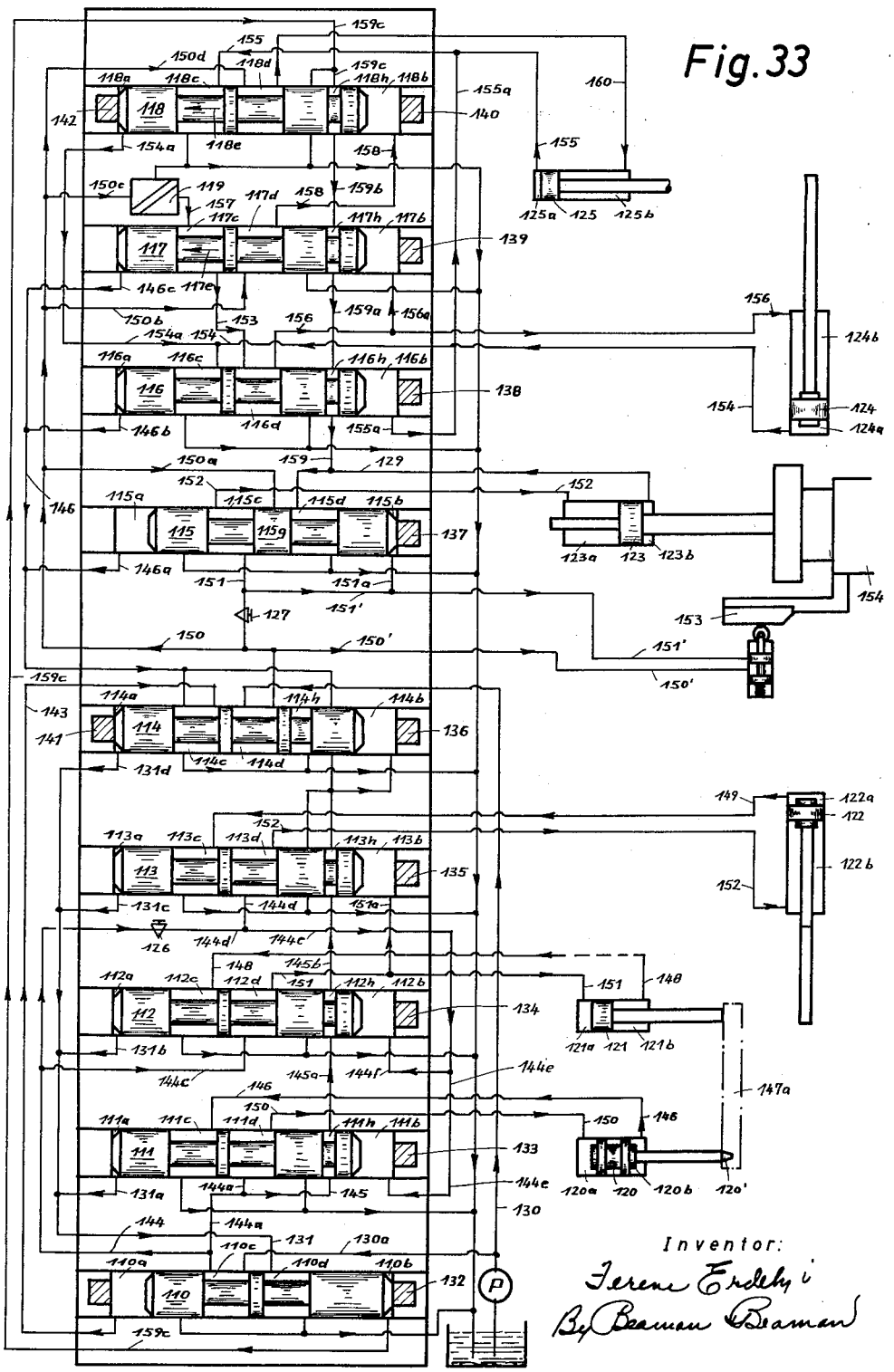

FIG. 33 shows the moment at which the time delay valve 117 has been pulled away from its holding permanent magnet 139 and has been moved in the direction of arrow 117e. Thereby the pressure duct 150c is connected with the cylinder space 124b of the clamping piston 124 via the pressure reduction valve 119, the switching chamber 117c, the duct 153, the switching chamber 116d, and the duct 156. Thereby, the clamping piston 124 is relieved and switched to a considerably reduced pressure, for example, 1 kg./cm.². At the same time the pressure duct 150b is connected via the switching chamber 117d and the duct 158 with the space 118b of the alternating valve 118 which will be moved in the direction of arrow 118e.

During the change of the workpiece the machining process of the other workpieces is continued as the advance piston keeps on moving until the operating program is finished.

Figure 34:
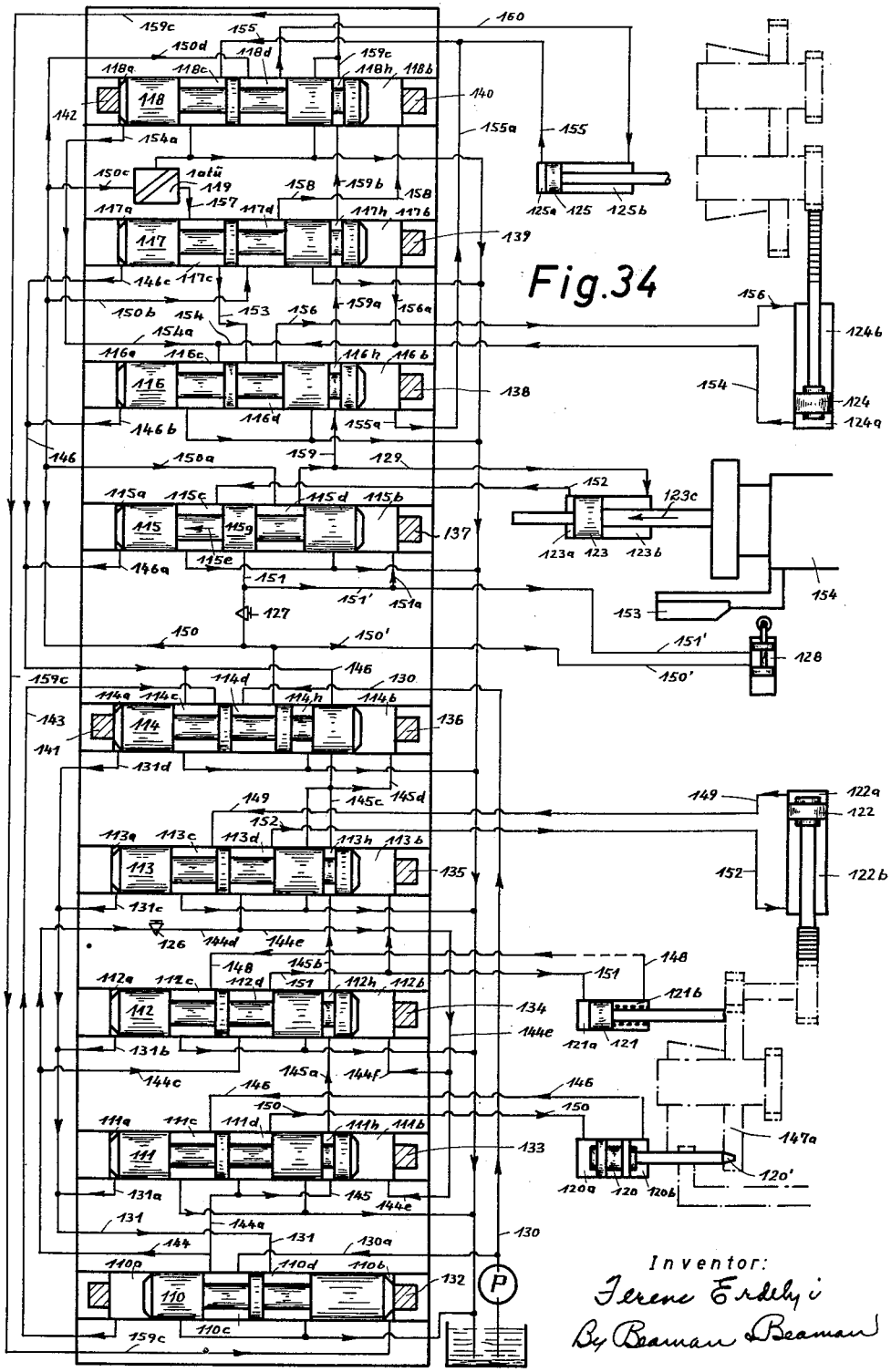

FIG. 34 shows the moment at which the advance piston 123 has completed its operating program. By means of the increasing pressure in the duct 151a and the area 115b, the alternating valve 115 is pulled away from its holding magnet 137 and moved in the direction of arrow 115e. After the alternating valve 115 has been moved in the direction of arrow 115e, the duct 150a is, on the one hand, connected via the chamber 115d and the duct 129 with the cylinder space 123b of the advance piston 123 (and the machine slide connected therewith), so that the advance piston is urged in the direction of arrow 123c. On the other hand, pressure duct 130 is connected via the ducts 150, 150a, switching chamber 115d, impulse channel 159, switching chamber 116h, impulse channel 159a, switching chamber 117h, impulse channel 159b, switching chamber 118h, and impulse channel 159c with the area 110b of the control valve 110 and thus the control impulse is transmitted to the control valve 110.

Figure 35:
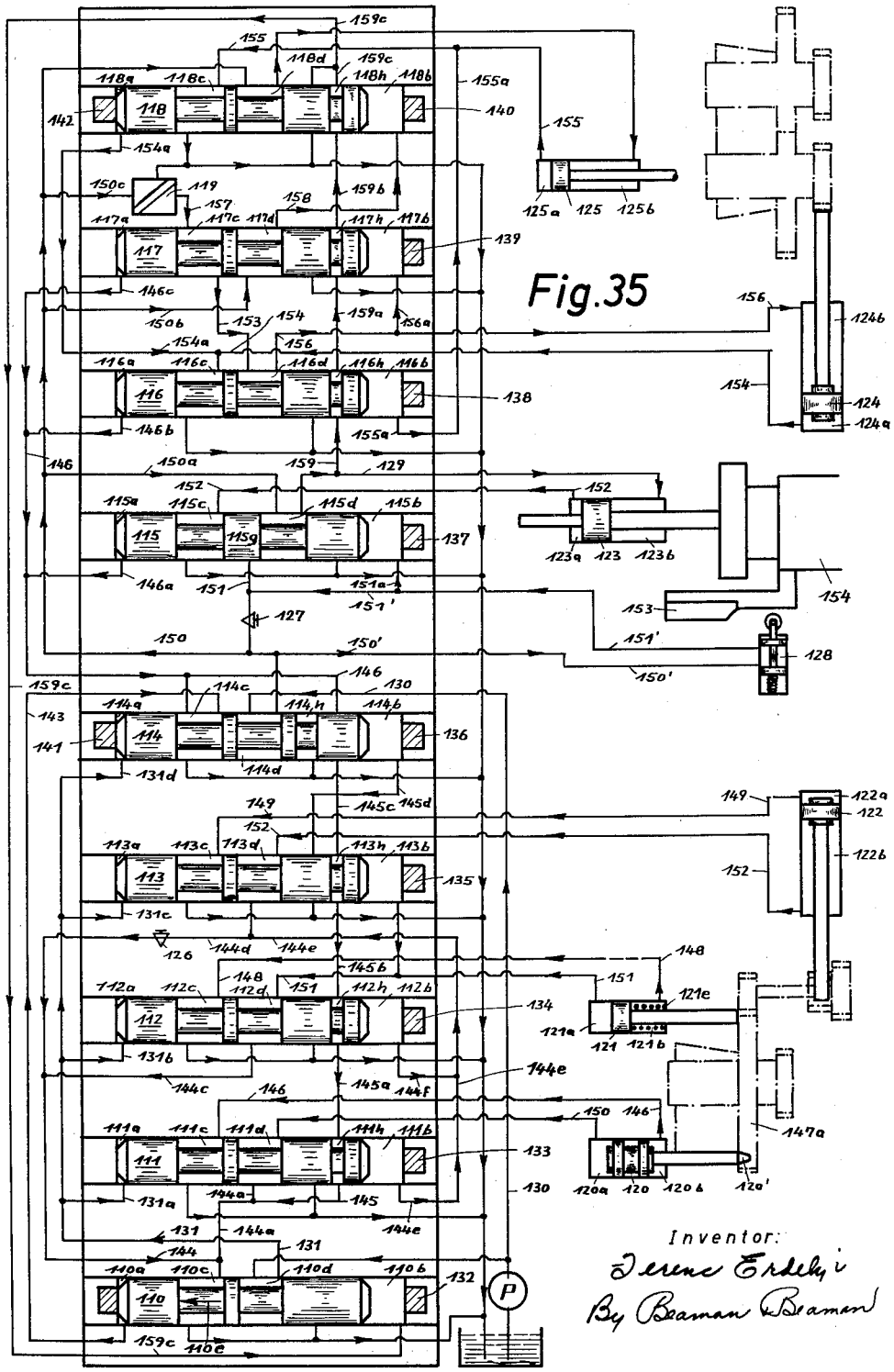

FIG. 35 shows the positions of the control elements at that moment at which the control valve 110 has been moved in the direction of arrow 110e and has stored the impulse. At the same time, this impulse has been transmitted to the time delay valves 111, 112, 113 and the alternating valve 114. In this way a new operating cycle was initiated. It will be noted that the positions of the control elements shown in FIG. 35 are identical to that of FIG. 24.

This control program clearly shows that the return ducts (e.g. 148) controlling the return movements may readily be replaced by any suitable spring, for example, 121e. Furthermore this control program shows that the movements of the tools may be chosen according to any suitable program and may be moved to their working positions with "rapid advance" in accordance with a preset speed of advance which along the advance path may even be subdivided into different speeds. Also, it is evident that the motor pistons, after their operating program is completed, are relieved of pressure until they are operated anew and as the reference numeral 119 shows, may be kept under reduced pressure of one kg./cm.², for instance. Another novel feature is incorporated by providing impulse channels within the control elements. Thereby it is possible that the influence of the different machining locations is extended over a total control program independent of whether the machining places connected therewith have completed their program in the meantime.

It would be difficult to show all the possibilities of applications of the subject matter of this invention. Therefore, only control programs commonly used have been shown and described. It is emphasized that these control programs may readily be extended or supplemented, respectively, by solenoid valves known per se. This is particularly advantageous in case a tool breaks down as the total control may be stopped within 1/100 of a second by closing the main pressure duct 130. As, on the other hand since the reversal of the direction of movements is caused by an increase of pressure acting upon the control valves it will be evident that the movements of the tool carriers may readily be limited by abutments provided at any desired place. The switching-over will then always take place when one of these abutments is engaged.

It is a well known fact that liquids offer a very great resistance against volume reduction. Due to this characteristic the novel control is practically free of delays in switching and loss of switching time. An extremely important advantage of the invention lies in the fact that in controlling machine tools the tool supports may readily be guided absolutely free of play and vibrations by using spring means or oil pressure as a counteraction of the movements. This, on the other hand, allows a higher loading stress on the tool and the service life of the tools will be prolonged. The advantages of the novel control are not only to be seen in the reduced manufacturing costs of the automatic machines but also in the fact that it is possible to increase the capacity of automatic lathes to a maximum, as it is possible to make adjustments while the machine is operating. Besides this, a maximum of exactness is obtained as vibrations, even if the tools become dull, are avoided so that merely the natural wear of the tools must be compensated by readjusting them, for example, by means of a micrometer screw.

In order to illustrate the unlimited versatility and adaptability of the hydraulic control according to the invention, another example is shown in FIGS. 36a to 46c for controlling an automatic rolling machine for hot rolling bevel gears. To achieve a control of such a machine by mechanical means such as cams, is practically impossible on account of the vast number of control cams, levers and other switching elements necessary and because of the considerable pressures occurring at some of the stations (20 to 30 tons at each station). According to the invention, the control of such a machine is solved without any difficulties. In fact, the control of the machine forms a substantial contribution to the art as the control permits such a machine to be constructed.

The different steps of the control program for the automatic machine for hot rolling bevel gears shall be described while simultaneously describing the coacting elements. The machine operation is as follows wherein the cooperating components and operations at the various work stations are briefly described in a step-by-step manner.

(1) Loading the clamping device at the loading station A1 includes operation of the control cycle alternating valve 164, the control valves 173 and 174, lifter piston 186, clamping piston 228 and collet 231. The sequence of operation includes the opening of the collet 231, the raising of the collet to the height of a supply container, the clamping of a workpiece in the collet, and the lowering of the collet and workpiece.

(2) In moving to the preheating station B1, the blocking valve 160, control valves 161, 162, and 163, the indexing piston 175 and turn table actuating piston function. The indexing disc of the machine is released, the turntable is rotated from station A1 to station B1, the indexing disc is blocked, and the turntable actuating piston is returned.

(3) At the preheating station B1 the functioning components include the control cycle alternating valve 164, the time delay valve 171, the control valve 172, lifter piston 187 and hydraulic timing unit 183 to 185. The workpiece clamping device is lifted to the height of an induction heater. The heater operation is controlled by a timing piston. The clamping collet is lowered after the desired heating occurs, and the timing piston is rapidly returned.

(4) In moving the workpiece from station B1 to C1, the cooperating components and operation is similar to that described in paragraph (2) above.

(5) The second preheating station C1 is the next machine station and employs the control cycle alternating valve 164, the time delay valve 171, the control valve 172, the lifter piston 188, and the hydraulic timing unit 183 to 185. The control steps are the same as described in paragraph (3), except a lifter piston 188 is used in place of piston 187.

(6) In moving the clamped, preheated workpiece from the intermediate heating station C1 to the heating station D1, the cooperating components and control steps are again as described in paragraph (2).

(7) At the heating station D1 the workpiece is heated to a rolling temperature and the active components and operation are as in paragraph (3), except a lifter piston 189 is employed rather than piston 187.

(8) Movement from station D1 to the prerolling station E1 is again similar to the operation of paragraph (2).

(9) At prerolling station E1 the cooperating components include the control cycle alternating valve 164, a time delay valve 168, a control valve 169, a pressure changing valve 170, hydraulic timing unit 180 to 182, and lifter piston 190. At this station the clamping device is lifted with a rapid traverse movement until the workpiece engages the tools. The control is then switched to the machining velocity and desired rolling pressure. The time of rolling and time of tool disengagement is determined and then the clamping device is lowered at a rapid traverse. Thereupon, the timing piston is returned with a rapid traverse.

(10) Movement from station E1 to station F1 is as described in paragraph (2).

(11) Intermediate heating occurs at station F1 and this phase employs control cycle alternating valve 164, time delay valve 171, control valve 172, lifter piston 191, and hydraulic timing unit 183 to 185. The control steps are similar to those in paragraph (3).

(12) Moving to the rolling station G1 is as described under paragraph (2).

(13) The finish rolling of the workpiece is produced at station G1, and includes the units of control cycle alternating valve 164, control valve 166, time delay valve 165, pressure changing valve 167, lifter piston 192, and timing unit 177 to 179 also functions. The control steps are similar to those of paragraph (9).

(14) Moving from station G1 to station H1 is as described in paragraph (2).

(15) Discharging of the finished workpiece at the discharge station H1 requires functioning of the clamping piston 263, the discharge piston 264, collet 266, and stripper 265. The collet, or clamping device, is first opened and then the discharge piston is raised. The workpiece is removed from the collet by the stripper.

As the clamping pistons and the discharge pistons of the clamping devices are always connected with the distributing ducts 193a and 226 at the stations B1, C1, D1, E1, F1 and G1, the work piece clamped at station A1 will remain clamped during the entire working process.

The discharge station H1 functions similarly but in the opposite direction as it is constantly connected with the distributing ducts 193a and 226 so that the work piece will be discharged at this station without additional control.

In the drawings FIGS. 36 to 47 each consist of three subfigures denoted with the reference a, b or c which should be read side by side with a to the left, b in the middle and c to the right, the reference letters a, b, c etc. of the different control elements should always be read with the corresponding main reference numeral, e.g. 160a, 160b etc., the numerals having been left out for the sake of clarity.

Figure 36A:
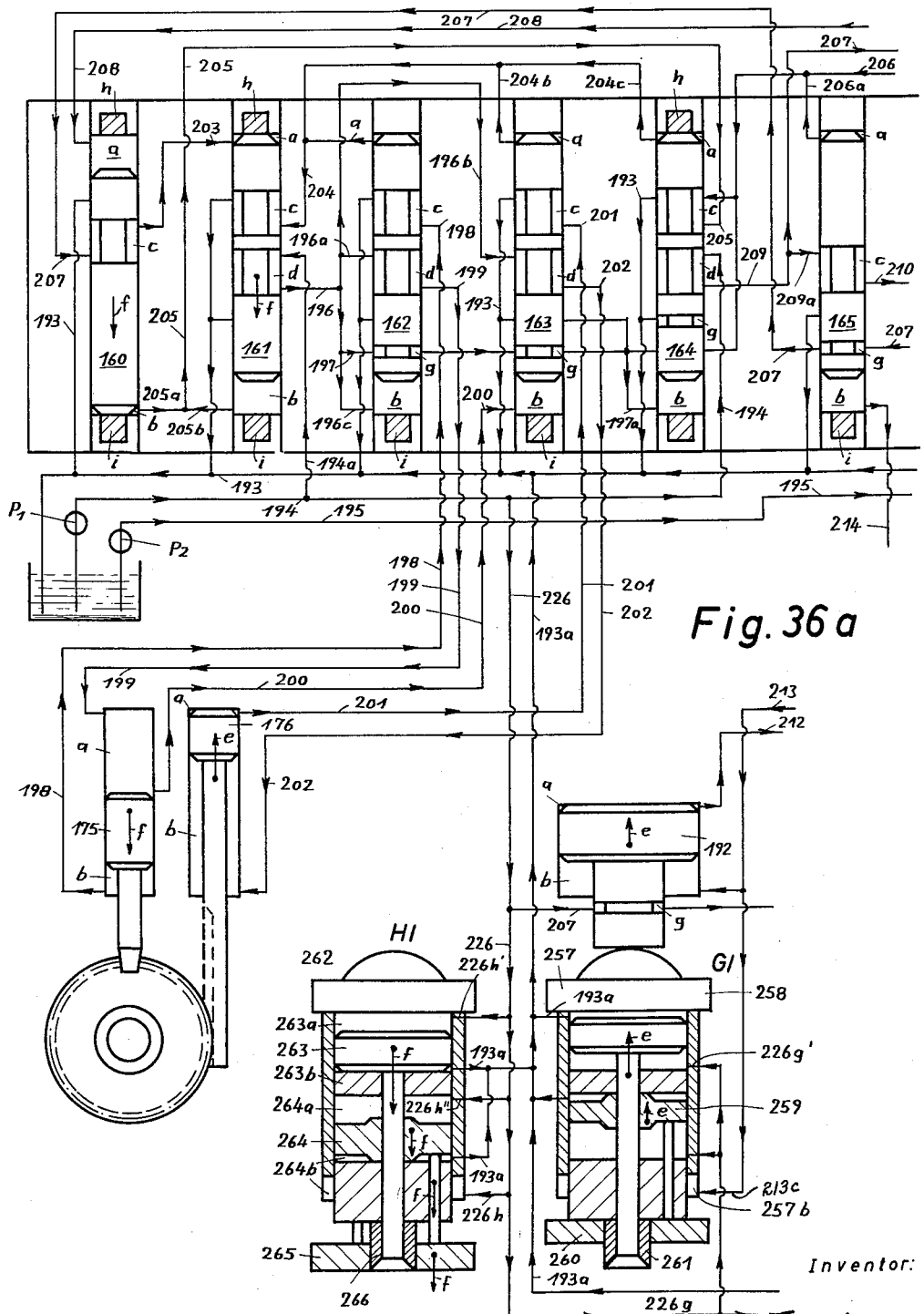
Figure 36B:
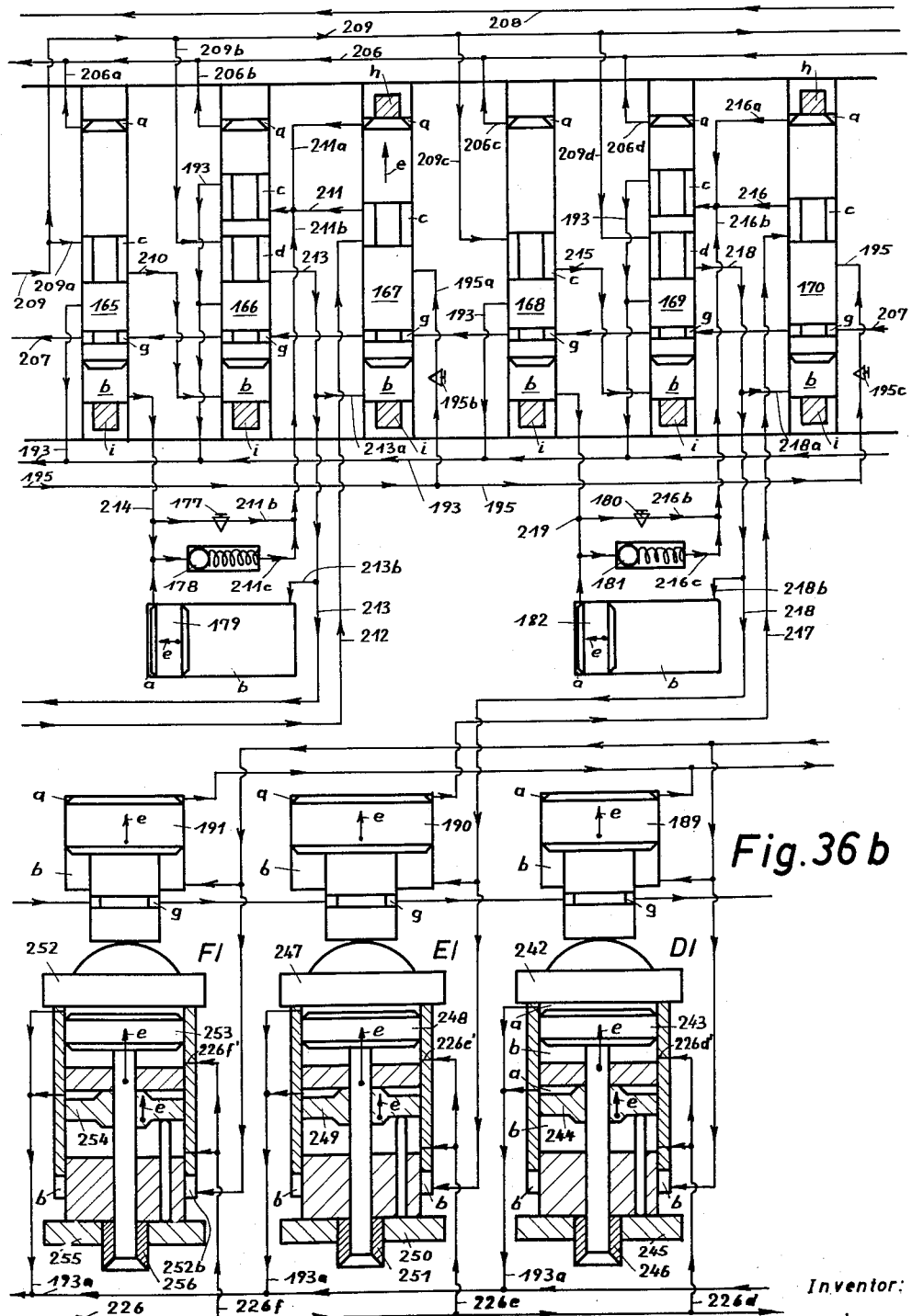
Figure 36C:
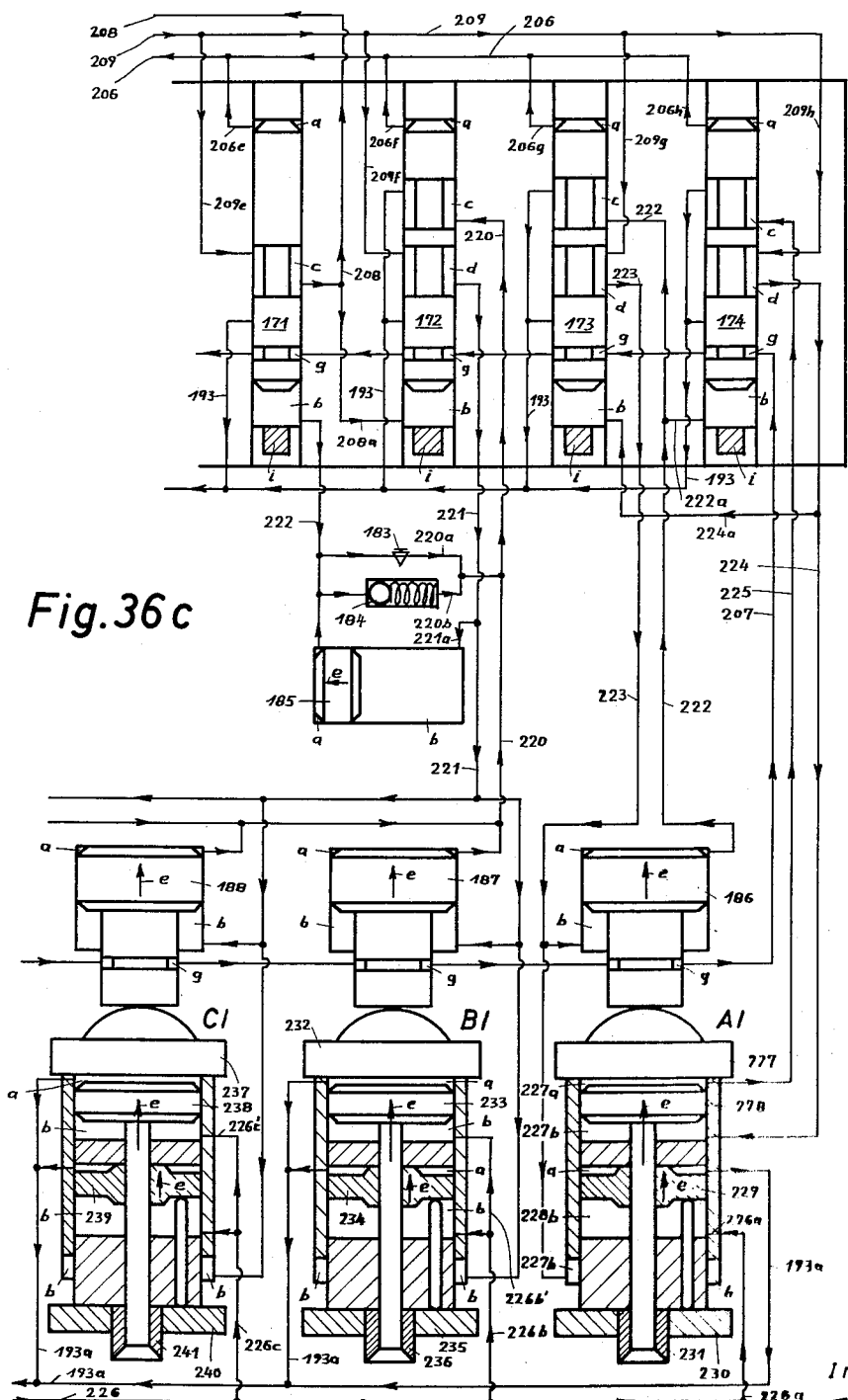

FIG. 36 shows the moment at which the blocking valve 160 has attained its end position in the direction of arrow 160f already connecting the impulse duct 207 via the switching chamber 160c and the duct 203 with the area 161a of the control valve 161 so that the oil delivered by the low pressure pump P₁ will pressurize the area 161a of the control valve 161 via duct 194, distributing duct 226, impulse duct 207 switching chamber 160 of the blocking valve 160 and duct 203, thus moving the control valve in the direction 161f. By this means the starting impulse for the first circuit has been transmitted via the impulse duct 207 to the control valve 161.

Figure 37C:
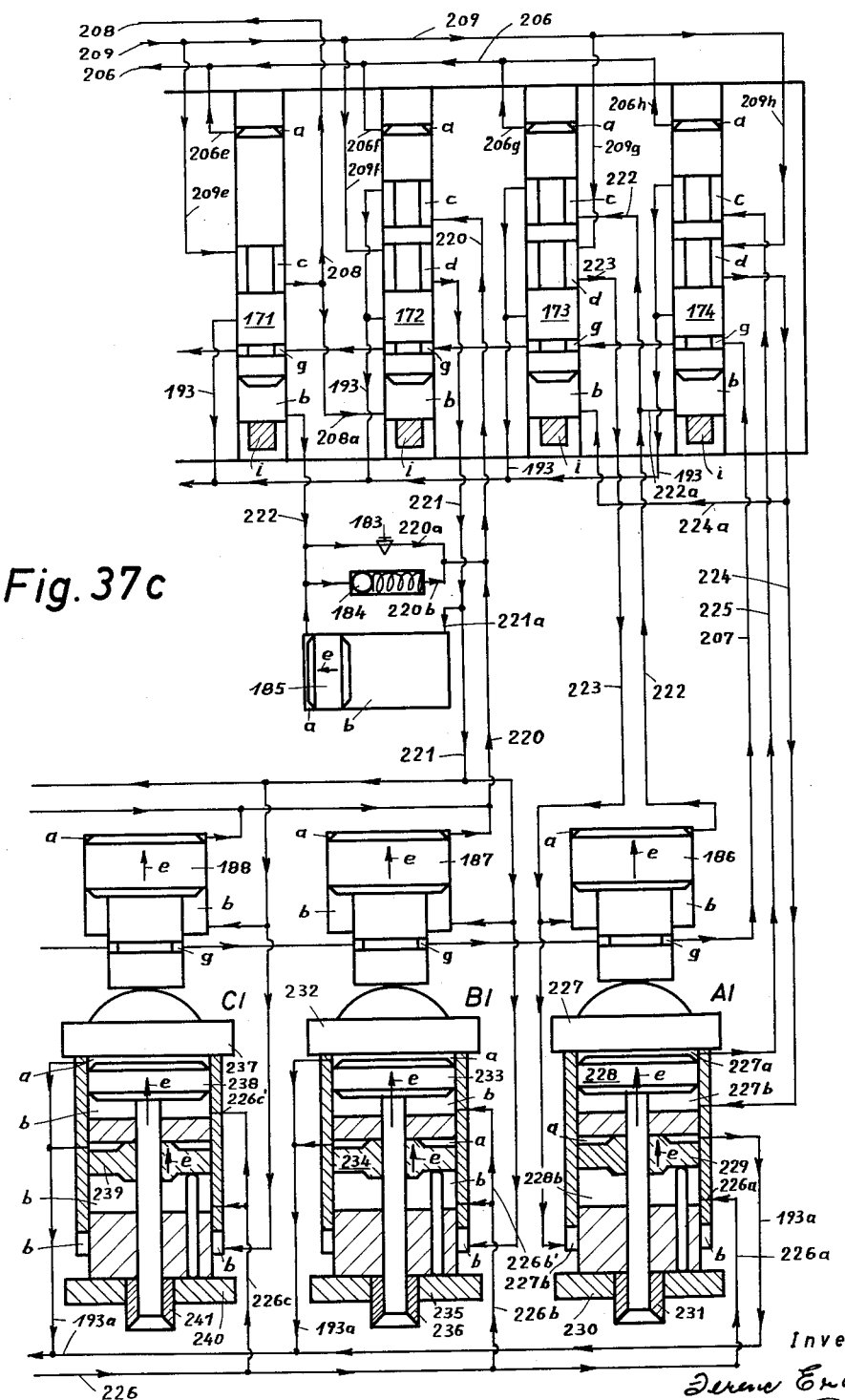

FIG. 37 shows the moment at which the control valve 161 has reached its end position in the direction of arrow 161f thereby connecting the pressure ducts 194, 194a via the switching chamber 161c with the distributing ducts 204, 204a, 204b and 204c and pressurizing the area 162a of the control valve 162, the space 163a of the control valve 163 and the area 164a of the control cycle alternating valve 164 with pressure oil delivered by the low pressure pump P₁ thereby moving these valves in the directions of arrows 162f, 163f and 164f, respectively. Thus, the starting impulse of the first circuit is completed.

At the same time the cylinder space 175a of the indexing piston 175 is relieved of pressure by connecting the duct 199, switching chamber 162d of the control valve 162, distributing duct 196, switching chamber 161d of the control valve 161 with the return duct 193.

The cylinder space 176b of the turn table actuating piston 176 is connected with the distributing duct 196b, 196 via the duct 202 and switching chamber 163d and thus depressurized.

Figure 38A:
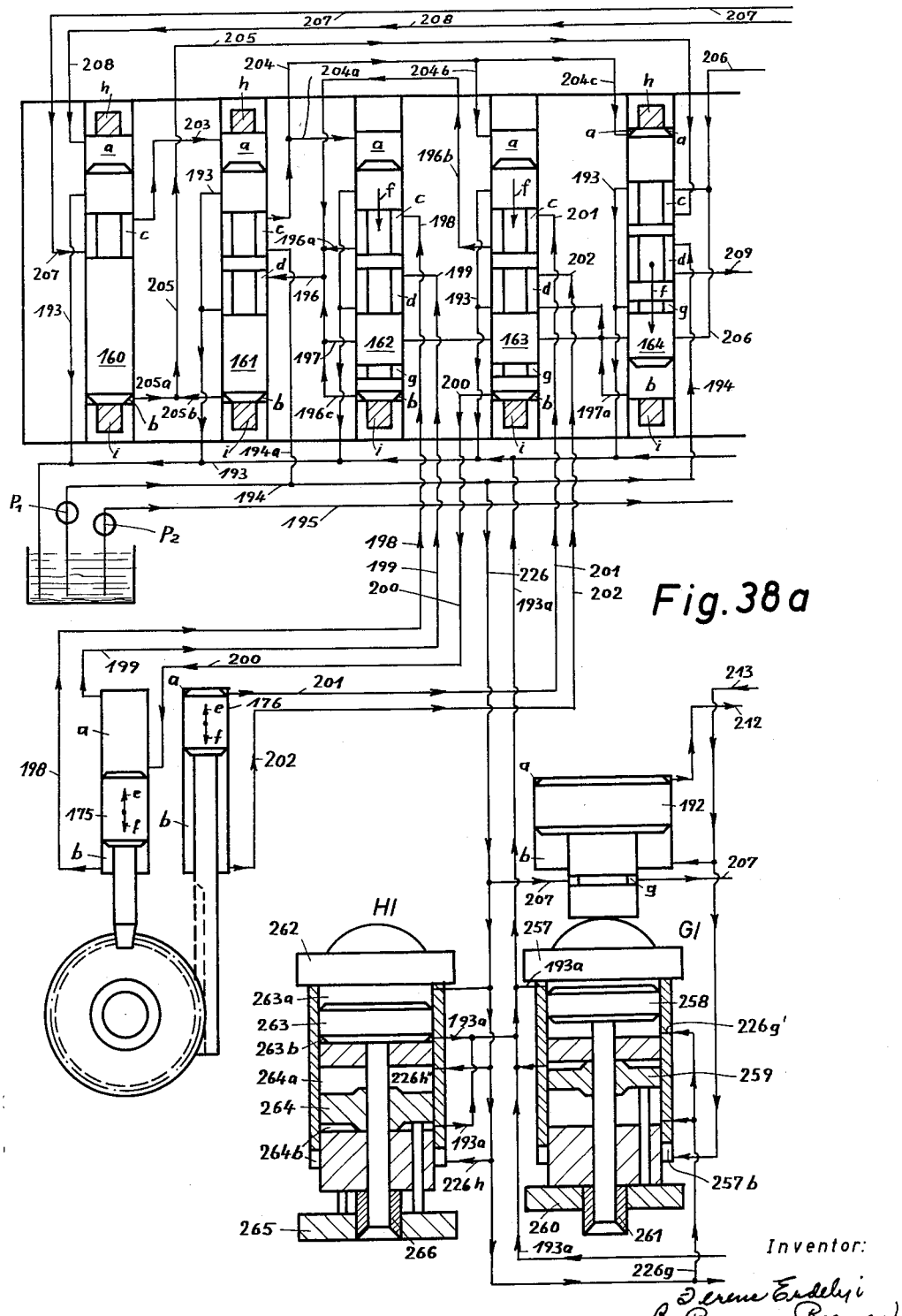
Figure 38B:
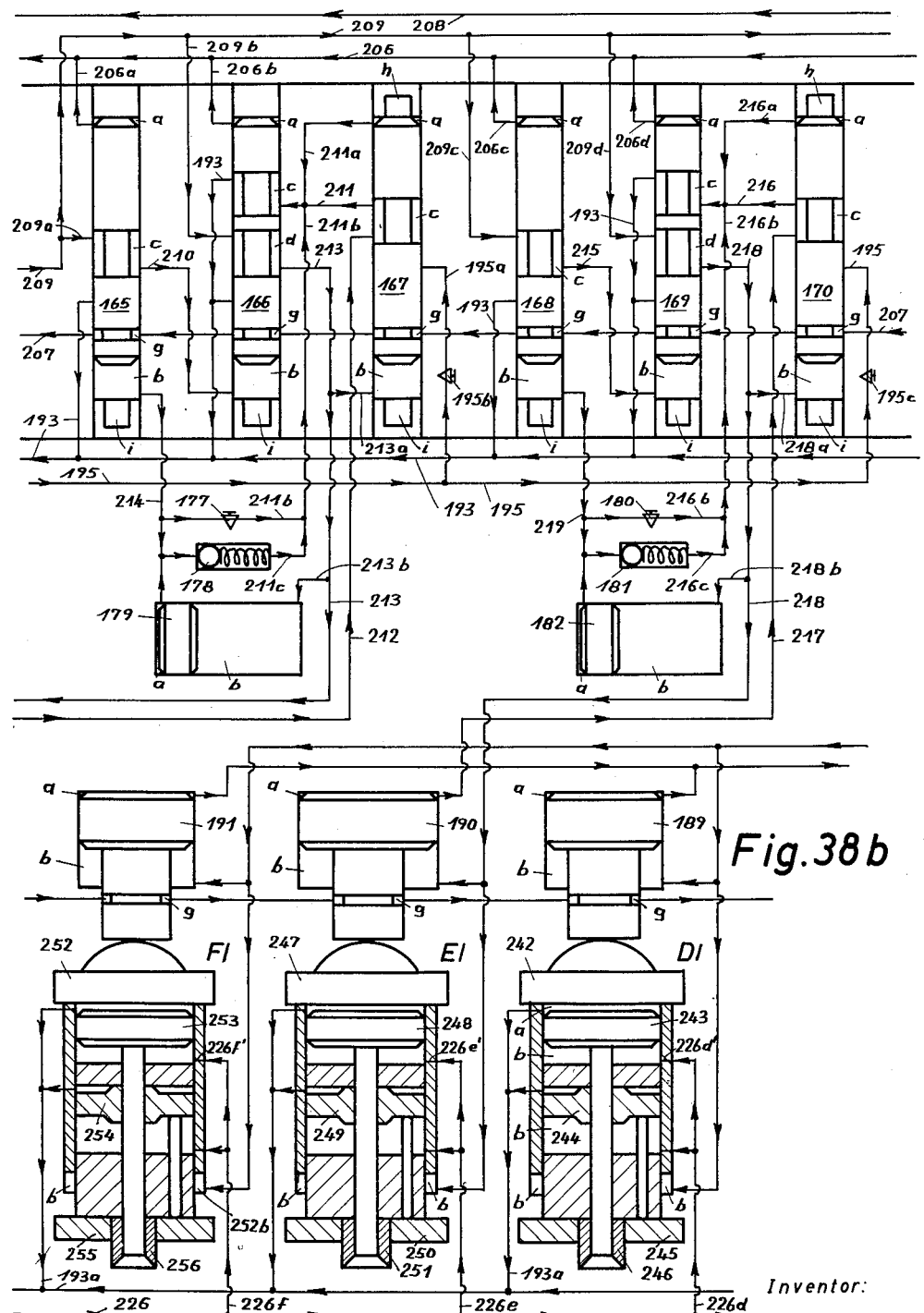
Figure 38C:
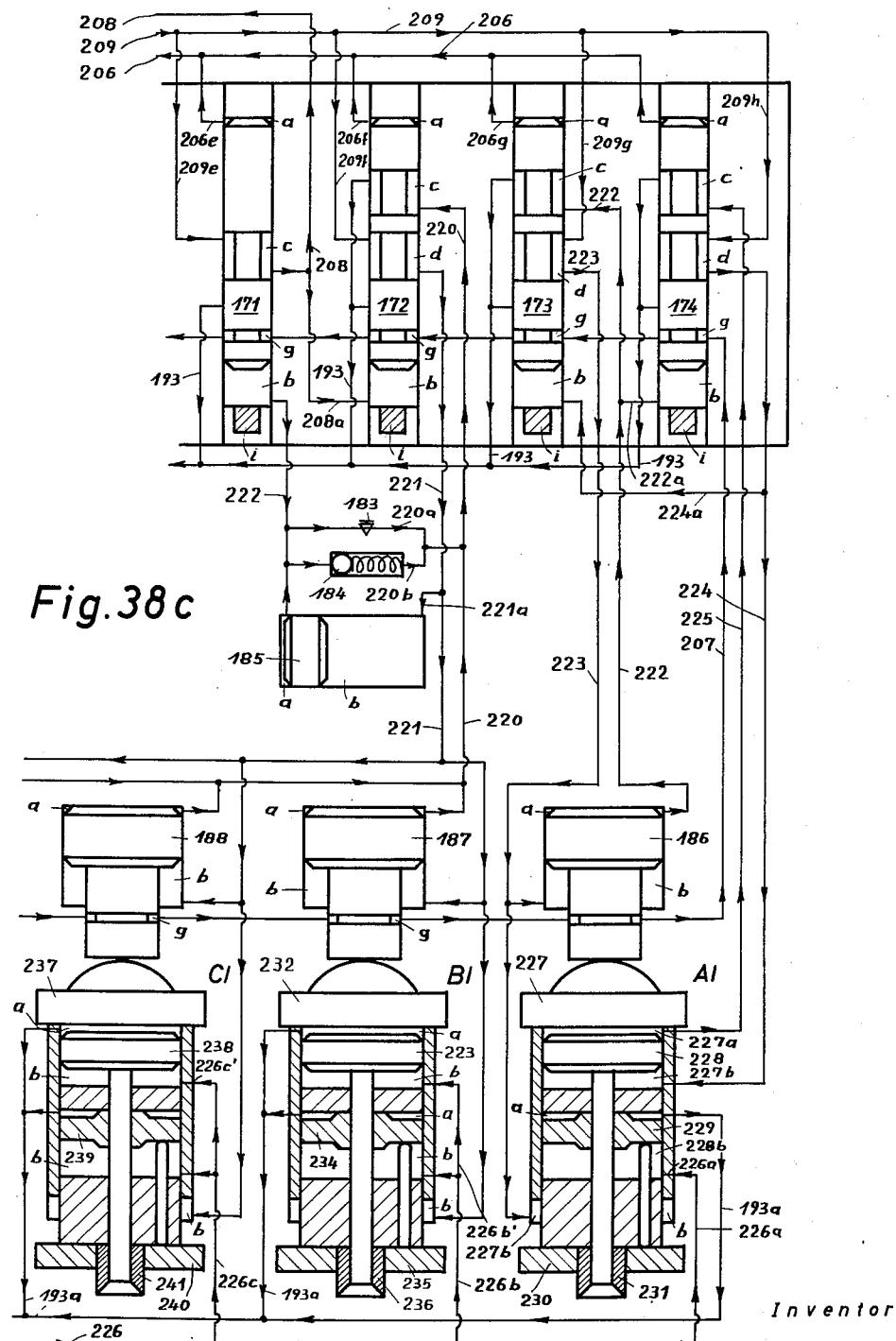

FIG. 38 shows the moment at which the control valves 162 and 163 have been moved in the directions of arrows 162f and 163f, respectively. The control cycle alternating valve 164 is still held by its holding means 164h (e.g. a permanent magnet, spring loaded latch or other holding means) so that this position may be considered as an intermediate position for emptying the cylinder space 163b of the control valve 163. By connecting in this position duct 199 via switching chamber 162d directly with the return duct 193 the cylinder space 175a of the indexing piston still remains depressurized. In the same manner the cylinder space 176b of the turn table actuating piston 176 is connected via duct 202, switching chamber 163d with the return duct 193, so that this piston also remains depressurized.

Figure 39B:
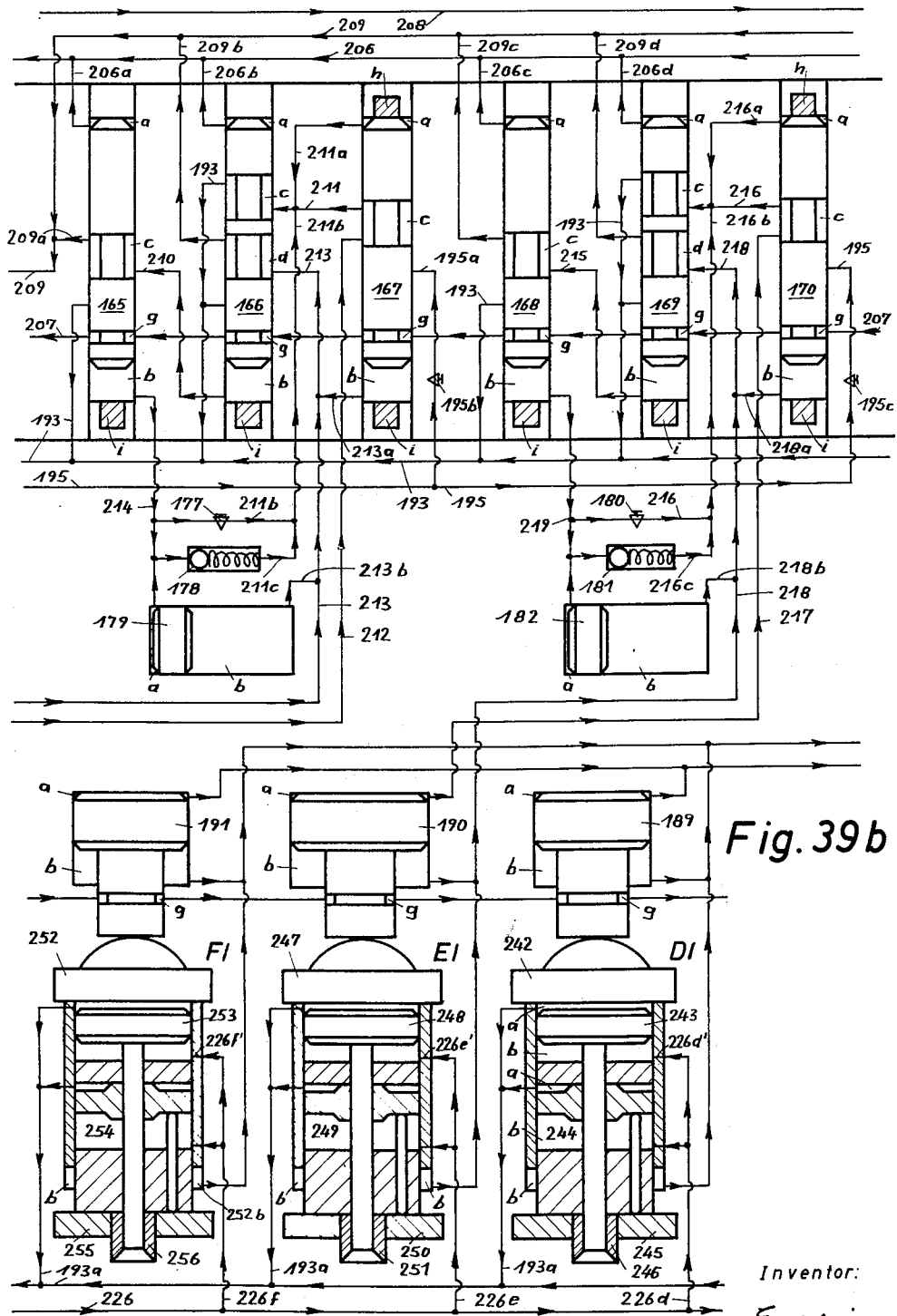
Figure 39C:
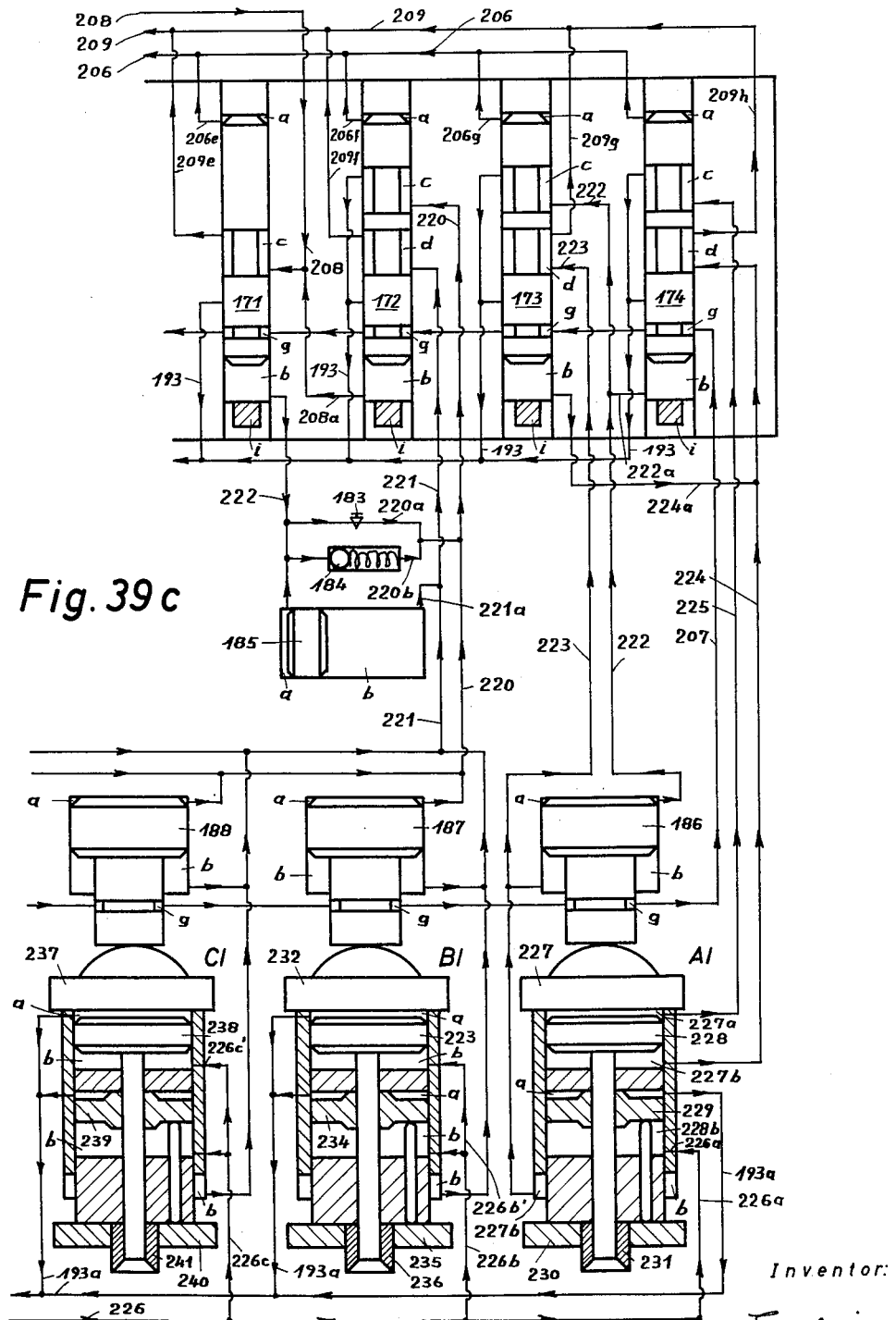

FIG. 39 shows the moment at which the control cycle alternating valve 164 has been pulled away from its holding means 164h and has been moved in the direction of arrow 164f. At the same time the pressure duct 194 of the low pressure pump P₁ is connected via the switching chamber 164c of the control cycle alternating valve 164, ducts 205, 205a and 205b with the cylinder space 160b of the blocking valve 160 and the cylinder space 161b of the control valve 161. As the cylinder space 161a of the control valve 161 is still pressurized by low pressure oil delivered through the impulse duct 207, and the effect of the holding means 160i and 161i is about equal, the blocking valve 160 will first be moved in the direction 160e. At the moment the blocking valve 160 reaches its end position in the direction 160e the cylinder space 161a of the control valve 161 will be connected with the return duct 193 via the duct 203 and the switching chamber 160c so that the control valve 161 will now be moved in the direction of arrow 161e without any resistance.

Figure 40C:
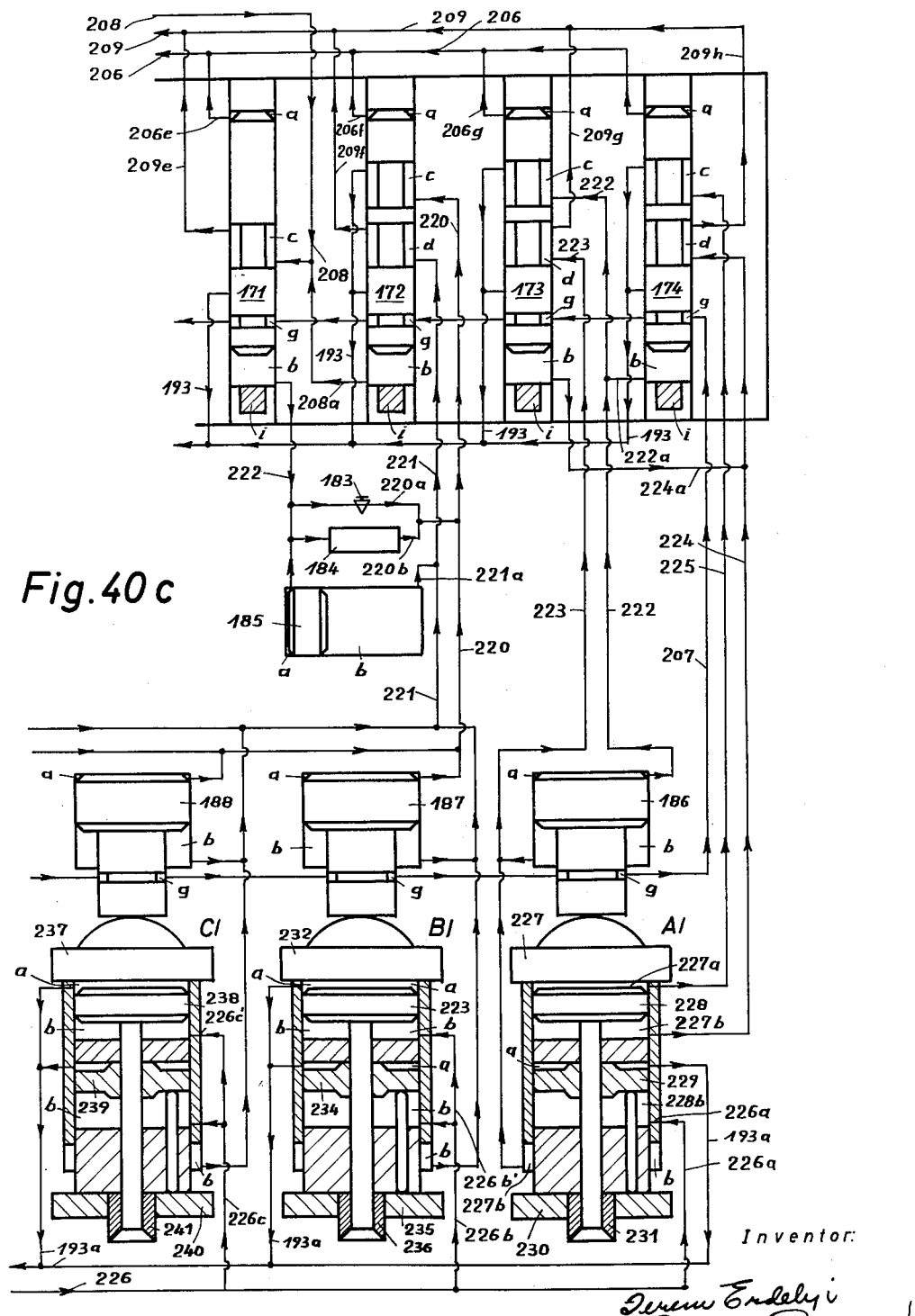

FIG. 40 shows the moment at which the control valve 161 has reached its end position in the direction of arrow 161e connecting through the switching chamber 161d, the distributing ducts 196, 196a, 196b and 196c with the low pressure ducts 194 and, 194a and thus, on the one hand, the low pressure oil delivered by the low pressure pump P₁ via the duct 194a, the switching chamber 162c of the control valve 162, duct 198 will pressurize the cylinder space 175b of the indexing piston 175 moving it in the direction of arrow 175e, and on the other hand, the cylinder space 176a of the turn table actuating piston 176 will be pressurized via the branch duct 196b of distributing duct 196, the switching chamber 163c of the control valve 163 and duct 201 moving the turn table actuating piston 176 in the direction of arrow 176f. Another branch duct 196c of the distributing duct 196 is connected with the cylinder space 162b of the control valve 162 which is still being held by the holding means 162i.

Figure 41A:
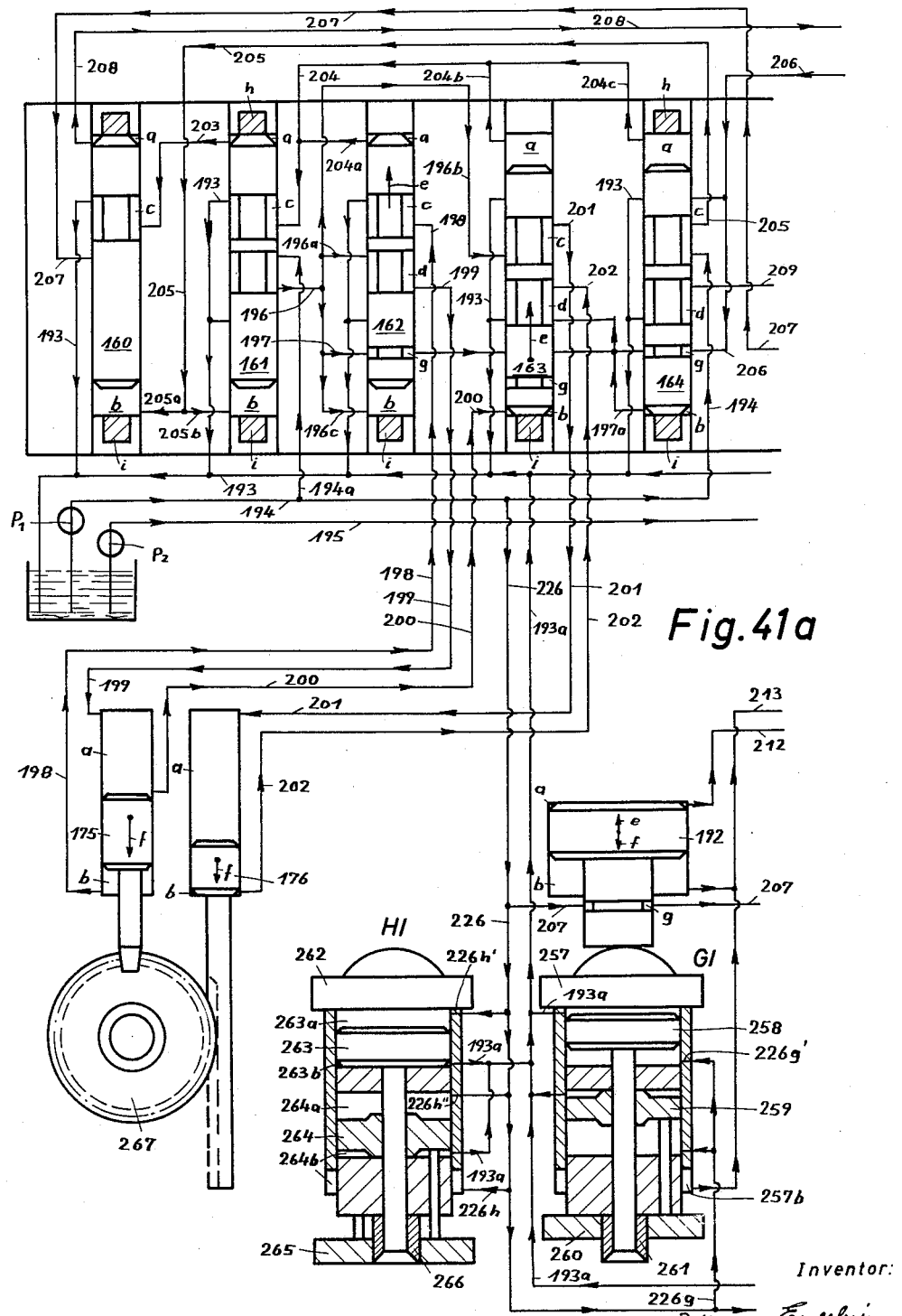
Figure 41B:
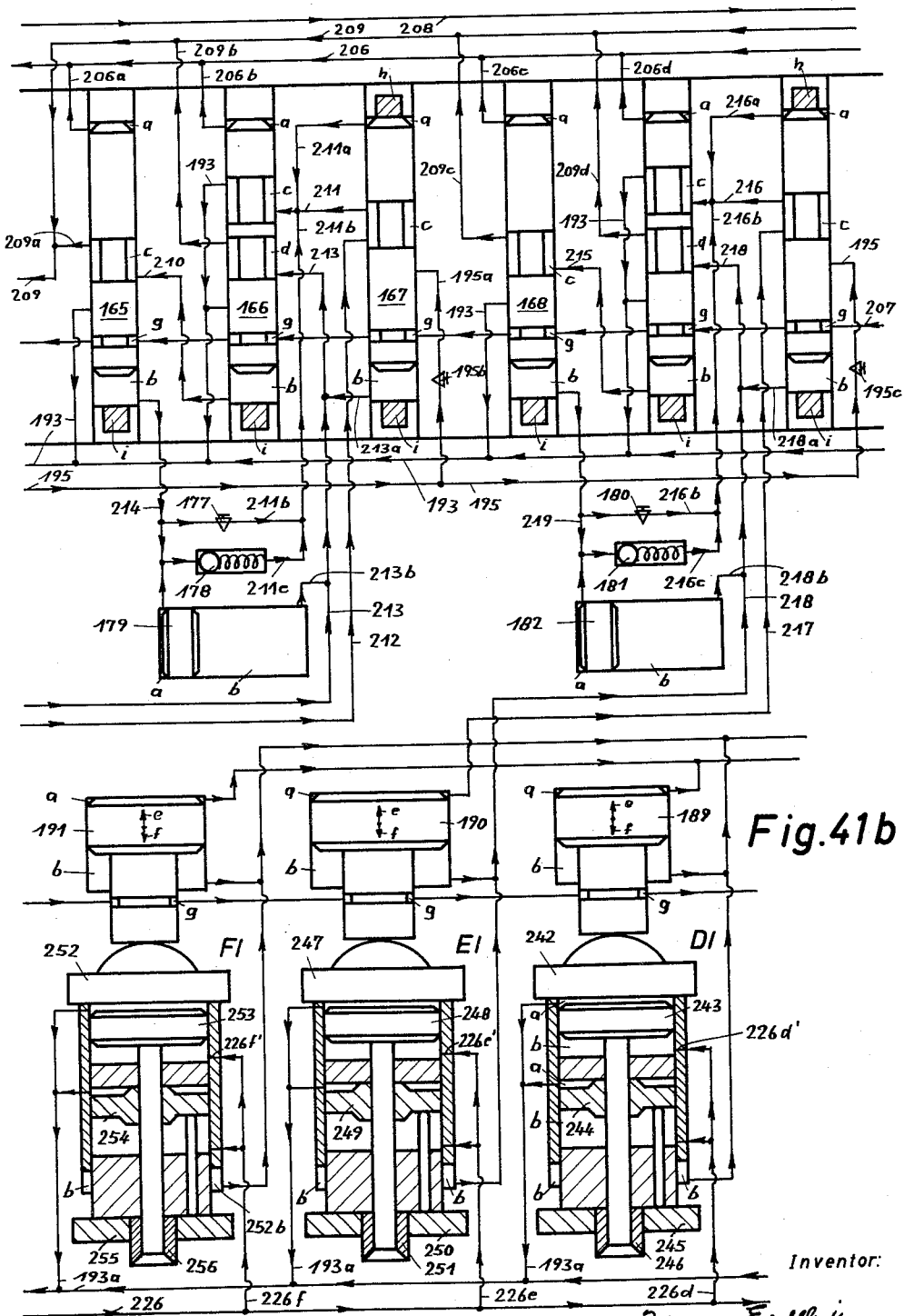
Figure 41C:
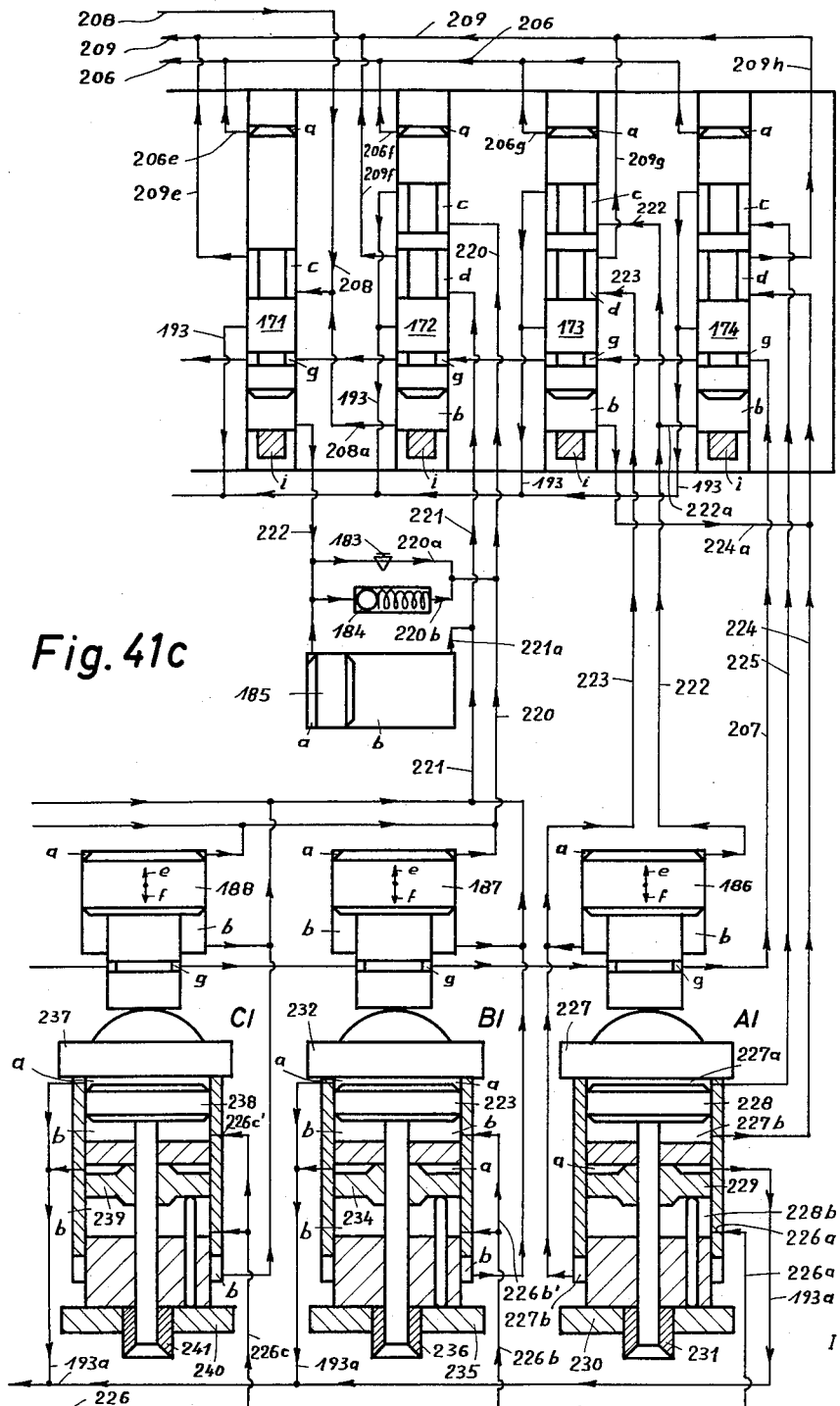

FIG. 41 shows the moment at which the control valve 162 is pulled away from its holding means 162i and has been moved in the direction of arrow 162e, so that low pressure oil will pressurize the cylinder space 175a of the indexing piston 175 via the distributing duct 196, branch duct 196a and duct 199 moving the indexing piston 175 in the direction of arrow 175f. After the indexing piston 175 has locked the indexing disc 267, the duct 200 connected with the cylinder space 175a opens and pressurizes the cylinder space 163b of the control piston 163 with low pressure moving it in the direction of arrow 163e.

Figure 42A:
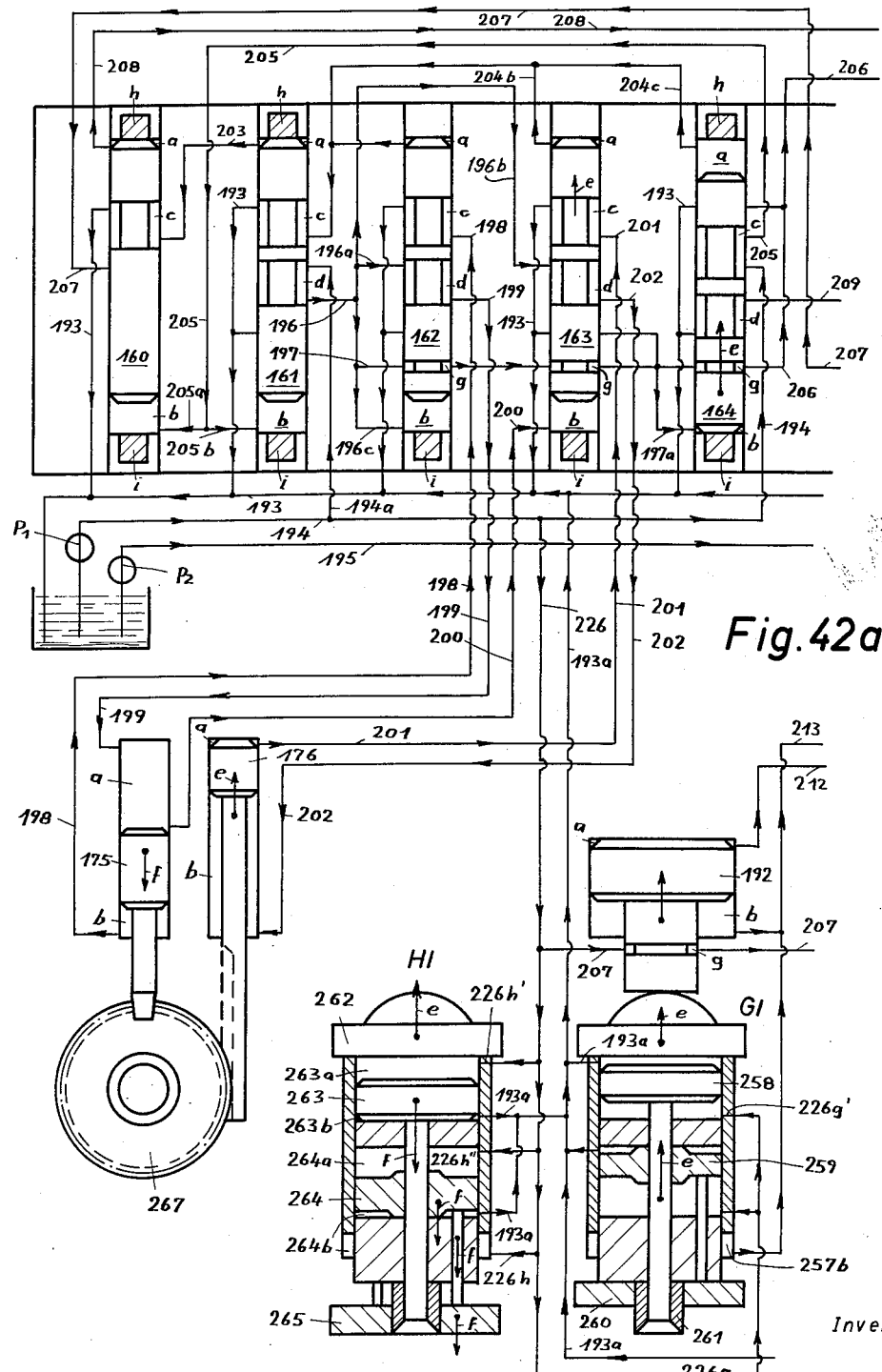
Figure 42B:
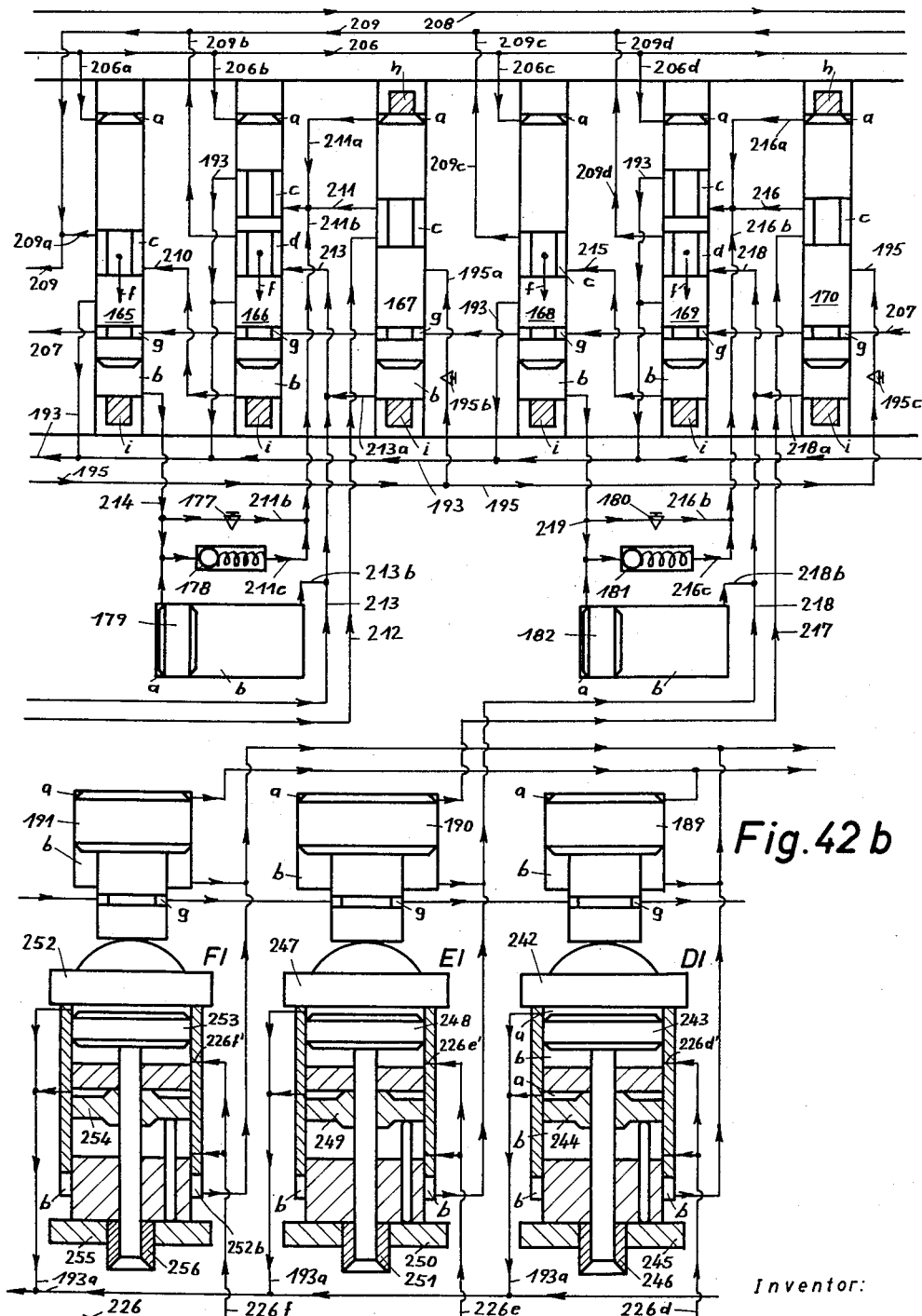
Figure 42C:
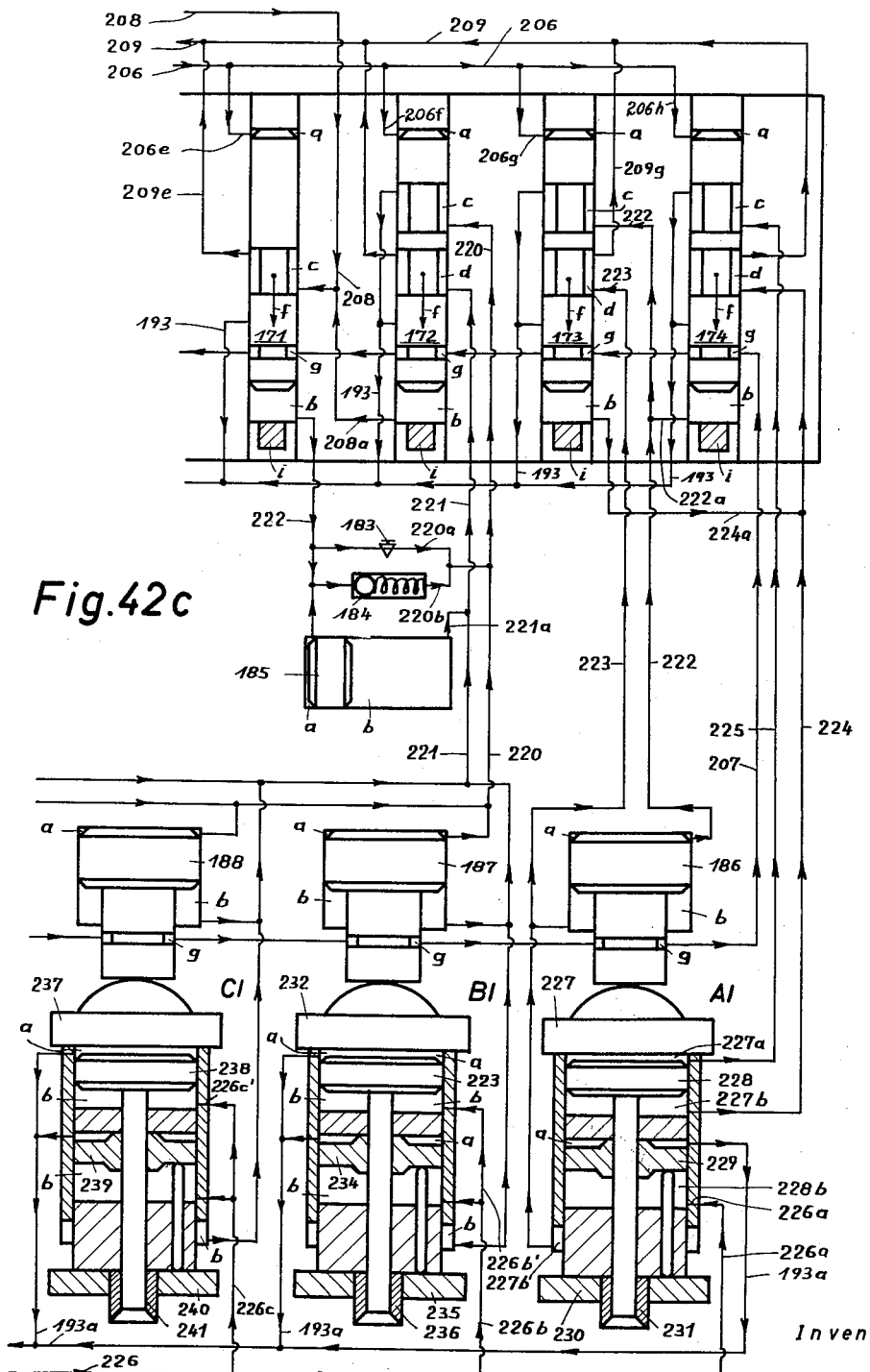

FIG. 42 shows the moment at which the control valve 163 has reached its end position in the direction of arrow 163e connecting the branch duct 196b of the distributing duct 196 via the switching chamber 163d of the control valve 163, and the duct 202 with the cylinder space 176b of the turn table actuating piston 176 whereby the low pressure oil will move the turn table actuating piston in the direction 176e. At the same time the impulse duct 197 of the second circuit communicating with the distributing duct 196 is connected via the switching chambers 162g, 163g and 164g of the corresponding control valves with the distributing ducts 206, and 206a to 206h so that the corresponding cylinder spaces 165a, 166a, 168a, 169a, 171a, 172a, 173a and 174a of the corresponding valves are pressurized. A branch duct 197a of the impulse duct 197 is connected with the cylinder space 164b of the circuit alternating valve 164 moving it in the direction of arrow 164e.

Figure 43A:
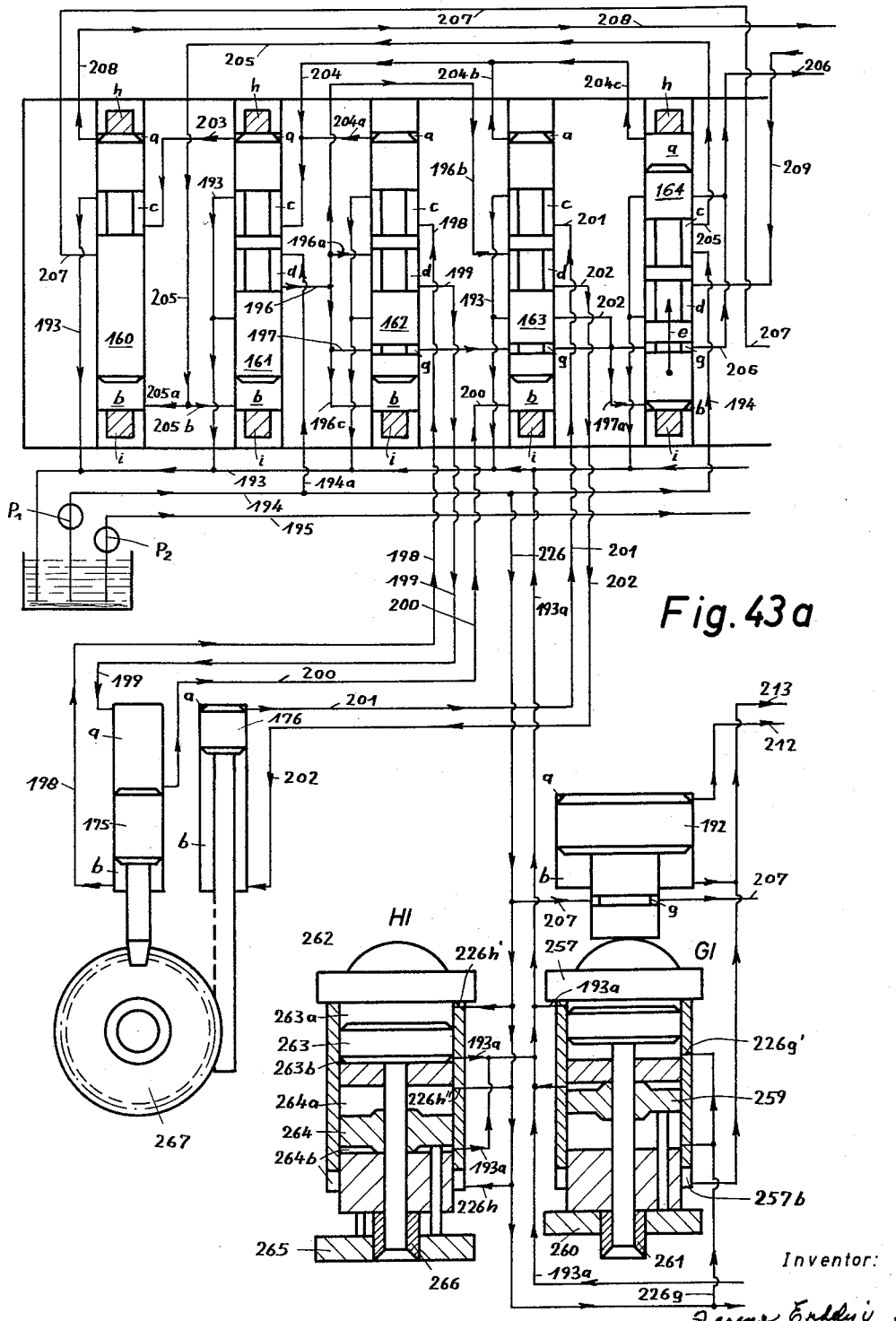
Figure 43C:
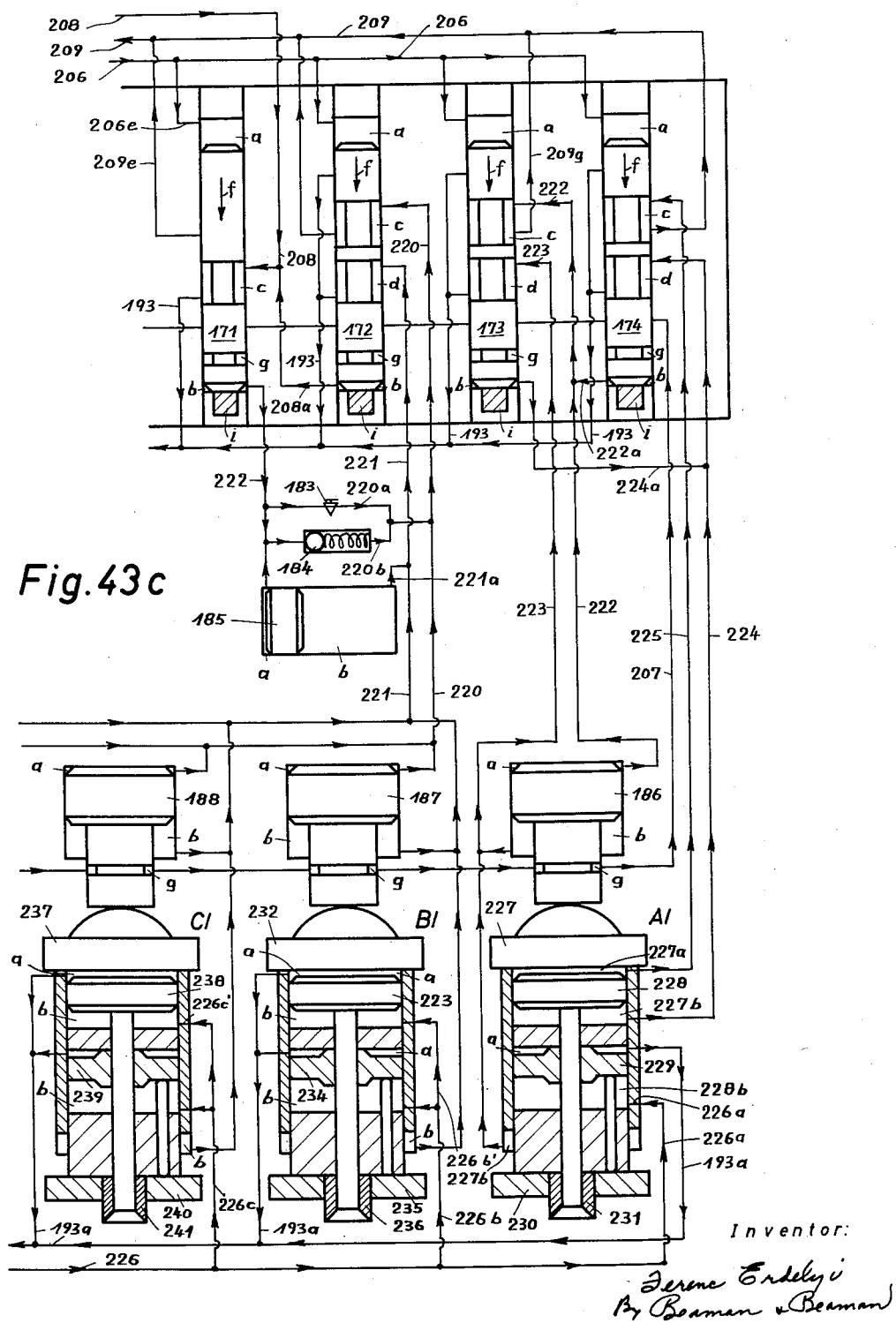

FIG. 43 shows the moment at which the valves 165, 166, 168, 171, 172, 173 and 174 have reached their end positions in the directions of the respective arrows and the oil pressure in space 164b of the control cycle alternating valve is increasing whereby it will be pulled away from its holding means 164i and moved to its end position in the direction of arrow 164e. At the same time the impulse duct 207 of the first circuit has been interrupted at several places by the movement of the above mentioned valves.

Figure 44A:
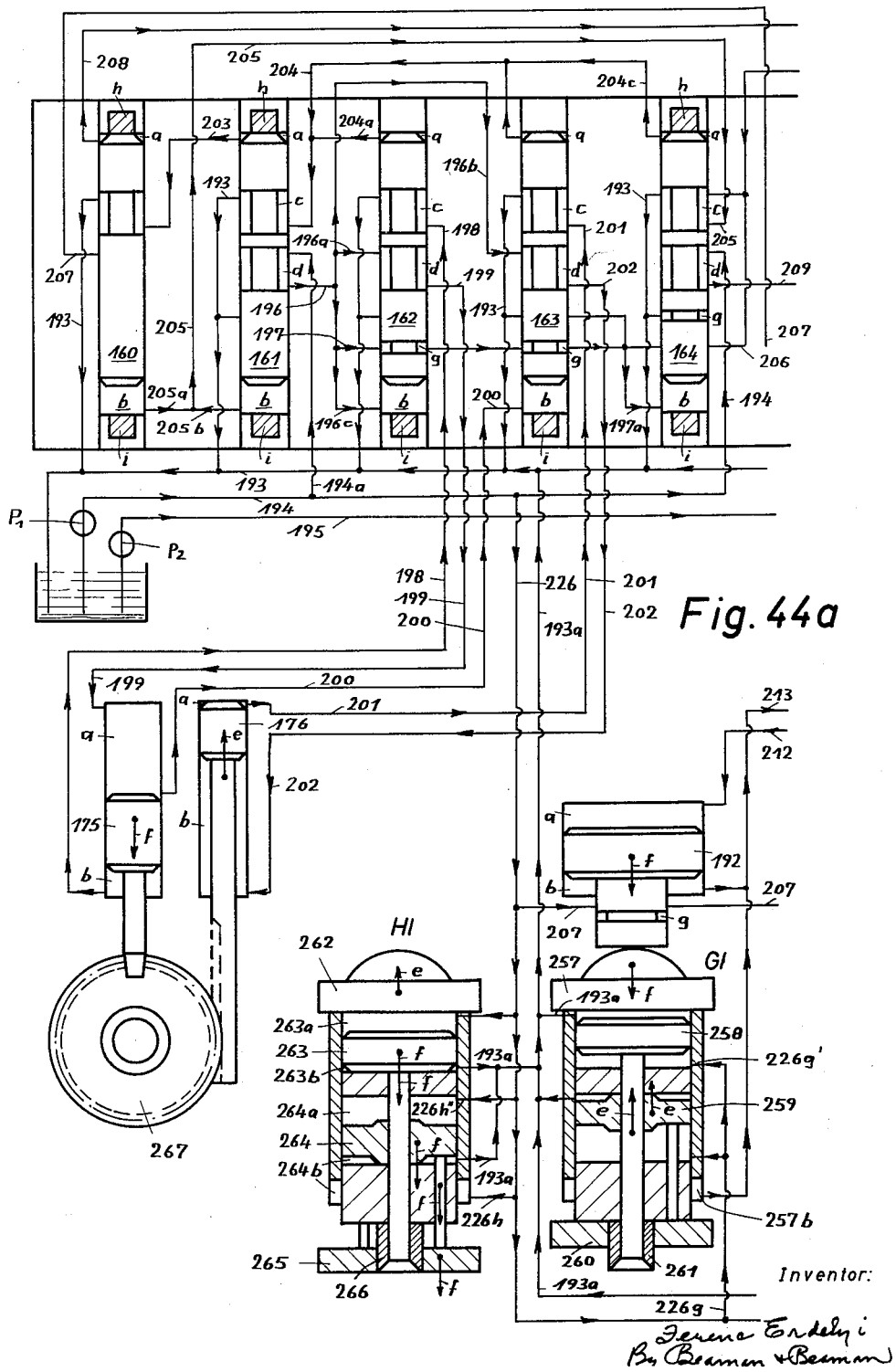
Figure 44B:
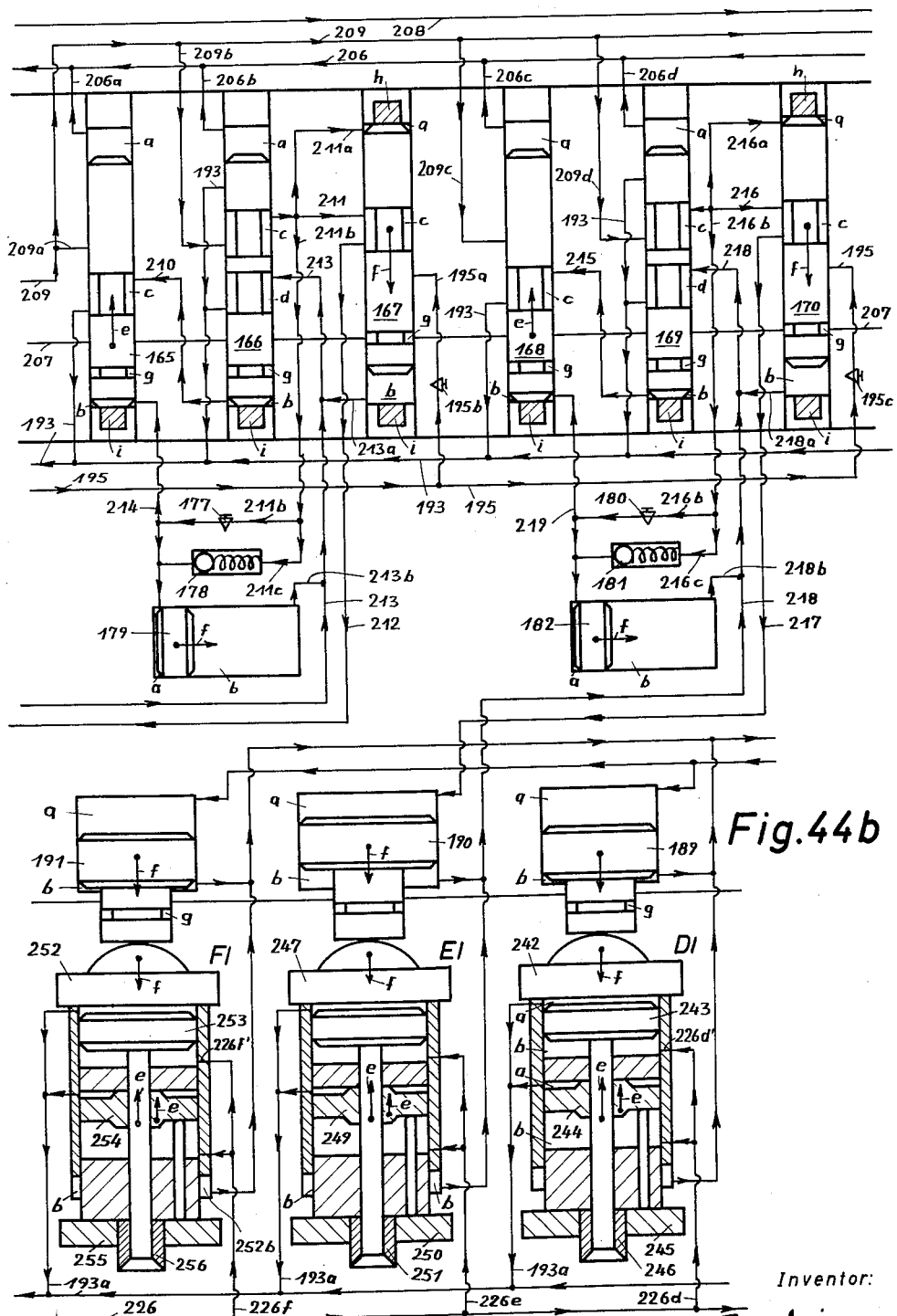

FIG. 44 shows the moment at which the control ring alternating valve 164 has reached its end position in the direction of arrow 164e connecting the low pressure duct 194 via the switching chamber 164d with the distributing ducts 209, 209a to 209h transmitting the start impulse for the four control circuits switched in parallel and the three time circuits connected therewith.

As these extremely complicated control steps of the different elements take place at the same time, or are overlapping themselves, the control according to FIG. 44 shall be described according to each control circuit closed in itself.

*Control Circuit I as Described in FIG. 44*

After the control cycle alternating valve 164 has connected the low pressure duct 194 via the switching chamber 164d with the distributing duct 209, etc., the pressure oil delivered by the low pressure pump $P_1$ is pressurizing, on the one hand, the cylinder space 192a of the lifter piston 192 of the rolling station G1 via the branch duct 209b, switching chamber 166c of the control valve 166, distributing duct 211, switching chamber 167c of the pressure alternating valve 167 and duct 212 to move the lifter piston 192 in the direction of arrow 192f.

On the other hand, the cylinder space 179a of the time transmitting piston 179 is pressurized via the branch duct 211b, the throttle valve 177 and duct 214. The duct 214 is still connected with the cylinder space 165b of the time delay valve 165, but the holding means 165i is holding the time delay valve until the set machining time has elapsed.

By a branch line 211a of the distributing duct 211, the cylinder space 167a of the pressure alternating valve 167 is also pressurized, but the holding means 167h is holding the pressure alternating valve 167 until the tools are engaging the workpiece at station G1. (The pressure alternating valve 167 is pulled away from its holding means 167h after the tools have engaged the workpiece.)

*Control Circuit II as Described in FIG. 44*

The control of this control circuit is identical with that of control circuit I, so that after the control cycle alternating valve 164 has connected the low pressure duct 194 via the switching chamber 164d with the distributing duct 209, etc. on the one hand, the cylinder space 190a of the lifter piston 190 at the prerolling station E1 is pressurized with low pressure oil delivered by the low pressure pump $P_1$ via the branch duct 209d, switching chamber 169c, distributing duct 216, switching chamber 170c of the pressure alternating valve 170 and the duct 217 moving the lifter piston 190 in the direction of arrow 190f.

On the other hand, the cylinder space 182a of the hydraulic time transmitting piston 182 will be pressurize via the branch duct 216b, throttle valve 180 and duct 219 moving it in the direction of arrow 182f. The oil duct 219 is still connected with the cylinder space 168b of the time delay valve 168, but its holding means 168i is holding it until the set machining time has elapsed.

The space 170a of the pressure alternating valve 170 is also pressurized by the branch duct 216a of the duct 216 but the holding means 170h will hold the pressure alternating valve 170 until the tools of the prerolling station E1 have engaged the workpiece. (The pressure alternating valve 170 is pulled away from its holding means 170h after the tools have engaged the workpiece.)

*Control Circuit III as Described in FIG. 44*

This circuit III of the control cycle shows the moment at which the control valve 172 connects the low pressure distributing duct 209, 209f via the switching chamber 172c with the distributing duct 220, so that, on the one hand, the low pressure oil delivered by the low pressure pump $P_1$ pressurizes the cylinder spaces of the lifter piston group 187, 188, 189 and 191 connected in parallel and moves them in the directions of arrows 187f, 188f, 189f and 191f, respectively. On the other hand, it pressurizes via the branch duct 220a of the distributing duct 220, throttle valve 183, and duct 222, the cylinder space of the hydraulic time transmitting piston 185 and moves it in the direction of arrow 185f.

One branch of the duct 222 is connected with the cylinder space 171b of the time delay valve 171, but the oil pressure is not sufficient to pull the time delay valve 171 away from its holding means 171i. (The oil pressure only increases in the cylinder space 171b of the time delay valve 171 after the time transmitting piston has reached its end position in the direction of arrow 185f.)

*Control Circuit IV as Described in FIG. 44*

This control circuit IV is also only connected to the low pressure pump $P_1$ so that at the moment when the control valve 173 connects the distributing duct 209, 209g via the switching chamber 173c with the duct 222 and thereby pressurizes the cylinder space 186a, the lifter piston 186 of the clamping station will be moved in the direction of arrow 186f. The duct 222 is connected via a branch duct 222a with the cylinder space 174b of the control valve 174 and pressurized with low pressure oil.

At the same time as the control valve 173 the control valve 174 connects the distributing duct 209, 209h via the switching chamber 174c with the duct 225 pressurizing, on the one hand, the cylinder space 227a of the clamping piston 228 by means of low pressure oil delivered from the low pressure pump $P_1$ whereby the clamping piston 228 is moved in the direction of arrow 228f and the collet 231 of the clamping device 227 is opened.

Figure 45A:
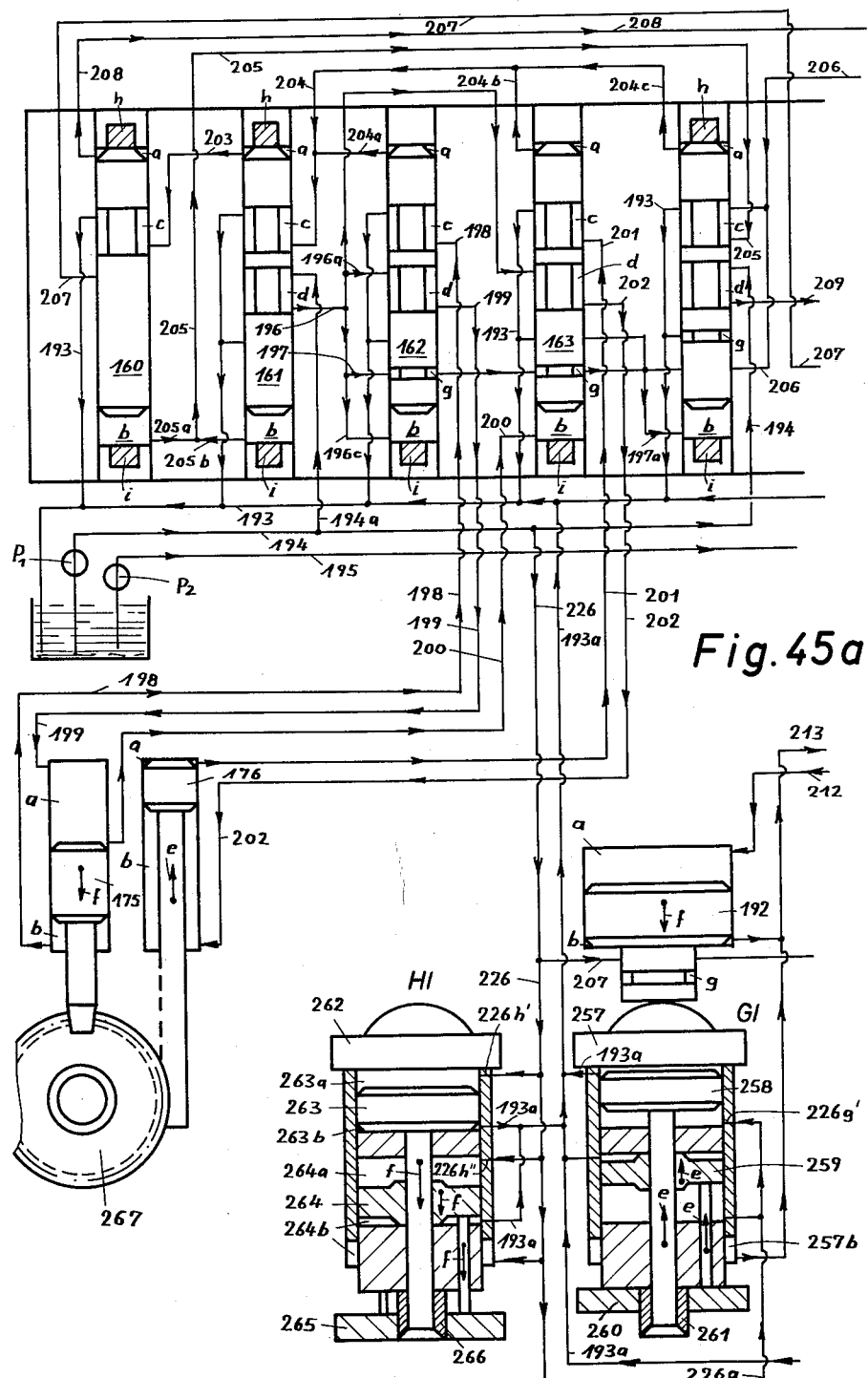
Figure 45B:
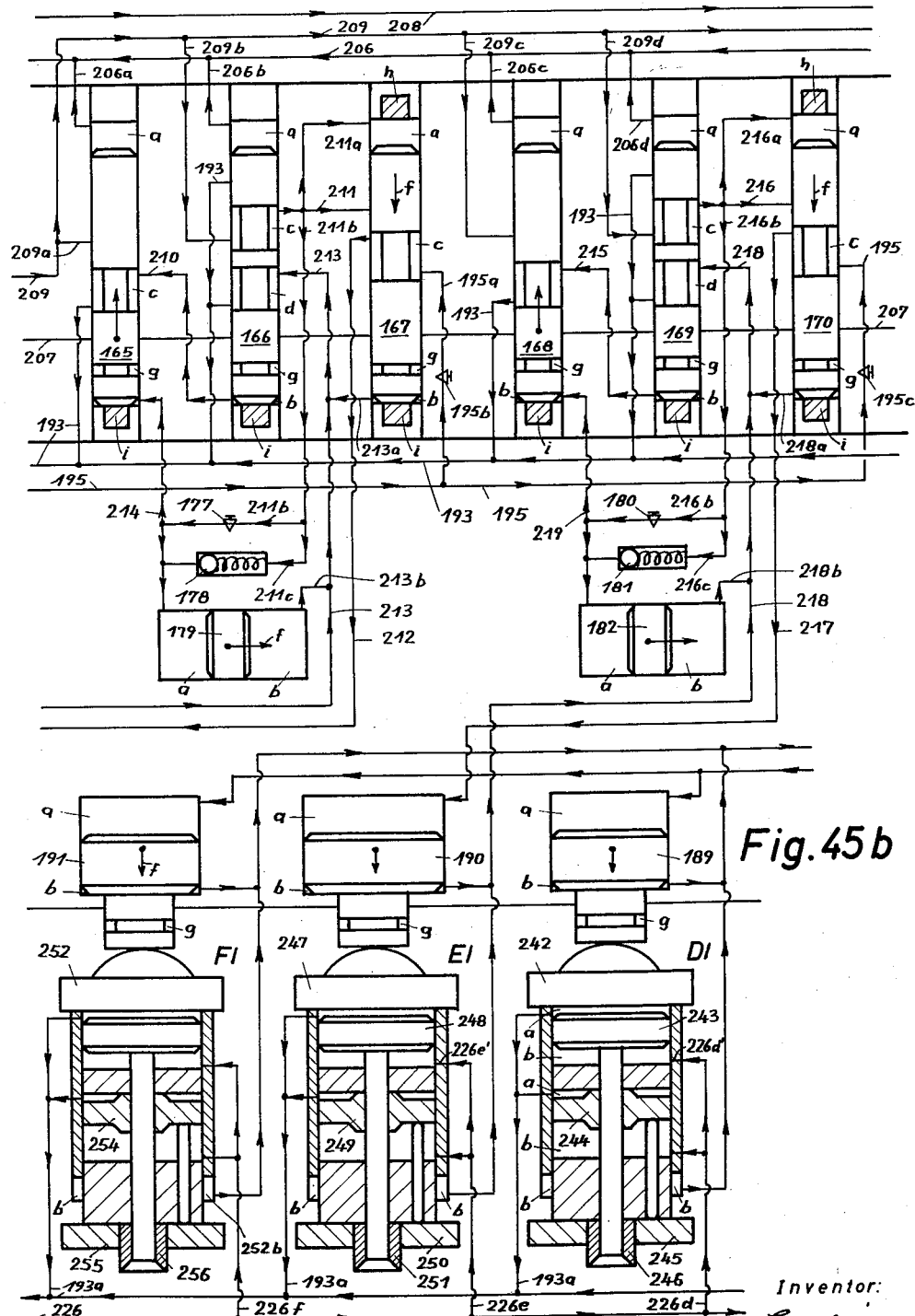
Figure 45C:
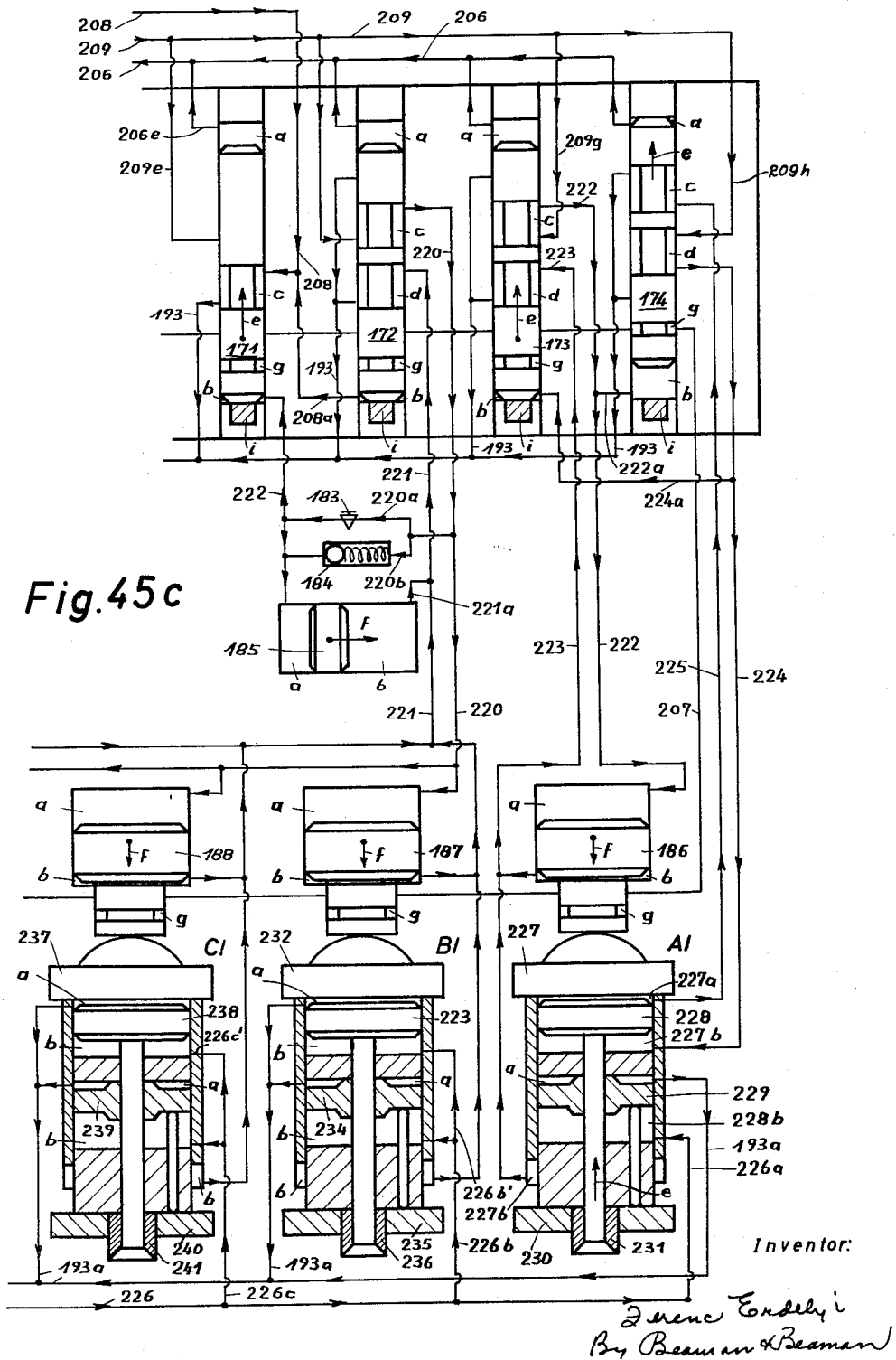

As the controls of the circuits connected in parallel also deviate from each other according to the positions shown in FIG. 45, they are described separately as follows. FIG. 45 shows the position of the control circuit I at that moment at which the lifter piston 192 has moved so far that the tools have just engaged the workpiece and the lower pressure delivered by the low pressure pump $P_1$ is no longer sufficient to overcome the increasing operating resistance. After the increasing oil pressure has pulled the pressure alternating valve 167 away from its holding means 167h and has moved it in the direction of arrow 167f the ducts 195, 195a are connected wtih the duct 212 via the switching chamber 167c and the oil delivered by the high pressure pump $P_2$ pressurizes the cylinder space 192a of the lifter piston 192 via the ducts 195, 195a, advance throttle valve 195b, switching chamber 167c of the pressure alternating valve 167 and duct 212, so that the operating resistance will be overcome by the high pressure oil passing the advance valve 195b.

The time transmitting unit which still remains connected with the low pressure duct keeps on being active until the tools have attained the desired machining depth and until the required return time of the tools is attained.

*Control Circuit II as Described in Fig. 45*

The control of the control circuit II is also in this case identical with control circuit I so that at the moment the tools of the rolling station E1 have engaged the workpiece the oil pressure within the cylinder space 170a of the pressure alternating valve 170 will increase to such an extent that this valve 170 will be pulled away from its holding means and moved in the direction of arrow 170f.

The hydraulic time transmitting unit is effective during this time and corresponds to that of control circuit I.

*Control Circuit III as Described in Fig. 45*

The position of the control elements of the control circuit III has changed only in that the piston 185 of the time transmitting circuit has still moved further in the direction of arrow 185f.

*Control Circuit IV as Described in Fig. 45*

The position of the control elements of the control circuit IV shows the moment at which the control valve 174 has reached its end position in the direction of arrow 174e and has connected the distributing ducts 209, 209h via the switching chamber 174d with the duct 224, so that the oil delivered by the low pressure pump $P_1$ will pressurize the cylinder space 227b of the clamping piston 228 of the loading station A1 and the clamping device 227 moving the clamping piston 228 in the direction 228e whereby the collet 231 clamps the workpiece.

A branch duct 224a of the duct 224 is connected with the cylinder space 173b of the control valve 173 so that at the moment the workpiece is clamped the increasing oil pressure will pull the control piston 173 away from its holding means 173i moving it in the direction of arrow 173e.

Figure 46B:
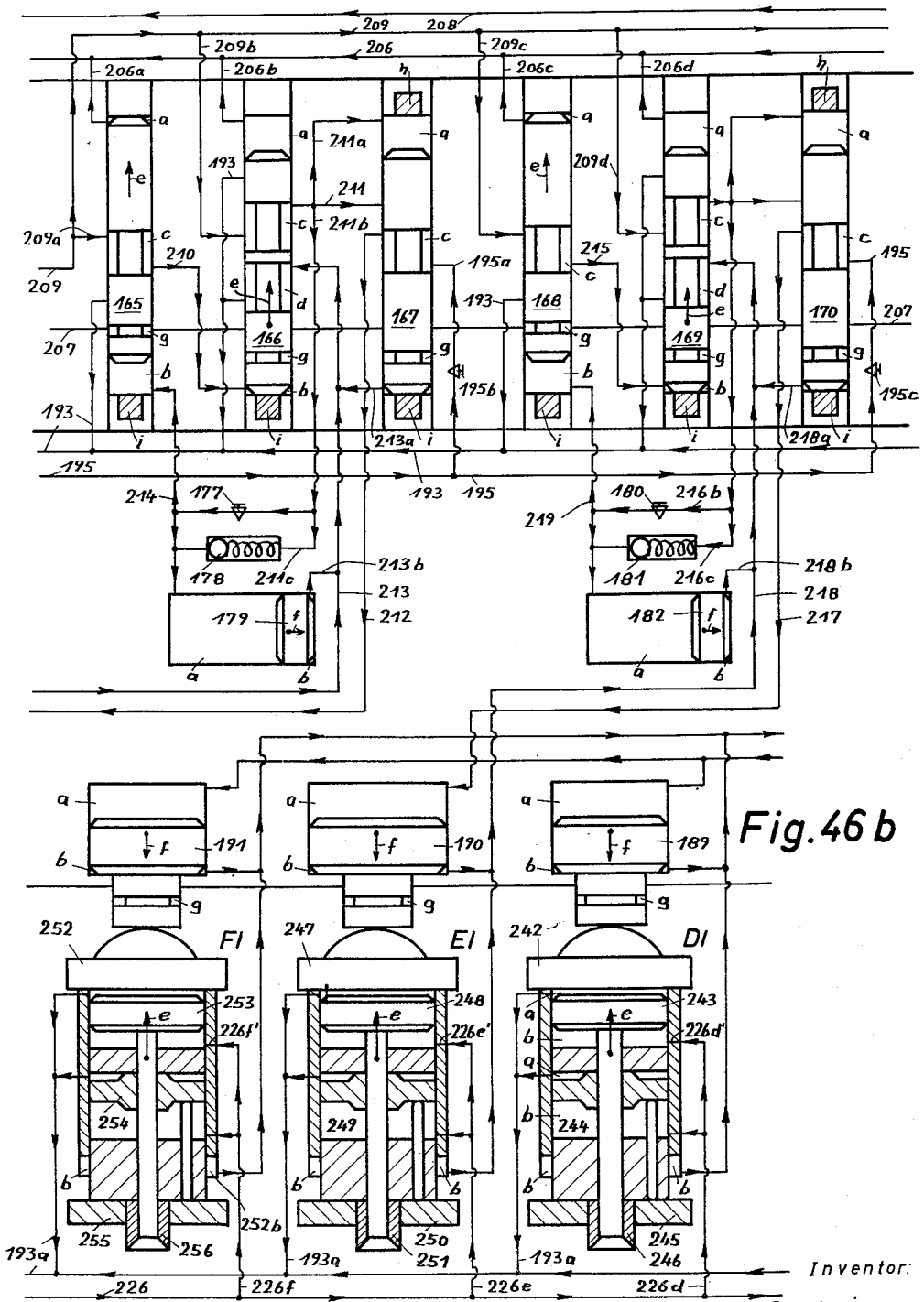
Figure 46C:
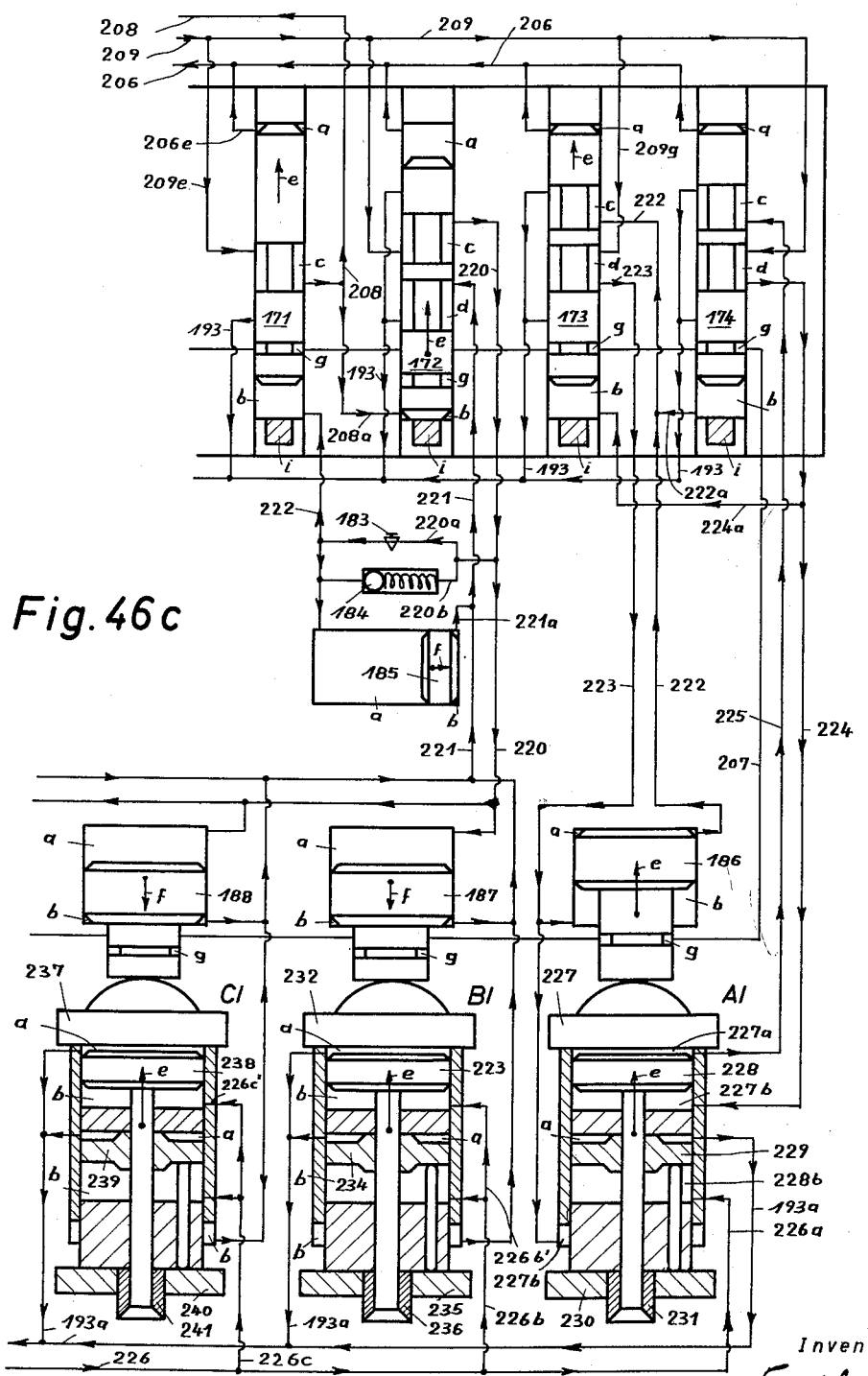

FIG. 46 shows the moment at which the time transmitting piston 179 of the control circuit I has reached its end position in the direction of arrow 179f and at which the time delay valve 165 has been pulled away from its holding means 165i and moved to its end position in the direction of arrow 165e by the low pressure oil still passing the throttle valve 177, whereby the time delay valve 165 connects the distributing ducts 209, 209a via its switching chamber 165c with the duct 210 so that the pressure oil delivered by the low pressure pump $P_1$ pressurizes the cylinder space 166b of the control valve 166 and moves it in the direction of arrow 166e.

The same control steps are taking place in the control circuit II whereby the time transmitting piston 182 attains its end position in the direction of arrow 182f and the pressure oil passing the throttle valve 180 causes the time delay valve 168 to be pulled away from its holding means 168i and to be moved in the direction of arrow 168e. Thus, the time delay valve connects the distributing ducts 209, 209c via its switching chamber 168c with the duct 215 so that the pressure oil delivered by the low pressure pump $P_1$ pressurizes the cylinder space 169b of the control valve 169 moving it in the direction of arrow 169e.

*Control Circuit III as Described in Fig. 46*

The control of the control circuit III is similar to that of the control circuits I and II so that, after the time transmitting piston 185 has attained its end position in the direction of arrow 185f the low pressure oil still passing the throttle valve 183 causes the time delay valve 171 to be moved in the direction of arrow 170e. In this position the time delay valve 171 connects the distributing ducts 209, 209e via its switching chamber 171c with the ducts 208 and 208a, whereby on the one hand the cylinder space 172b of the control valve 172 is pressurized and pulled away from its holding means, and on the other hand the cylinder space 160a of the blocking valve 160 is pressurized and moved in the direction of arrow 160f. These steps are preparing the control valve to receive the starting impulses for the first control cycle.

*Control Circuit IV as Described in Fig. 46*

After the control valve 173 has reached its end position in the direction of arrow 173e the distributing ducts 209, 209g are connected via the switching chamber 173d with the duct 223 thereby pressurizing, on the one hand, by the pressure oil delivered by the low pressure pump $P_1$, the cylinder space 186b of the lifter piston 186 moving it in the direction 186e and on the other hand the cylinder space 227b of the housing of the clamping device moving the clamping device with the clamped workpiece back in the direction 227e to its original position.

FIG. 36 shows the moment at which the control valve 166 connects the distributing ducts 209, 209b via its switching chamber 166d with the oil duct 213 whereby the pressure oil delivered by the low pressure pump $P_1$ pressurizes, on the one hand, the cylinder space 192b of the lifter piston 192 which cannot be moved on account of the high pressure within the chamber 192a so that the timing piston 179 is returned to its original position. After the timing piston 179 has attained its end position in the direction of arrow 179e the pressure within the cylinder space 167b of the pressure alternating valve 167 increases to the extent that it is pulled away from its holding means 167i and moved in the direction of arrow 167e. The moment the pressure alternating valve 167 attains its end position in the direction of arrow 167e it connects the cylinder space 192a, which so far has been pressurized by high pressure oil, via the switching chamber 167c with the distributing duct 211 which is connected with the return duct 193 via the switching chamber 166c, so that the pressure oil flowing through the duct 213 can move the lifter piston 192 back in the direction of arrow 192e without resistance.

A branch duct 213c of the duct 213 is connected with the cylinder space 257b of the clamping device 257 and moves the clamping device 257 back in the direction of arrow 257e.

FIG. 47 consisting of subfigures 47a and 47b shows another example of a control arrangement for controlling a hexagonal turret lathe. It consists of two interconnected main control cycles and two secondary control cycles, each of the latter cycles comprising a control valve 308 and 310 respectively and a time delay valve 309 and 311, respectively, the secondary control cycles serving to control the cross slide. In addition, the control arrangement comprises a number of secondary control valves 304, 305, 306 and 307 cooperating with elements of the machine drive. The valve 304 controls the clutch for the main machine drive, the valves 305 and 306 control the number of revolutions in four steps, and the valve 307 controls the clutch 361 which determines the direction of rotation.

It is evident that any other chosen number of secondary control valves or secondary control cycles, as for example the pairs of valves 308 and 309 or 310 and 311, respectively, may be added, so that it will also be possible to feed the clamping device from a supply container and to discharge the finished workpieces.

Figure 47B:
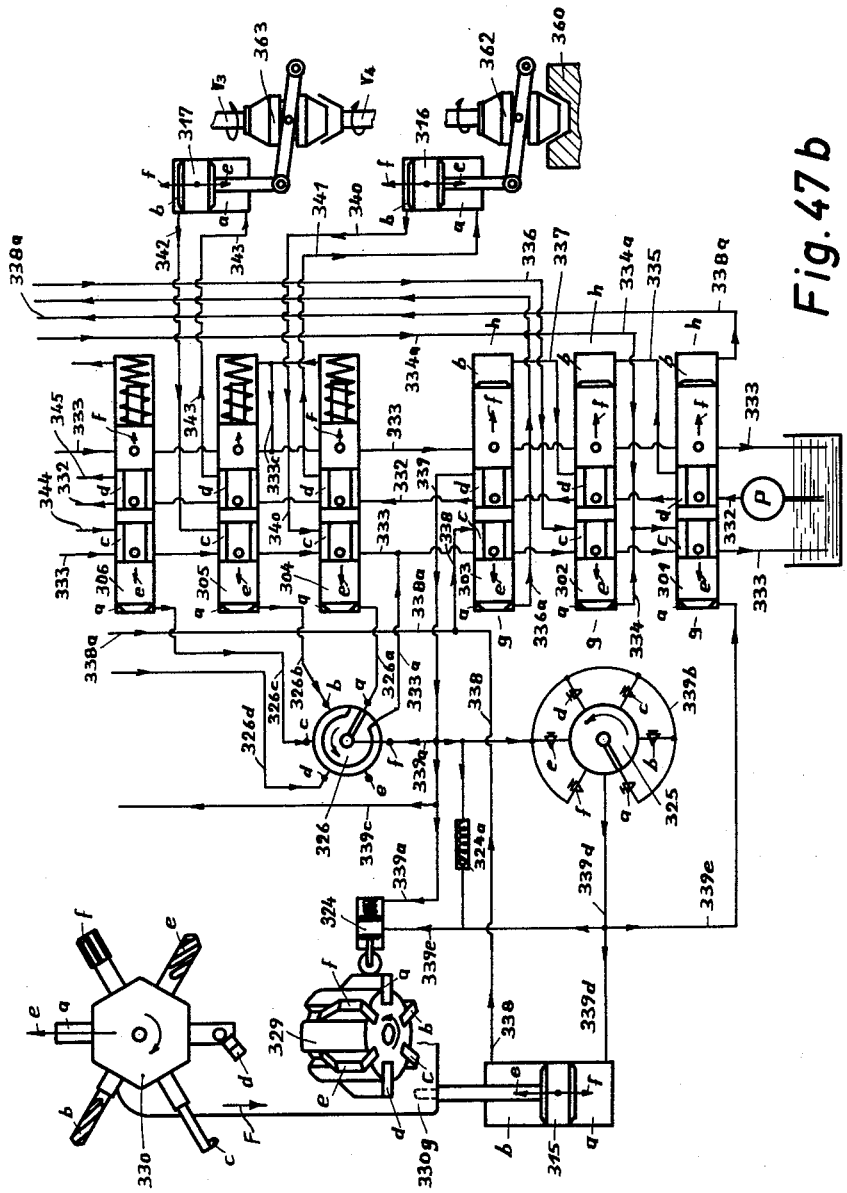

FIGS. 47a and 47b show a control for any commercial hexagonal turret lathe. An impulse transmitter 327 of the rotary valve type is used for actuating the secondary control cycles and for transmitting impulses to the second control cycle of the clamping device. Furthermore, an impulse transmitter 326 of the rotary valve type is used for actuating the secondary control valves 304, 305, 306 and 307 and a rotary valve 325 controls the speed of advance of the different tools, and a rotatable drum 329 with adjustable cams 329a to 329f for blocking the rapid motion valve 324 have been provided. These elements 325, 326, 327, and 329 are drivably connected with the tool holder 330 (turret head) so that, when the turret head 330 is in a position 330a, all valves 325, 326 and 327 are in positions 325a, 326a and 327a. In case the turret head 330 is turned at the next step from the position 330a to position 330b all the other elements are turned likewise so that the opening of the rotating valve 325 is positioned opposite the throttle valve 325b which after the rapid motion valve 324 has closed determines the speed of advance of the tool positioned at 330b. At the same time the rotary valve 326 rotates thereby opening the secondary control valve 304 whereupon after the clutch piston 316 has been switched over the brake 360 is released and the friction clutch 362 engaged. The space 305a of the secondary control valve 305 is pressurized via the duct 326b thereby switching the gear so that the number of revolutions corresponds to the cutting speed of the tool, in this case a spiral drill. As the position 327b of the impulse transmitter 327 is ineffective the cross slide of the turret lathe stands still during the drilling operation.

The feature of this control arrangement as compared with others must be seen in the fact, that the main control cycle (valves 301, 302 and 303) can operate according to the number of tools arranged on the turret head 330 and is, in this case, six times closed by itself, cooperating with the secondary controls only, the control being blocked only by the blocking valve 314 after the control program of the machining operation has been finished. Thereby the main control circuit is opened to connect the second control cycle for changing the workpiece. After the main slide 330g has returned to its original position in the direction of arrow 330f and the cross slide has also returned to its mid position after the workpiece has been cut off, the impulse duct "i" of the valves 308–311 opens and the pressure oil of the duct 332 pressurizes via the ducts 339 and 339c, impulse transmitter 327, impulse duct 327a, switching chamber 312d of the time delay valve 312 and the cylinder space 313a of the control valve 313 moving it in the direction of arrow 313f.

The moment the control valve 313 attains its end position in the direction of arrow 313f and thereby gives the starting impulse for the second control cycle, the cylinder space 320b is connected via the duct 358, rotary valve 328, duct 356, and switching chamber 313c with the pressure duct 332 thus pressurizing the cylinder space 320b moving the piston 320 in the direction of arrow 320f and causing the clamping device (not shown) to open.

The moment the piston 320 engages a limit stop or its end position, the oil pressure in the duct 356a, and the cylinder space 312a of the time delay valve 312 increases so far that the valve 312 is pulled away from its holding means 312g and moved in the direction of arrow 312f. After the valve 312 has attained its new position in the direction of arrow 312f thereby closing the impulse duct 327a, but still connecting the space 313a of the control valve 313 with the return duct 333, the control valve 313 is prepared to receive another impulse.

At the same time, the stock material for the next workpiece is moved against measuring stop 330a of the turret head 330 and also the main slide 330g is moved by the piston 315 in the direction of arrow 315e. After the measuring stop has engaged the stock material (a rod) it will be pushed back until the slide 330g engages an adjustable limit stop thereby advancing the stock material a distance corresponding to the workpiece to be machined.

The moment the main slide 330g engages the limit stop the pressure of the oil passing the throttle valve 325a increases within the cylinder space 301a of cycle changing valve 301 until it is pulled away from its holding means and moved in the direction of arrow 301f. After the valve 301 has attained its new position 301f pressure oil is fed via the switching chamber 301c, and duct 334 into the cylinder space 302a of the time delay valve 302. As, however, the time delay valve 312 is still pressurized via the switching chamber 313c of the control valve 313 only the control valve 313 can at the time being be moved in the direction of arrow 313e.

The moment the control valve 313 reaches its original position in the direction of arrow 313e the cylinder space 312a of the time delay valve 312 is connected with the return duct 333 so that it will also be moved into its original position. After the time delay valve 312 has attained its original position the impulse duct 327a is also opened, but without any effect on account of the counter-pressure within the space 313b. In the meantime, the time delay valve 302 has been pulled away from its holding means thereby connecting the duct 336 with the space 314b through switching chamber 302c of the blocking valve 314 which was blocked and moving it in the direction of arrow 314e thereby connecting the duct 36 via the switching chamber 314d with the duct 336a pressurizing the space 303a of the control valve 303.

After the control valve 303 has been moved in the direction of arrow 303f the pressure duct 332 is connected via the switching chamber 303c with the ducts 338 and 338a whereby the main slide 330g is moved by the piston 315 in the direction 315f. After the main slide 330g engages its limit stop the pressure within the chamber 301b of the control cycle alternating valve 301 will increase until it is pulled away from its holding means 301h and moved in the direction of arrow 301e. The mechanical switching elements connected with the main slide 330g will turn the turret head 330 for changing the tools when the main slide 330g is moved. Also the rotary valves 325, 326 and 327 are turned from their base positions 325a, 326a and 327a to their next positions 325b, 326b and 327b. Thereby the impulse duct 338a is opened via the switching chambers 312i, 313i and 314i and the control movement of the valve 301, 302 and 303 of the main control ring are repeated as often as there are stations on the turret head 330, and until the program of the cross slide 331 controlled by the secondary control cycle is completed. Only after the last tool, e.g. the reamer 330f or the cutting tool 331b are returned to their original positions will the impulse transmitter 327 increase the pressure within the space 314a via the duct 327f moving the blocking valve 314 in the direction of arrow 314f thereby opening the main control cycle and preparing it for the next impulse transmission.

The control of the first control cycle however remains effective until all the tools have accomplished their program and have returned to their original positions. Even in case the main slide 330g has returned to its original position and the impulse transmitter 327 has given the starting impulse via the duct 327a for the second control cycle (valves 312 and 313) the starting impulse is blocked by the valve 311 or, in case of a disturbance by one of the valves 308–310, until the cutting tool 331b has accomplished its program and has been moved back to its original position. The starting impulse is transmitted only when the valves 308–311 of the cross-slide control have returned to their original positions and the impulse duct 327a is opened via switching chambers 308i–311i.

Also, in case the cross slide 331 has finished its program and has been moved back to its original position only the starting impulse is transmitted, if the turret head has returned to its original position 330a.

The secondary control valves 304–307 are acting in such a way that their control will only be limited to one cycle of the main control cycle (valves 301–303) as the secondary control valves must cooperate with the main control cycle in such a way that for each tool the best suited cutting speed may be employed, as for example the spiral drill 330e requires a cutting speed of 30 m./min. while the reamer 330f is operating with only a speed of 8 m./min. Furthermore one of the secondary control valves is to operate so that it will stop the drive of the workpiece after the machining cycle is finished.

When machining bulky workpiece it is necessary to stop the machinery for placing another workpiece into the clamping device. For this purpose the rotary valve 328 is provided, so that the clamping device may be operated manually when changing a workpiece.

This is achieved by switching the oil pressure from the cylinder space 320a to the cylinder space 320b whereby the piston 320 will be moved in the direction of arrow 320f thereby opening the clamping device. After the rotary valve 328 is returned to its original position the clamping device is closed automatically.

The invention shall by no means be restricted to the embodiment described in connection with the drawings as changes and extensions of the control cycles etc. are possible without departing from the scope of the invention. Thus it is possible to provide a momentary stop valve in the main pressure duct stopping the entire control program which, after opening the momentary stop valve will be continued.

What I claim is:

1. In a hydraulic system for controlling the movements of automatic hydraulic actuated machines comprising at least one reciprocating hydraulic motor having a cylinder and a piston therein, a pressure fluid source selectively communicable through a main control circuit to either side of the piston of said motor, said main control circuit including at least three slide type valves designated a main control valve, an alternating valve, and a time delay valve, each having pistons defined thereon slidably arranged within a housing and each forming with said housing first and second cylinder chambers at opposite ends of said valves, each of said valves having two switching chambers separated by lands communicating with control ports defined in said housing, means for adjustably, releasably holding said valves in their respective end positions, said holding means releasing upon developing a predetermined pressure within an associated cylinder chamber, first and second adjustable throttle means in said circuit, a throttle means arranged in the circuit connection of each piston side of said motor each being independently adjustable for varying the pressure and rate of fluid flow to either side of said motor piston and thus infinitely and independently controlling the piston rate of movement in either direction, said throttle means communicating with said time delay valve, a first by-pass duct connecting the downstream pressure side of said first throttle means with said first cylinder chamber of said time delay valve for developing a pressure increase releasing time delay valve holding means and shifting said time delay valve when one of the end positions of said motor piston is reached and a second by-pass duct connecting the downstream side of said second throttle means with said first cylinder chamber of said main control valve for developing a pressure increase releasing main control valve holding means and shifting said main control valve when the other end position of said motor piston is reached, ducts establishing communication of said second cylinder chamber of said control valve with said second cylinder chamber of said alternating valve, and ducts connecting one of said control ports of said alternating valve and said second cylinder chamber of said time delay valve, the first cylinder chamber of said alternating valve either communicating with the pressure or a return duct via said control valve depending on its position, said control ports controlled by said valves being interconnected in such a way that in one position of said valves pressure is fed to one side of said motor piston while the other side of said motor piston is connected to a fluid return line and vice versa.

2. A hydraulic system according to claim 1, wherein said holding means are permanent magnets.

3. A hydraulic system according to claim 2, wherein the attractive power of said valve pistons on said permanent magnet is adjustable by means of an adjustable screw extending axially through said permanent magnet and engaging end faces defined on said valve pistons.

4. A hydraulic system according to claim 1, wherein said holding means for delaying the time of switching are formed by mechanical means mounted in said valves contacting the pistons thereof.

5. A hydraulic system according to claim 4, wherein the reacting force of said holding means is adjustable by changing the contact pressure between said holding means and piston to a desired value.

6. A hydraulic system according to claim 5, wherein said reacting force acts in only one direction of movement of said valve pistons.

7. A hydraulic system according to claim 5, wherein said reacting force acts in both directions of movement of said valve pistons and is independently adjustable.

8. A hydraulic system according to claim 1, wherein said holding means are formed by pistons loaded with pressure fluid, the reacting force being adjustable by changing the pressure of said fluid.

9. A hydraulic system according to claim 5, wherein the adjusting means of said holding means are adapted to be locked after the adjustment has been made.

10. In a hydraulic system for controlling the movements of automatic machines, such as automatic lathes, packing machines, presses, including their feeding and discharge device, or the like, comprising a plurality of reciprocating hydraulic motors, a fluid pressure pump supplying pressure fluid to be fed to said motors, a valve arrangement of the piston slide valve type having pistons defined thereon, comprising a plurality of control valves, alternating valves and time delay valves, each of said valves being operable in either of two directions to end positions by applying pressure fluid to the end of said valve pistons, said valves having two switching chambers, separated by lands of said valve pistons and provided with control ports, holding means for holding said valve pistons in their end positions, means releasing said holding means after a pre-determined pressure is attained by application of pressure fluid on said valve pistons, adjustable throttle means for feeding fluid of reduced pressure and infinitely variable rate of flow to either end of each of said motors thus adjusting their rate of movements which upon reaching the end of their movement causes the fluid pressure to increase to the value of pressure existing in their respective feed ducts ahead of said throttle means, branch ducts connecting the feed ducts of each motor with respect to the direction of flow behind said throttle means with one end of said control valves and one end of said time delay valves respectively communicating with said motors, said increase of pressure in said respective feed duct causing said control valve piston and said time delay valve piston to release from said holding means and thus to reverse the direction of movement of said respective motor, means interconnecting said valves such that they are operable within their operating program either singly, successively, or in groups simultaneously so that said motors may be controlled in accordance with a pre-determined program.

11. In a hydraulic system for controlling the movements of automatic machines, such as automatic lathes, packing machines, presses, including their feeding and discharge device, or the like, comprising a plurality of reciprocating hydraulic motors, a fluid pressure pump supplying pressure fluid to be fed to said motors, a valve arrangement of the piston slide valve type having pistons defined thereon, comprising a plurality of control valves, alternating valves and time delay valves, each of said valves being operable in either of two directions to end positions by applying pressure fluid to the end of said valve pistons, said valves having two switching chambers, separated by lands of said valve pistons and provided with control ports, holding means for holding said valve pistons in their end positions, means releasing said holding means after a pre-determined pressure is attained by application of pressure fluid on said valve pistons, adjustable throttle means for feeding fluid of reduced pressure and an infinitely variable rate of flow to either end of each of said motors, adjusting their rate of movements which upon reaching the end of their movement—causes the fluid pressure to increase to the value of pressure existing in their respective feed ducts ahead of said throttle means, branch ducts connecting the feed ducts of each motor with respect to the direction of flow behind said throttle means with one end of said control valves and one end of said time delay valves respectively, said increase of pressure in said respective feed duct causing said control valve piston and said time delay valve piston to release from said holding means and thus to reverse the direction of movement of said respective means interconnecting said valves such that they are operable within their operating program either singly, successively, or in groups simultaneously so that said motors may be controlled in accordance with a pre-determined program, said control program comprising circuits interconnected with each other such that the last valve member will cause the first valve member within the circuit to initiate the next operating cycle after the preceding operating cycle has ended.

12. A hydraulic system according to claim 11, wherein the period of influence of each of said control valves selectively extends to its own circuit only or to the entire control system.

13. A hydraulic system according to claim 11, wherein the holding forces of said holding means are adjusted such that said valve pistons will release successively thus achieving a sub-division of the switching moment within one circuit.

14. In a hydraulic system for controlling the movements of automatic machines, such as automatic lathes, packing machines, presses, including their feeding and discharge device, or the like, comprising a plurality of reciprocating hydraulic motors, a fluid pressure pump supplying pressure fluid to be fed to said motors, a valve arrangement of the piston slide valve type having pistons defined thereon, comprising a plurality of control valves, alternating valves and time delay valves, each of said valves being operable in either of two directions to end positions by applying pressure fluid to the end of said valve pistons, said valves having two switching chambers, separated by lands of said valve pistons and provided with control ports, holding means for holding said valve pistons in their end positions, means releasing said holding means after a predetermined pressure is attained by application of fluid pressure on said valve pistons, adjustable throttle means for feeding fluid of reduced pressure and an infinitely variable rate of flow to either end of each of said motors, adjusting their rate of movements which upon reaching the end of their movement causes the fluid pressure to increase to the value of pressure existing in their respective feed ducts ahead of said throttle means, branch ducts connecting the feed ducts of each motor with respect to the direction of flow behind said throttle means with one end of said control valves and one end of said time delay valves respectively, said increase of pressure in said respective feed duct causing said control valve piston and said time delay valve piston to release from said holding means and thus to reverse the direction of movement of said respective motor, means interconnecting said valves such that they are operable within their operating program either singly, successively, or in groups simultaneously so that said motors may be controlled in accordance with a predetermined program, said control program comprising circuits interconnected with each other such that the last valve member will cause the first valve member within the circuit to initiate the next operating cycle after the preceding operating cycle has ended, impulse channels interconnecting said control circuits adapted to convey an impulse ahead of time from one circuit to another.

15. A hydraulic system according to claim 14, wherein said control system includes a releasable stop means adapted to interrupt the operating cycle at any point and re-continue it upon release.

16. A hydraulic system according to claim 15, wherein said releasable stop means comprises an electrically operated valve arranged within the main pressure duct, said valve being operable by at least one switch.

17. A hydraulic system according to claim 15, wherein said releasable stop means is adapted to become effective at the end of the program for changing a workpiece.

18. A hydraulic system according to claim 14, wherein said throttle means comprise time actuated valves and rapid motion valves and conduits bypassing said throttle means.

19. A hydraulic system according to claim 18, wherein separate rapid return movement feed ducts communicate with said motors.

20. A hydraulic system according to claim 14, wherein the return ducts of said motors are replaced by biasing means constantly acting upon said motors.

21. A hydraulic system according to claim 14, wherein said control elements required for a certain control program are arranged within a common block.

22. A hydraulic system according to claim 21, wherein the ducts connecting said control elements are formed by bores within said block.

23. A hydraulic system according to claim 14, wherein means are operatively associated with said holding means adjusting the holding force thereof such that the sequence of switching is variable.

24. A hydraulic system according to claim 14, wherein the holding force of the various holding means is adjusted such that the sequence of switching on the advance movement of the valve pistons is different from that on the return movement.

25. A hydraulic system according to claim 14, wherein at least one pressure alternating slide valve is provided in the circuit for changing the feed to said motors from high pressure to low pressure and vice versa.

26. A hydraulic system according to claim 25, wherein at least one adjustable timing unit is provided in the circuit of the program whereby the operating steps are controllable independently from one another.

27. A hydraulic control system for controlling the movements of an automatic machine, including a fluid pressure source, a main control valve, an alternating valve, a time delay valve, each of said valves having first and second operative positions, releasable holding means maintaining said valves in either of said positions, fluid pressure operated actuating means operatively associated with said valves adapted to overcome said holding means and selectively shift said valves between said first and second positions, fluid motor means having a movable member directionally responsive to the direction of fluid flow thereto, a pair of ducts interconnecting said motor means and delay valve, duct means supplying said control and alternating valves with pressurized fluid, duct means interconnecting said alternating and delay valves, duct means interconnecting said control valve and said alternating valve actuating means, duct means interconnecting one of the delay valve actuating means with a duct supplying fluid to said motor means and the other delay valve actuating means with said alternating valve, duct means, interconnecting one of the control valve actuating means with the other duct supplying fluid to said motor means and the other control valve actuating means with said alternating valve, throttling means restricting the flow of fluid supplied to said motor means and to said delay and control valve actuating means in communication therewith and a duct interconnecting said control and delay valves whereby fluid initially supplied to said valves shifts said alternating valve from a first to a second position and energizes said motor means in a first direction until the pressure within said motor means attains a predetermined value which energizes said one delay valve actuating means shifting said delay valve to the second position which introduces fluid into the other motor means supplying duct driving said motor means in a second direction, upon said fluid pressure driving said motor means in said second direction attaining a predetermined value said fluid pressure shifts said control valve to the second position thereof thereby shifting said alternating valve to the first position thereof which returns said control and delay valves to the first positions thereof.

28. In a hydraulic system for controlling the movements of automatic machines such as automatic lathes, packing machines, presses including their feeding and discharge devices, or the like, comprising a main control circuit including a reciprocating hydraulic motor, a fluid pressure pump supplying pressure fluid to be fed to said motor, a main control circuit including a valve arrangement of the slide valve type having pistons defined thereon, comprising at least three valves, a main control valve, an alternating valve and a time delay valve, each of said valves being operable in either of two directions to end positions by applying pressure fluid to the ends of said valve pistons, said valves having two switching chambers separated by lands of said valve pistons and provided with control ports, holding means for holding said valve pistons in their end positions, means releasing said holding means after a predetermined pressure is attained by application of pressure fluid on said valve pistons, adjustable throttle means for feeding fluid of reduced pressure and infinitely variable rate of flow to either end of said motor, thus infinitely adjusting its rate of movement which upon reaching the end of motor movement causes the fluid pressure to increase to the value of pressure existing in a feed duct ahead of said throttle means, said increase of pressure causing said valve pistons to shift to positions in which the movement of said motor is reversed, a plurality of secondary self-blocking control circuits, each circuit comprising a control valve and a time delay valve of the piston slide valve type, secondary control valves of the piston slide valve type and impulse transmitters operatively associated with and actuated by said machine, said main control circuit being adapted to be selectively connected with one of said secondary control circuits in dependence of the position of said impulse transmitter, means blocking said main control circuit and said secondary control circuit after the operation controlled by said secondary control circuit has finished.

29. In a hydraulic system for controlling the movements of automatic machines such as automatic lathes, packing machines, presses including their feeding and discharge devices, or the like, comprising a main control circuit including a reciprocating hydraulic motor, a fluid pressure pump supplying pressure fluid to be fed to said motor, a main control circuit including a valve arrangement of the slide valve type having pistons defined thereon, comprising at least three valves, a main control valve, an alternating valve and a time delay valve, each of said valves being operable in either of two directions to end positions by applying pressure fluid to the ends of said valve pistons, said valves having two switching chambers separated by lands of said valve pistons and provided with control ports, holding means for holding said valve pistons in their end positions, means releasing said holding means after a predetermined pressure is attained by application of pressure fluid on said valve pistons, adjustable throttle means for feeding fluid of reduced pressure and infinitely variable rate of flow to either end of said motor, thus infinitely adjusting its rate of movement which upon reaching the end of motor movement causes the fluid pressure to increase to the value of pressure existing in a feed duct ahead of said throttle means, said increase of pressure causing said valve pistons to shift to positions in which the movement of said motor is reversed, a plurality of secondary self-blocking control circuits, each circuit comprising a control valve and a time delay valve of the piston slide valve type having pistons defined thereon and movable between end positions, each valve of said secondary control circuits being provided with holding means to hold said valves in their end positions until a predetermined pressure has been applied thereto, secondary control valves of the piston slide valve type serving to control elements of the machine being effective for one control cycle of said main control circuit, whereupon they will be separated from said main control circuit and block themselves until the next operating cycle is initiated, impulse transmitters formed by a hydraulic rotary valve, positively driven by an element of said machine, said main control circuit being adapted to open at predetermined intervals to be connected with another one of said secondary control circuits in dependence of the position of said impulse transmitting valve, said secondary control circuits being variably effective for a duration extending from a fraction to several cycles of said main control circuit, said main control circuit blocking itself and said secondary control circuit after the operation controlled by said secondary control circuit has finished.

References Cited in the file of this patent

UNITED STATES PATENTS

| | | |
|---|---|---|
| 2,343,656 | Folberth et al. | Mar. 7, 1944 |
| 2,446,611 | Rose | Aug. 10, 1948 |
| 2,477,359 | Barksdale | July 26, 1949 |
| 2,517,243 | Rose | Aug. 1, 1950 |
| 2,811,979 | Presnell | Nov. 5, 1957 |
| 2,844,942 | Reynolds | July 29, 1958 |

FOREIGN PATENTS

| | | |
|---|---|---|
| 703,831 | Great Britain | Feb. 10, 1954 |